(12) United States Patent
Genin et al.

(10) Patent No.: US 11,301,770 B2
(45) Date of Patent: Apr. 12, 2022

(54) METHODS AND SYSTEMS FOR SOLVING A PROBLEM ON A QUANTUM COMPUTER

(71) Applicant: OTI LUMIONICS INC., Toronto (CA)

(72) Inventors: Scott N. Genin, Unionville (CA); Artur Izmaylov, Toronto (CA); Ilya Ryabinkin, Toronto (CA)

(73) Assignee: OTI LUMIONICS INC., Mississauga (CA)

( * ) Notice: Subject to any disclaimer, the term of this patent is extended or adjusted under 35 U.S.C. 154(b) by 0 days.

(21) Appl. No.: 15/733,868

(22) PCT Filed: May 30, 2019

(86) PCT No.: PCT/IB2019/000624
§ 371 (c)(1),
(2) Date: Nov. 30, 2020

(87) PCT Pub. No.: WO2019/229527
PCT Pub. Date: Dec. 5, 2019

(65) Prior Publication Data
US 2021/0232960 A1     Jul. 29, 2021

Related U.S. Application Data

(60) Provisional application No. 62/783,275, filed on Dec. 21, 2018, provisional application No. 62/729,748, (Continued)

(51) Int. Cl.
*G06N 10/00*     (2019.01)
*G06N 3/04*      (2006.01)
(Continued)

(52) U.S. Cl.
CPC ............. *G06N 10/00* (2019.01); *G06F 30/20* (2020.01); *G06N 3/0445* (2013.01);
(Continued)

(58) Field of Classification Search
CPC .... G06N 10/00; G06N 3/0472; G06N 3/0445; G06N 5/003; G06N 20/00; G06N 7/00;
(Continued)

(56) References Cited

U.S. PATENT DOCUMENTS

| | | | | |
|---|---|---|---|---|
| 10,332,023 | B2* | 6/2019 | Mezzacapo | G06N 10/00 |
| 10,839,306 | B2* | 11/2020 | Mezzacapo | G06N 10/00 |
| 11,010,514 | B2* | 5/2021 | Hamamura | G06F 30/32 |
| 2016/0180238 | A1 | 6/2016 | Alboszta et al. | |

FOREIGN PATENT DOCUMENTS

| | | |
|---|---|---|
| WO | WO-2017209791 A1 | 12/2017 |
| WO | WO-2018064535 A1 | 4/2018 |
| WO | WO-2019229527 A2 | 12/2019 |

OTHER PUBLICATIONS

A Comparison of the Bravyi-Kitaev and Jordan-Wigner Transformations for the Quantum Simulation of Quantum Chemistry; Andrew Tranter et al. (Year: 2018).*

(Continued)

*Primary Examiner* — Vibol Tan
(74) *Attorney, Agent, or Firm* — Foley & Lardner LLP

(57) ABSTRACT

A method of solving a problem can include providing a fermionic Hamiltonian, transformation of the fermionic Hamiltonian to qubit operators, transformation of the fermionic Hamiltonian in qubit operators to a mean-field Hamiltonian, and embedding the Hamiltonian onto a quantum computer. Such systems and methods may improve upon existing methods for solving electronic structure problems on a computer by adapting the problem to available hardware, reducing computational cost, and reducing the number of required qubits to solve electronic structure problems for larger number of atoms.

28 Claims, 21 Drawing Sheets

Related U.S. Application Data filed on Sep. 11, 2018, provisional application No. 62/678,936, filed on May 31, 2018.

(51) Int. Cl.
*H03K 19/19* (2006.01)
*G06F 30/20* (2020.01)
*H03K 19/195* (2006.01)
*G06N 5/00* (2006.01)
*G06F 119/06* (2020.01)

(52) U.S. Cl.
CPC ........... *G06N 3/0472* (2013.01); *G06N 5/003* (2013.01); *H03K 19/195* (2013.01); *G06F 2119/06* (2020.01)

(58) Field of Classification Search
CPC ... G06F 30/20; G06F 2119/06; H03K 19/195; H03K 3/38; H03K 19/173
See application file for complete search history.

(56) References Cited

OTHER PUBLICATIONS

A unified framework of transformations based on Jordan-Wigner transformation; Qing-Song Li et al. (Year: 2021).*
The Bravyi-Kitaev transformation for quantum computation of electronic structure; Jacob T. Seeley et al. (Year: 2012).*
Kandala, et al., Hardware-efficient Variational Quantum Eigensolver for Small Molecules andQuantum Magnets. Nature 549, 242 (2017); 1-24.
Lieb, E.H., The Classical limit of quantum spin systems. Commun. Math. Phys. 1973; 31: 327-340.
PCT/IB2019/000624 International Search Report and Written Opinion dated Jan. 14, 2020.
Seely, et al., The Bravyi-Kitaev transformation for quantum computation of electronic structure. Dec. 2012. The Journal of Chemical Physics 137(22):224109, 1-38.

* cited by examiner

1300

1310

2010

2020

METHODS AND SYSTEMS FOR SOLVING A PROBLEM ON A QUANTUM COMPUTER

CROSS-REFERENCE

This application claims the benefit of U.S. Provisional Application No. 62/783,275, filed Dec. 21, 2018, U.S. Provisional Application No. 62/729,748, filed Sep. 11, 2018, and U.S. Provisional Application No. 62/678,936, filed May 31, 2018, which applications are incorporated herein by reference in their entireties.

BACKGROUND

In molecular simulations, electrons, protons, and neutrons—all quantum mechanical in nature—interact in many body interactions whose solution may be intractable using conventional computers and conventional numerical methods due to long computational times. Quantum computers may be particularly suited to solving these problems. However, currently available quantum computers may have significant hardware limitations in terms of number of qubits available, gate depth, and gate fidelity/accuracy, which may limit the use of such hardware. While it may be possible to simulate larger molecules as quantum computing technology improves, even as greater numbers of qubits become available there will remain a need to simulate larger and larger molecules.

SUMMARY

Recognized herein is a need to improve computational accuracy and to reduce the number of qubits required to simulate a molecule of a given size, thereby reducing the computational cost and improving the function of the quantum computer. Systems and methods disclosed herein may reduce the number of quantum circuit gate operations (e.g. the circuit depth) to perform a calculation and, in some cases, may even reduce the number of quantum circuit gate operations to achieve the full configuration interaction equivalent energy. For example, since each quantum gate operation may introduce noise into the calculation, reducing the number of gate operations may reduce the final error. Systems and methods disclosed herein may modify the Hamiltonian to improve embedding on a quantum annealer In an aspect, a system operable to solve a problem is provided. In some embodiments, the system comprises a quantum computer comprising a plurality of qubits; a qubit Hamiltonian, wherein one or more coordinates in the qubit Hamiltonian comprises a parametrization in spin coherent states, wherein the parametrization comprises either an operation of one or more quantum logic gates or an expression of the qubit Hamiltonian in Pauli Z rotations, wherein the Hamiltonian is embedded on the quantum computer, wherein one or more eigenvalues of the qubit Hamiltonian is a variational upper bound to an exact energy, and wherein a lower eigenvalue of the qubit Hamiltonian comprises a solution to the problem.

In some embodiments, the system may comprise a spin coherent state comprising an expression in spherical polar coordinates on the Bloch sphere. In some embodiments, the system may comprise the operation of one or more quantum logic gates comprising a qubit mean-field ansatz. In some embodiments, the system may comprise a qubit Hamiltonian comprising an Ising type Hamiltonian. In some embodiments, the system may comprise a qubit Hamiltonian comprising a quadratic unconstrained boundary optimization problem. In some embodiments, the system may comprise a qubit Hamiltonian in Pauli Z rotation comprising bias terms and coupling terms for each of the plurality of qubits. In some embodiments, the system may comprise a value of the bias terms and a value of the coupling terms which is determined using a classical computer.

In some embodiments, the system may comprise a solution to the problem being a quantum state of a molecule. In some embodiments, the solution may comprise a quantum state which is a ground state. In some embodiments, the molecule may be an organic optoelectronic material. In some embodiments, the molecule may comprise one or more main group elements. In some embodiments, the molecule may be a polymer. In some embodiments, the molecule may be a molecular crystal.

In some embodiments, the system may comprise a qubit Hamiltonian which is a mean-field Hamiltonian. In some embodiments, the system may comprise a qubit Hamiltonian comprising a transformation of the fermionic Hamiltonian. In some embodiments, the system may comprise a transformation of the fermionic Hamiltonian comprising using the Jordan-Wigner transformation. In some embodiments, the system may comprise a transformation of the fermionic Hamiltonian comprising using the Bravyi-Kitaev method.

In some embodiments, the system may comprise a quantum computer which is a quantum annealer. In some embodiments, the system may comprise a lower eigenvalue of the reduced Hamiltonian. The lower eigenvalue may be a global minimum. In some embodiments, the system may comprise a lower eigenvalue of the reduced Hamiltonian is a local minimum. In some embodiments, the system may comprise a quantum computer which is a universal gate quantum computing unit.

In another aspect, a method of solving a problem on a quantum computer is provided. In some embodiments, the method may comprise: providing a qubit Hamiltonian, wherein one or more eigenvalues of the qubit Hamiltonian is a variational upper bound to an exact state energy; parametrizing one or more coordinates in the Hamiltonian by spin coherent states, wherein parametrizing the one or more coordinates comprises either an operation of one or more quantum logic gates or expressing the qubit Hamiltonian in Pauli Z rotations; embedding the qubit Hamiltonian on the quantum computer; and determining a lower eigenvalue of the qubit Hamiltonian, wherein the lower eigenvalue comprises a solution to the problem.

In some embodiments, the method may comprise a spin coherent state comprising an expression in spherical polar coordinates on the Bloch sphere. In some embodiments, the method may comprise an operation of one or more quantum logic gates comprising a qubit mean-field ansatz. In some embodiments, the method may comprise a qubit Hamiltonian comprising an Ising type Hamiltonian. In some embodiments, the method may comprise a qubit Hamiltonian comprising a quadratic unconstrained boundary optimization problem. In some embodiments, the method may comprise a qubit Hamiltonian in Pauli Z rotation comprises bias terms and coupling terms. In some embodiments, the method may comprise determining a value of the bias terms and the coupling terms using a classical computer. In some embodiments, the method may comprise transferring the value of the bias terms and the value of the coupling terms to the quantum computer.

In some embodiments, the method may comprise a solution to the problem which is a quantum state of a molecule. In some embodiments, the solution may comprise a quantum state is a ground state. In some embodiments, the molecule may comprise an organic optoelectronic material. In some embodiments, the molecule may comprise one or more main group elements. In some embodiments, the molecule may comprise a polymer. In some embodiments, the molecule may comprise a molecular crystal.

In some embodiments, the method may comprise a qubit Hamiltonian which is a qubit mean-field Hamiltonian. In some embodiments, the method may comprise transforming a fermionic Hamiltonian to the qubit Hamiltonian using a Jordan-Wigner transformation. In some embodiments, the method may comprise transforming a fermionic Hamiltonian to the qubit Hamiltonian using the Bravyi-Kitaev method. In some embodiments, the method may comprise transforming a fermionic Hamiltonian to the qubit Hamiltonian using the Parity method. In some embodiments, the method may comprise one or more gate operations which are used to determine the lower eigenvalue of the qubit Hamiltonian. In some embodiments, the method may comprise a number of gate operations used which scales linearly with a number of fermions in the qubit Hamiltonian.

In some embodiments, the method may comprise a quantum computer which is a quantum annealer. In some embodiments, the method may comprise a quantum computer which is a universal gate quantum processing unit. In some embodiments, the method may comprise a solution which is a global minimum. In some embodiments, the method may comprise a solution which is a local minimum. In some embodiments, the method may further comprise providing the solution to a user In an aspect, a method of solving a problem on a quantum computer is provided. The method may comprise: providing a qubit Hamiltonian, wherein one or a plurality eigenvalues of the qubit Hamiltonian is a variational upper bound to an exact state energy; providing a set of entanglers, the entanglers comprising one or a plurality Pauli words; determining a subset of the set of entanglers which reduces a value of the one or plurality eigenvalues; truncating the set of entanglers; forming a qubit coupled cluster Hamiltonian comprising the truncated set of entanglers; embedding the qubit coupled cluster Hamiltonian on the quantum computer; and determining a lower eigenvalue of the qubit Hamiltonian, wherein the lower eigenvalue comprises a solution to the problem.

In some embodiments, the method may further comprise parameterizing one or more coordinates of the Hamiltonian by spin coherent states. In some embodiments, the method may further comprise expressing the truncated set of entanglers as Pauli z-rotations. In some embodiments, the method may further comprise folding an optimization domain in amplitude or phase space before determining the lower eigenvalue of the qubit coupled cluster Hamiltonian.

In another aspect, a quantum computer is provided. The quantum computer may comprise: a plurality of qubits; a Hamilton embedded on the quantum computer, wherein one or a plurality of eigenvalues of the Hamiltonian is a variational upper bound to an exact energy; and a plurality of gate operations which may be implemented by the quantum computer, the plurality of gate operations comprising: a set of entanglers comprising one or a plurality of Pauli Words; and a subset of entanglers, wherein the subset of entanglers comprises selected Pauli Words which reduce a value of the one or a plurality of eigenvalues.

In some embodiments, the Hamiltonian may comprise a qubit coupled cluster Hamiltonian. In some embodiments, the subset of entanglers may be parametrized in the Hamiltonian by spin coherent states. In some embodiments, the subset of entanglers may be expressed as Pauli z-rotations. In some embodiments, a domain of optimization of the subset of entanglers may be folded in amplitude or phase.

In an aspect, a method of solving a problem on a quantum computer is provided. The method may comprise: providing a qubit Hamiltonian, wherein one or more eigenvalues of the qubit Hamiltonian is a variational upper bound to an exact state energy; providing an operator, wherein the operator commutes with the qubit Hamiltonian; constraining the qubit Hamiltonian with respect to the operator and an eigenvalue of the operator; embedding the qubit Hamiltonian on the quantum computer; and determining a lower eigenvalue of the qubit Hamiltonian, wherein the lower eigenvalue comprises a solution to the problem.

In some embodiments, the operator may comprise a commutation relation of the qubit Hamiltonian and a second operator that commutes with the qubit Hamiltonian. In some embodiments, the second operator may be a number operator. In some embodiments, the second operator may be a total spin operator. In some embodiments, the operator may be a number operator. In some embodiments, the operator may be a total spin operator. In some embodiments, the method may further comprise constraining the qubit Hamiltonian with respect to a second operator and a second eigenvalue of the second operator and wherein the second operator commutes with the qubit Hamiltonian. In some embodiments, the operator may be generated using a Bravyi-Kitaev or a Jordan-Wigner transformation of a related fermionic operator. In some embodiments, the method further comprises parametrizing one or more coordinates in the qubit Hamiltonian by spin coherent states, wherein parametrizing the one or more coordinates comprises either an operation of one or more quantum logic gates or expressing the qubit Hamiltonian in Pauli Z rotations.

In another aspect, a quantum computer is provided. The quantum computer may comprise: a plurality of qubits; a qubit Hamilton embedded on the quantum computer, wherein one or a plurality of eigenvalues of the qubit Hamiltonian is a variational upper bound to an exact energy, wherein the qubit Hamiltonian comprises a constraint by an operator and an eigenvalue of the operator, and wherein the operator commutes with the qubit Hamiltonian; and a plurality of gate operations configured to act upon the plurality of qubits and configured to be implemented by the quantum computer, the plurality of gate operations operable to find the variational upper bound to the exact energy.

In some embodiments, the operator may comprise a commutation relation of the qubit Hamiltonian and a second operator that commutes with the qubit Hamiltonian. In some embodiments, the second operator may be a number operator. In some embodiments, the second operator may be a total spin operator. In some embodiments, the operator may be a number operator. In some embodiments, the operator may be a total spin operator. In some embodiments, the qubit Hamiltonian may comprise a second constraint by a second operator and a second eigenvalue of the second operator and wherein the second operator commutes with the qubit Hamiltonian.

In an aspect, a system operable to solve a problem is provided. The system may comprise: a quantum computer comprising a plurality of qubits; a qubit Hamiltonian, wherein one or more coordinates in the qubit Hamiltonian comprises a parametrization in spin coherent states, wherein the parametrization comprises either an operation of one or more quantum logic gates or an expression of the qubit Hamiltonian in Pauli Z rotations, wherein the Hamiltonian is embedded on the quantum computer, wherein one or more eigenvalues of the qubit Hamiltonian is a variational upper bound to an exact energy, and wherein an eigenvalue of the qubit Hamiltonian comprises a solution to the problem.

In some embodiments, the spin coherent state comprises an expression in spherical polar coordinates on the Bloch sphere. In some embodiments, the spin coherent state is parameterized by the following:

$$|\Omega\rangle = \cos^{2J}\left(\frac{\theta}{2}\right)\exp\left[\tan\left(\frac{\theta}{2}\right)e^{i\phi}\hat{S}_-\right]|JJ\rangle,$$

$$|\Omega\rangle = \sum_{M=-J}^{J}\binom{2J}{M+J}^{1/2}\times\cos^{J+M}\left(\frac{\theta}{2}\right)\sin^{J-M}\left(\frac{\theta}{2}\right)e^{i(J-M)\phi}|JM\rangle.$$

In some embodiments, the operation of one or more quantum logic gates comprises a qubit mean-field ansatz. In some embodiments, the expression of the qubit Hamiltonian in Pauli Z rotations comprises an Ising type Hamiltonian. In some embodiments, the expression of the qubit Hamiltonian in Pauli Z comprises a quadratic unconstrained boundary optimization problem. In some embodiments, the qubit Hamiltonian in Pauli Z rotation comprises bias terms and coupling terms for each of the plurality of qubits. In some embodiments, a value of the bias terms and a value of the coupling terms are determined using a classical computer.

In some embodiments, the solution to the problem is a quantum state of a molecule. In some embodiments, the quantum state is a ground state. In some embodiments, the molecule is an organic optoelectronic material. In some embodiments, the molecule comprises one or more main group elements. In some embodiments, the molecule is a polymer.

In some embodiments, the molecule is a molecular crystal. In some embodiments, the qubit Hamiltonian is a mean-field Hamiltonian. In some embodiments, the qubit Hamiltonian comprises a transformation of the fermionic Hamiltonian. In some embodiments, a transformation of the fermionic Hamiltonian comprises using the Jordan-Wigner transformation. In some embodiments, a transformation of the fermionic Hamiltonian comprises using the Bravyi-Kitaev method. In some embodiments, the quantum computer is a quantum annealer. In some embodiments, the eigenvalue of the reduced Hamiltonian is a global minimum. In some embodiments, the eigenvalue of the reduced Hamiltonian is a local minimum. In some embodiments, the quantum computer is a universal gate quantum computing unit.

In an aspect, a method of solving a problem on a quantum computer is provided. The method may comprise: providing a qubit Hamiltonian, wherein one or more eigenvalues of the qubit Hamiltonian is a variational upper bound to an exact state energy; parametrizing one or more coordinates in the qubit Hamiltonian by spin coherent states, wherein parametrizing the one or more coordinates comprises either an operation of one or more quantum logic gates or expressing the qubit Hamiltonian in Pauli Z rotations; directing the qubit Hamiltonian to be embedded on the quantum computer; and receiving an eigenvalue of the qubit Hamiltonian from the quantum computer, wherein the eigenvalue comprises a solution to the problem.

In some embodiments, the spin coherent state comprises an expression in spherical polar coordinates on the Bloch sphere. In some embodiments, the spin coherent state is parameterized by the following:

$$|\Omega\rangle = \cos^{2J}\left(\frac{\theta}{2}\right)\exp\left[\tan\left(\frac{\theta}{2}\right)e^{i\phi}\hat{S}_-\right]|JJ\rangle,$$

$$|\Omega\rangle = \sum_{M=-J}^{J}\binom{2J}{M+J}^{1/2}\times\cos^{J+M}\left(\frac{\theta}{2}\right)\sin^{J-M}\left(\frac{\theta}{2}\right)e^{i(J-M)\phi}|JM\rangle.$$

In some embodiments, the operation of one or more quantum logic gates comprises a qubit mean-field ansatz. In some embodiments, the qubit Hamiltonian comprises an Ising type Hamiltonian. In some embodiments, the qubit Hamiltonian comprises a quadratic unconstrained boundary optimization problem. In some embodiments, the qubit Hamiltonian in Pauli Z rotation comprises bias terms and coupling terms. In some embodiments, the method further comprises determining a value of the bias terms and the coupling terms using a classical computer. In some embodiments, the method further comprises transferring the value of the bias terms and the value of the coupling terms to the quantum computer.

In some embodiments, the solution to the problem is a quantum state of a molecule. In some embodiments, the quantum state is a ground state. In some embodiments, the molecule is an organic optoelectronic material. In some embodiments, the molecule comprises one or more main group elements. In some embodiments, the molecule is a polymer. In some embodiments, the molecule is a molecular crystal.

In some embodiments, the qubit Hamiltonian is a qubit mean-field Hamiltonian. In some embodiments, the method further comprises transforming a fermionic Hamiltonian to the qubit Hamiltonian using a Jordan-Wigner transformation. In some embodiments, the method further comprises transforming a fermionic Hamiltonian to the qubit Hamiltonian using the Bravyi-Kitaev method. In some embodiments, the method further comprises transforming a fermionic Hamiltonian to the qubit Hamiltonian using the Parity method. In some embodiments, one or more gate operations are used to determine the lower eigenvalue of the qubit Hamiltonian. In some embodiments, a number of gate operations used scales linearly with a number of fermions in the qubit Hamiltonian. In some embodiments, the quantum computer is a quantum annealer. In some embodiments, the quantum computer is a universal gate quantum processing unit. In some embodiments, the eigenvalue of the reduced Hamiltonian is a global minimum. In some embodiments, the eigenvalue of the reduced Hamiltonian is a local minimum. In some embodiments, the method further comprises providing the solution to a user.

In an aspect, a method of solving a problem on a quantum computer is provided. The method may comprise: providing a qubit Hamiltonian, wherein one or a plurality eigenvalues of the qubit Hamiltonian is a variational upper bound to an exact state energy; providing a set of entanglers, the entanglers comprising one or a plurality Pauli words; determining a subset of the set of entanglers which reduces a value of the one or plurality eigenvalues; truncating the set of entanglers; forming a qubit coupled cluster Hamiltonian comprising the truncated set of entanglers; directing the qubit coupled cluster Hamiltonian to be embedded on the quantum computer; and receiving an eigenvalue of the qubit Hamiltonian from the quantum computer, wherein the eigenvalue comprises a solution to the problem.

In some embodiments, the method further comprises parameterizing one or more coordinates of the Hamiltonian by spin coherent states. In some embodiments, the method further comprises expressing the truncated set of entanglers as Pauli z-rotations. In some embodiments, the method further comprises folding an optimization domain in amplitude or phase space before determining the lower eigenvalue of the qubit coupled cluster Hamiltonian.

In an aspect, a quantum computer is provided. The quantum computer may comprise: a plurality of qubits; a Hamilton embedded on the quantum computer, wherein one or a plurality of eigenvalues of the Hamiltonian is a variational upper bound to an exact energy; and a plurality of gate operations which may be implemented by the quantum computer, the plurality of gate operations comprising: a set of entanglers comprising one or a plurality of Pauli Words; and a subset of entanglers, wherein the subset of entanglers comprises selected Pauli Words which reduce a value of the one or a plurality of eigenvalues.

In some embodiments, the Hamiltonian comprises a qubit coupled cluster Hamiltonian. In some embodiments, the subset of entanglers is parametrized in the Hamiltonian by spin coherent states. In some embodiments, the subset of entanglers is expressed as Pauli z-rotations. In some embodiments, a domain of optimization of the subset of entanglers is folded in amplitude or phase.

In an aspect, a method of solving a problem on a quantum computer is provided. The method may comprise: providing a qubit Hamiltonian, wherein one or more eigenvalues of the qubit Hamiltonian is a variational upper bound to an exact state energy; providing an operator, wherein the operator commutes with the qubit Hamiltonian; constraining the qubit Hamiltonian with respect to the operator and an eigenvalue of the operator; directing the qubit Hamiltonian to be embedded on the quantum computer; and receiving an eigenvalue of the qubit Hamiltonian from the quantum computer, wherein the eigenvalue comprises a solution to the problem.

In some embodiments, the operator comprises a commutation relation of the qubit Hamiltonian and a second operator that commutes with the qubit Hamiltonian. In some embodiments, the second operator is a number operator. In some embodiments, the second operator is a total spin operator. In some embodiments, the operator is a number operator. In some embodiments, the operator is a total spin operator. In some embodiments, the method further comprises constraining the qubit Hamiltonian with respect to a second operator and a second eigenvalue of the second operator and wherein the second operator commutes with the qubit Hamiltonian. In some embodiments, the operator is generated using a Bravyi-Kitaev or a Jordan-Wigner transformation of a related fermionic operator. In some embodiments, the method further comprises parametrizing one or more coordinates in the qubit Hamiltonian by spin coherent states, wherein parametrizing the one or more coordinates comprises either an operation of one or more quantum logic gates or expressing the qubit Hamiltonian in Pauli Z rotations. In some embodiments, a domain of optimization of the operator is folded in amplitude or phase.

In an aspect a quantum computer is provided. The quantum computer may comprise: a plurality of qubits; a qubit Hamilton embedded on the quantum computer, wherein one or a plurality of eigenvalues of the qubit Hamiltonian is a variational upper bound to an exact energy, wherein the qubit Hamiltonian comprises a constraint by an operator and an eigenvalue of the operator, and wherein the operator commutes with the qubit Hamiltonian; and a plurality of gate operations configured to act upon the plurality of qubits and configured to be implemented by the quantum computer, the plurality of gate operations operable to find the variational upper bound to the exact energy.

In some embodiments, the operator comprises a commutation relation of the qubit Hamiltonian and a second operator that commutes with the qubit Hamiltonian. In some embodiments, the second operator is a number operator. In some embodiments, the second operator is a total spin operator. In some embodiments, the operator is a number operator. In some embodiments, the operator is a total spin operator. In some embodiments, the qubit Hamiltonian comprises a second constraint by a second operator and a second eigenvalue of the second operator and wherein the second operator commutes with the qubit Hamiltonian. In some embodiments, the operator is generated using a Bravyi-Kitaev or a Jordan-Wigner transformation of a related fermionic operator. In some embodiments, the computer further comprises parametrizing one or more coordinates in the qubit Hamiltonian by spin coherent states, wherein parametrizing the one or more coordinates comprises either an operation of one or more quantum logic gates or expressing the qubit Hamiltonian in Pauli Z rotations. In some embodiments, a domain of optimization of the operator is folded in amplitude or phase.

In an aspect, a method of solving a problem on a quantum computer is provided. The method may comprise: providing a qubit Hamiltonian, wherein one or a plurality eigenvalues of the qubit Hamiltonian is a variational upper bound to an exact state energy, and wherein the qubit Hamiltonian is parameterized by a set of entanglers; determining an first entangler of the set of entanglers which reduces a value of the one or plurality eigenvalues; directing the Hamiltonian to be embedded on the quantum computer, wherein the Hamiltonian comprises the first entangler; receiving from the quantum computer an amplitude of the first entangler which produces a first lower eigenvalue of the Hamiltonian; directing the Hamiltonian to be embedded on the quantum computer, wherein the t Hamiltonian comprises the amplitude of the first entangler and a second entangler of the set of entanglers; receiving from the quantum computer an amplitude of the second entangler which produces a second lower eigenvalue of the Hamiltonian.

In some embodiments, the method further comprises parameterizing one or more coordinates of the Hamiltonian by spin coherent states. In some embodiments, the method further comprises folding an optimization domain in amplitude or phase space before determining the lower eigenvalue of the Hamiltonian. In some embodiments, the qubit Hamiltonian comprises a qubit coupled cluster Hamiltonian. In some embodiments, the qubit cluster Hamiltonian is transformed as $H_e + \sin(t_1)/2\ (T_1 H_e - H_e T_1) + (1-\cos(t_1))/2\ (T_1 H_1 - H_e)$. In some embodiments, the quantum computer is a quantum annealer. In some embodiments, the quantum computer is a universal gate quantum processing unit. In some embodiments, the method further comprises determining a third or more lower eigenvalues of the qubit Hamiltonian using a third or more entanglers and wherein the first, second, and third lower eigenvalues comprise a set of lower eigenvalues. In some embodiments, a solution to the problem is an eigenvalue of the set of lower eigenvalues. In some embodiments, the method further comprises providing the solution to a user. In some embodiments, the solution is a global minimum. In some embodiments, the solution is a local minimum.

In an aspect, a quantum computer is provided. The quantum computer may comprise: a plurality of qubits; a Hamilton embedded on the quantum computer, wherein one or a plurality of eigenvalues of the Hamiltonian is a variational upper bound to an exact energy; and a plurality of gate operations which may be implemented by the quantum computer, the plurality of gate operations comprising: a set of entanglers which reduces a value of the one or plurality eigenvalues; an first amplitude of a first entangler which produces a lower eigenvalue of the Hamiltonian; a second entangler of the set of entanglers which reduces the lower eigenvalue value of the one or plurality eigenvalues of the Hamiltonian, wherein the Hamiltonian comprises the first amplitude of the first entangler.

In some embodiments, the first and second lower eigenvalues comprise a set of lower eigenvalues. In some embodiments, a solution to the problem is an eigenvalue of the set of lower eigenvalues. In some embodiments, the method further comprises providing the solution to a user. In some embodiments, the solution is a global minimum. In some embodiments, the solution is a local minimum. In some embodiments, one or more coordinates of the Hamiltonian is parameterized by spin coherent states.

In an aspect, a system operable to solve a problem is provided. The system may comprise: a computer comprising: a qubit Hamiltonian, wherein one or more coordinates in the qubit Hamiltonian comprises a parametrization in spin coherent states, one or more eigenvalues, wherein the one or more eigenvalues of the qubit Hamiltonian is a variational bound to an exact energy, and a solution to the problem, wherein the solution comprises an eigenvalue of the qubit Hamiltonian.

In some embodiments, the computer is classical computer. In some embodiments, the computer simulates the operation of the quantum computer of any aspect or embodiment disclosed herein. In some embodiments, the system further comprises, the quantum computer of any aspect or embodiment disclosed herein. In some embodiments, the classical computer is operable to control the quantum computer. In some embodiments, the solution is provided to a user.

In some embodiments, the parameterization in spin coherent states comprises an expression in spherical polar coordinates on the Bloch sphere. In some embodiments, the spin coherent states are parameterized by the following:

$$|\Omega\rangle = \cos^{2J}\left(\frac{\theta}{2}\right)\exp\left[\tan\left(\frac{\theta}{2}\right)e^{i\phi}\hat{S}_-\right]|JJ\rangle,$$

$$|\Omega\rangle = \sum_{M=-J}^{J}\binom{2J}{M+J}^{1/2} \times \cos^{J+M}\left(\frac{\theta}{2}\right)\sin^{J-M}\left(\frac{\theta}{2}\right)e^{i(J-M)\phi}|JM\rangle.$$

In some embodiments, the solution is a local minimum. In some embodiments, the solution is a global minimum. In some embodiments, the qubit Hamiltonian is parameterized in Pauli Z rotations. In some embodiments, the qubit Hamiltonian comprises a QUBO, k-local Ising model, or HOBO model. In some embodiments, the qubit Hamiltonian parametrized in Pauli Z rotation comprises bias terms and coupling terms. In some embodiments, the computer comprises a value of the bias terms and the coupling terms. In some embodiments, the value of the bias terms and the value of the coupling terms are transferred to the quantum computer. In some embodiments, the Hamiltonian comprises a qubit coupled cluster Hamiltonian. In some embodiments, the qubit cluster Hamiltonian is transformed as $H_e+\sin(t_1)/2$ $(T_1 H_e - H_e T_1) + (1-\cos(t_1))/2$ $(T_1 H_1 - H_e)$. In some embodiments, the qubit coupled cluster Hamiltonian comprises a set of entanglers parametrized by spin coherent states. In some embodiments, the set of entanglers comprises one or a plurality of Pauli Words. In some embodiments, the set of entanglers comprises a subset of entanglers, wherein the subset of entanglers comprises selected Pauli Words which reduce a value of the one or a plurality of eigenvalues. In some embodiments, the subset of entanglers is expressed as Pauli z-rotations. In some embodiments, a domain of optimization of the qubit Hamiltonian is folded in amplitude or phase.

In an aspect, a computer-implemented method of solving a problem is provided. The method may comprise: providing a qubit Hamiltonian, wherein one or more eigenvalues of the qubit Hamiltonian is a variational upper bound to an exact state energy; parametrizing one or more coordinates in the qubit Hamiltonian by spin coherent states; and providing a solution, wherein the solution to the problem comprises an eigenvalue of the qubit Hamiltonian.

In some embodiments, the solution to the problem is provided to a user. In some embodiments, the method further comprises directing the qubit Hamiltonian to be embedded on the quantum computer of aspect or embodiment disclosed herein. In some embodiments, the method further comprises receiving the solution from the quantum computer of any aspect or embodiment disclosed herein. In some embodiments, the method further comprises simulating the quantum computer of any aspect or embodiment disclosed herein.

In some embodiments, the parameterizing comprises an expression in spherical polar coordinates on the Bloch sphere. In some embodiments, the parameterizing in spin coherent states comprises the following:

$$|\Omega\rangle = \cos^{2J}\left(\frac{\theta}{2}\right)\exp\left[\tan\left(\frac{\theta}{2}\right)e^{i\phi}\hat{S}_-\right]|JJ\rangle,$$

$$|\Omega\rangle = \sum_{M=-J}^{J}\binom{2J}{M+J}^{1/2} \times \cos^{J+M}\left(\frac{\theta}{2}\right)\sin^{J-M}\left(\frac{\theta}{2}\right)e^{i(J-M)\phi}|JM\rangle.$$

In some embodiments, the solution is a local minimum. In some embodiments, the solution is a global minimum. In some embodiments, the parametrizing the one or more coordinates comprises expressing the qubit Hamiltonian in Pauli Z rotations. In some embodiments, the parametrizing comprises a QUBO, k-local Ising model, or HOBO model. In some embodiments, the parametrizing comprises either an operation of one or more quantum logic gates. In some embodiments, the Hamiltonian comprises a qubit coupled cluster Hamiltonian. In some embodiments, the method further comprises transforming the qubit cluster Hamiltonian as $H_e+\sin(t_1)/2$ $(T_1 H_e - H_e T_1) + (1-\cos(t_1))/2$ $(T_1 H_1 - H_e)$. In some embodiments, the qubit coupled cluster Hamiltonian comprises a set of entanglers parametrized by spin coherent states. In some embodiments, the set of entanglers comprises one or a plurality of Pauli Words. In some embodiments, the method further comprises selecting Pauli Words which reduce a value of the one or a plurality of eigenvalues to form a subset of entanglers. In some embodiments, the subset of entanglers is expressed as Pauli z-rotations. In some embodiments, the method further comprises folding a domain of optimization of the qubit Hamiltonian in amplitude or phase.

In another aspect, a non-transitory computer readable storage medium with instructions stored thereon is provided. In some embodiments, the instructions when executed by a quantum computer may be configured to perform the methods above. In some embodiments, the instructions when executed by a classical computer may be configured to perform the methods above on a quantum computer. In some embodiments, the non-transitory computer readable storage medium may comprise a classical storage unit. In some embodiments, the non-transitory computer readable storage medium may be quantum storage unit. In some embodiments, the instructions when executed may be configured to provide the solution to a user.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 15 also shows results for the QMF method, spin constrained QMF method, and the exact potential energy surface

FIG. 17 also shows results for the QMF method, spin constrained QMF method, and the exact potential energy surface

DETAILED DESCRIPTION

Figure 1:
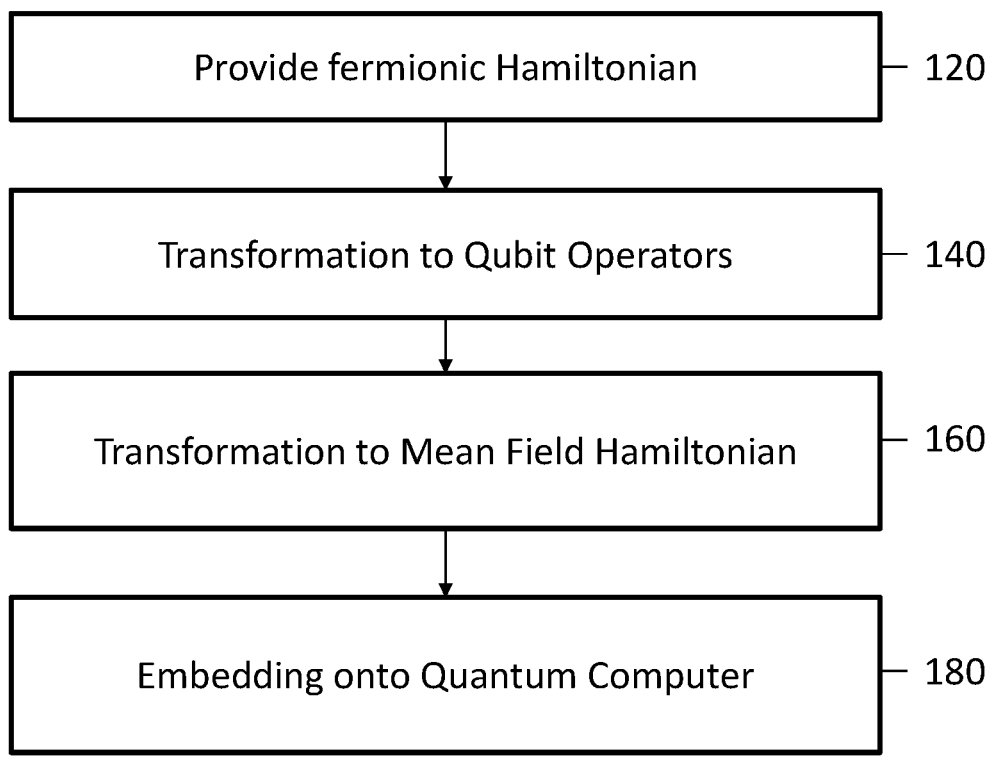
FIG. 1 shows an example method for solving a problem.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Incorporation by reference is expressly limited to the technical aspects of the materials, systems, and methods described in the mentioned publications, patents, and patent applications and does not extend to any lexicographical definitions from the publications, patents, and patent applications. Any lexicographical definition appearing in the publications, patents, and patent applications that is not also expressly repeated in the instant disclosure should not be treated as such and should not be read as defining any terms appearing in the accompanying claims.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Classical computers represent information in binary variables as 0 and 1, called bits, and perform gate operations upon these bits in certain combinations to represent numerical data. A qubit as described herein is also a two state system; however, rather than a conventional bit which is either zero or one, a qubit may comprise a quantum mechanical superposition of both 0 and 1. The superposition potentially allows more information to be encoded than a classical bit. Additionally, a quantum computer may compute transformations (e.g. gate operations) on the superposition, which may result in significant increases in processing speed as a result of inherent parallelization.

This inherent parallelization can be used to reduce the computation cost of some computations. In an example, computer simulations can be made of, for example, protein folding, quantum systems, ecological habitats, economic processes, etc. In particular aspects, quantum computers may reduce the computational cost of calculations concerning the electronic structure of molecules. Chemical electronic structure calculations solve for the eigenstates of an interacting, many-body fermionic Hamiltonian. These problems are challenging in several aspects. Importantly, computational cost of quantum simulations using classical computers and conventional numerical methods suffer from poor scaling with system size (exact solutions scale exponentially and approximate solutions may scale poorly and may provide insufficient accuracy); however, a quantum computer may be able to simulate quantum systems with relatively high accuracy and in polynomial time.

The present disclosure provides methods and systems to transform the fermionic Hamiltonian and embed it into quantum computer in such a way that the number of qubits used to solve a problem is reduced. In an example, the problem may comprise an electronic structure problem. The problem may comprise a quantum chemical problem. The problem may comprise a quantum mechanical simulation of a molecular system. Solution to such problems may comprise the structure and/or properties of matter. Example properties include but are not limited to absolute and relative energies, ground states, excited states, ionization potentials, charge density distributions, dipoles, higher-multipole moments, polarizability tensors, HOMO-LUMO gaps, ionization potentials, isoelectronic surfaces, infrared spectra, ultraviolet-visible (UV-Vis) spectra, spectra in any other energy range of the electromagnetic spectrum, vibrational frequencies, reactivities, collision cross sections, thermodynamic properties, potential energy surfaces, bond energies, bond lengths, bond angles, rates of reaction, and time evolution of the preceding properties including for example: charge transport, adiabatic chemical dynamics, vibronic coupling, folded space optimization, and various calculation steps thereof.

Although specific examples of fermionic Hamiltonians are described herein, the methods and systems disclosed herein may be applicable to the solution of any fermionic Hamiltonian. A fermionic Hamiltonian can be formulated to solve a problem of any of the following non-limiting examples: in the field of quantum chemistry, for drug discovery, for optoelectronic materials discovery, to determine an optimum emitter material based on the HOMO-LUMO gap, for economic modeling, for protein folding applications, etc.

The methods and systems disclosed herein are applicable to Hartree-Fock calculations; however, the methods and systems disclosed herein can also be applied to post-Hartree-Fock calculations, to density functional theory (DFT) calculations, to time-dependent Hartree-Fock calculations, to time dependent density functional theory (TD-DFT) calculations, or to other types of quantum chemical calculation.

The methods disclosed herein can in principal be performed on any computer, for example those disclosed herein, which is capable of performing or simulating the performance of the qubit operations used to perform that method. Systems and methods disclosed herein with respect to solution of an Ising or quadratic unconstrained boundary optimization (QUBO) type problem may be performed on a quantum annealer or a computer operable to simulate a quantum annealer (e.g. a simulated annealer). Systems and methods disclosed herein with respect to solution of a problem using a qubit mean-field ansatz can be performed or adapted to be performed on any quantum computer or a computer operable to simulate the qubit operations (e.g. gate operations, etc.) of a quantum computer.

A "qubit" as defined herein is a unit of quantum information encoded in a physical system. Information may be encoded by any physical system capable of the quantum effects of superposition between quantum states and entanglement with one or more qubits. A qubit has a probability of being in a state 0 and a probability of being in a state 1. A state of a qubit can be represented as a linear combination of states 0 and 1 scaled by coefficients, where the square of the coefficient is the probability of measuring the corresponding state. Additionally or alternatively, the state of a qubit can be viewed as a vector on the Bloch sphere where the north and south poles of the sphere comprise the states 0 and 1. One can view changes in the relative probability of each state as rotations of the vector on the Bloch sphere. Physical implementations of qubits include superconducting charge qubits, superconducting flux qubits, superconducting phase qubits, nuclear spin states, atomic spins states, electron spin states, electron number states, squeezed states of light, polarization encoded photons, quantum dot spin states, etc.

A "quantum logic gate" as defined herein is any device or processes which can perform a logic operation on a qubit as part of a quantum circuit. Typically quantum logic gates can be represented as unitary matrices. Logic operations on the set of qubits typically include superposition gates and entanglement gates. Superposition gates act upon a qubit to achieve a superposition and/or change the relative probability of each of the two pole states. Superposition gates include Pauli Operators (X, Y, Z), Hadamard gates, and Pauli rotation gates, etc. Entanglement gates couple two or more qubits. Examples of entanglement gates comprise for example cZ gates, CNOT gates, etc. Varying types of quantum computers may be capable of all or a subset of the gates listed herein. Other types of gates not listed herein may be possible.

A "Pauli word" as defined herein is any product of one or more Pauli operators of different qubits. In some examples, a Pauli word $\hat{P}_I$ may be represented by the following relation:

$$\hat{P}_1 = \ldots \hat{\omega}_P^{(I)} \hat{\omega}_R^{(I)}$$

The term $\hat{\omega}_R^{(I)}$ may comprise one of the x, y, z Pauli operators for the $r^{th}$ qubit. In some cases, the Pauli word may be a generator. The generator may be a generator of entanglement. The entanglement operator may take the form of a Unitary operator parameterized as follows: $\hat{U}_{ENT} = e^{-i\tau \hat{P}_1}$. In some cases, the Pauli word comprises a product of two Pauli operators for two qubits. In some cases, the Pauli Word may be of the form $x_P x_R$, $x_P z_R$, $z_P z_R$, $x_P y_R$, $y_P z_R$, $y_P y_R$, $z_P z_R$, etc. where P and R are qubit indices and P does not equal R. In some cases, the Pauli word comprises a product of three Pauli operators. In some cases, the Pauli word comprises a product of four Pauli operators. The Pauli word may be a product of less than 5 Pauli operators, less than 10 Pauli operators, or less than 100 Pauli operators. The amplitude $\tau$ may be related to the microwave pulse duration. In some cases, it may be the time evolution of the unitary operator, which may fictitious in some cases. It may be the amplitude of a rotation gate within the entanglement operator. Every entanglement operator may comprise a different amplitude.

A "quantum computer" or "quantum processing unit (QPU)" as defined herein is any device that harnesses one or more quantum effects (e.g. superposition, entanglement, etc.) to perform a computation. A quantum computer as used herein may be any non-classical computer. A non-classical computer may be capable of using one or more quantum effects to perform a computation but may not be a universal quantum computer, as disclosed herein below. A quantum computer may comprise one or a plurality of qubits. For instance, a quantum computer may comprise at least about 1, 2, 3, 4, 5, 6, 7, 8, 9, 10, 20, 30, 40, 50, 60, 70, 80, 90, 100, 200, 300, 400, 500, 600, 700, 800, 900, 1,000, or more qubits. A quantum computer may comprise at most about 1,000, 900, 800, 700, 600, 500, 400, 300, 200, 100, 90, 80, 70, 60, 50, 40, 30, 20, 10, 9, 8, 7, 6, 5, 4, 3, 2, or 1 qubits. A quantum computer may comprise a number of qubits that is within a range defined by any two of the preceding values. In some embodiments, a quantum computer may comprise a quantum processing unit comprising one or a plurality of qubits. In the so-called "circuit model" of quantum computing, a quantum computer can be viewed as performing a set of logic operations on a set of qubits for the purpose of solving a problem. A quantum computer may comprise operations for manipulating the superposition and/or entanglement of the qubits. Such operations may comprise electrical pulses, photons, etc. Additionally or alternatively, the potential energy of the qubit may be controllably varied. The potential energy may comprise biases (one-qubit terms) and coupling terms (two or more qubit terms). Varying forms of quantum computers have been proposed and realized, among which include universal quantum computers and quantum annealers. Example quantum computers include IBM's Q, D-Wave's Q2000, Fujitsu's Digital Annealer, 19Q-Acorn by Rigetti, Xanadu's quantum photonic processors, etc.

In some embodiments, a quantum computer may comprise one or more adiabatic quantum computers, quantum gate arrays, one-way quantum computers, topological quantum computers, quantum Turing machines, superconductor-based quantum computers, trapped ion quantum computers, trapped atom quantum computers, optical lattices, quantum dot computers, spin-based quantum computers, spatial-based quantum computers, Loss-DiVincenzo quantum computers, nuclear magnetic resonance (NMR) based quantum computers, solution-state NMR quantum computers, solid-state NMR quantum computers, solid-state NMR Kane quantum computers, electrons-on-helium quantum computers, cavity-quantum-electrodynamics based quantum computers, molecular magnet quantum computers, fullerene-based quantum computers, linear optical quantum computers, diamond-based quantum computers, nitrogen vacancy (NV) diamond-based quantum computers, Bose-Einstein condensate-based quantum computers, transistor-based quantum computers, and rare-earth-metal-ion-doped inorganic crystal based quantum computers. A quantum computer may comprise one or more of: quantum annealers, Ising solvers, optical parametric oscillators (OPO), and gate models of quantum computing.

A "universal quantum computer" as defined herein is a quantum computer that can simulate the operation of any other quantum computer. In some cases, a quantum computer, which may not be a universal quantum computer, may be capable of simulating a gate operation which it may not be capable of performing directly. Methods disclosed herein may be performed by any quantum computer which includes or is capable of simulating a specified operation. Methods disclosed herein may, by definition, be performed by a universal quantum computer.

A "quantum annealer" as defined herein is a computer operable to solve a problem in the form of a binary optimization problem. In some cases, the quantum annealer may be limited to X and Z gates. In some cases, to perform the annealing process, X operators may be used to push qubits into a superposition, and then, in some cases, may not be used again on the qubits. Quantum annealers may be limited to solving binary optimization problems in the form, for example, of an Ising model or a QUBO problem. However, despite potential limitations, quantum annealers may be more accurate and faster with current hardware. In some cases, methods described herein may be performed on a quantum annealer.

In some cases, methods described herein may be performed on a classical computer using quantum inspired algorithms. For example, methods described herein may be performed on a simulated annealer. In some cases, a classical computer (e.g. CPU, GPU, FPGA, Asyc, etc.) that runs a particular process (simulated annealing, parallel tempering, simulated quantum annealing) may also be capable of solving the ground state configuration of the Ising, QUBO or high order binary optimization (HOBO) problem. These quantum inspired algorithms may receive the same or similar Ising, QUBO or HOBO model and may solve the ground state using various methods. In some cases, these methods may comprise simulated annealing. Simulated annealing uses classical thermal fluctuations to guide the qubit Hamiltonian represented in Pauli Z rotations to the ground state energy. In some cases, simulated annealing may be performed without using quantum effects. These methods may or may not be more efficient than methods used in quantum annealers.

Methods and Systems for Solving a Problem:

Described herein in certain embodiments is a system operable to solve a problem. The system may comprise a quantum computer comprising a plurality of qubits, a qubit Hamiltonian, wherein one or more coordinates in the qubit Hamiltonian comprises a parametrization in spin coherent states, wherein the parametrization comprises either an operation of one or more quantum logic gates or an expression of the qubit Hamiltonian in Pauli Z rotations; wherein the Hamiltonian is embedded on the quantum computer; wherein one or more eigenvalues of the qubit Hamiltonian is a variational upper bound to an exact energy; and wherein a lower eigenvalue of the qubit Hamiltonian comprises a solution to the problem.

Also described herein in certain embodiments is a method of solving a problem on a quantum computer. The method may comprise: providing a qubit Hamiltonian, wherein one or more eigenvalues of the qubit Hamiltonian is a variational upper bound to an exact state energy; parametrizing one or more coordinates in the Hamiltonian by spin coherent states, wherein parametrizing the one or more coordinates comprises either an operation of one or more quantum logic gates or expressing the qubit Hamiltonian in Pauli Z rotations; embedding the qubit Hamiltonian on the quantum computer; and determining a lower eigenvalue of the qubit Hamiltonian, wherein the lower eigenvalue comprises a solution to the problem.

Also, described herein in certain embodiments is a system operable to solve an electronic structure problem, the system comprising: a quantum computer comprising a plurality of qubits, wherein a given qubit of the plurality of qubits comprises a bias and a coupling between the given qubit and another qubit; wherein the bias and coupling of the given qubit of the plurality of qubits comprise parameters in a reduced Hamiltonian; wherein the reduced Hamiltonian comprises a transformation of a qubit mean-field Hamiltonian, and wherein one or more eigenvalues of the qubit mean-field Hamiltonian is a variational upper bound to an exact energy; and wherein a lower eigenvalue of the reduced Hamiltonian comprises a solution to the electronic structure problem.

Also, described herein in certain embodiments is a method of solving a problem on a quantum computer, the method comprising: providing the quantum computer, wherein the quantum computer comprises a plurality of qubits, and wherein a given qubit of the plurality of qubits comprises a bias and a coupling between the given qubit and another qubit; providing a qubit mean-field Hamiltonian; transforming the qubit mean-field Hamiltonian to generate a reduced Hamiltonian, wherein one or more eigenvalues of the qubit mean-field Hamiltonian is a variational upper bound to an exact energy; embedding the reduced Hamiltonian on the quantum computer, wherein the bias and coupling of the given qubit of the plurality of qubits comprise parameters in the reduced Hamiltonian; and determining a lower eigenvalue of the reduced Hamiltonian, wherein the lower eigenvalue comprises a solution to the electronic structure problem.

Also described herein in certain embodiments is a method of solving a problem on a quantum computer, the method comprising: providing a qubit mean-field Hamiltonian, wherein one or more eigenvalues of the qubit mean-field Hamiltonian is a variational upper bound to an exact energy; providing a qubit mean-field ansatz, wherein the ansatz is parameterized by one or more spin coherent states; embedding the qubit mean-field Hamiltonian on the quantum computer; and using the qubit mean-field ansatz to determine a lower eigenvalue of the qubit mean-field Hamiltonian, wherein the lower eigenvalue comprises a solution to the problem.

Example matter may include atoms, molecules, and groups of atoms and/or molecules. Molecules may comprise main group elements, transition metal elements, post-transition metal elements, etc. Example matter includes extended states of matter including condensed matter. Molecules may comprise polymers, molecular crystals, organometallic compounds, small molecules, organic compounds, materials for organic photovoltaics, optoelectronic materials, etc. Optoelectronic materials may be used in the manufacture of light emitting diodes, for example organic light emitting diodes. Examples of such materials include organic materials, such as small molecule organic materials and organic polymers. Examples of suitable organic materials include polycyclic aromatic compounds including organic molecules which may optionally include one or more heteroatoms, such as nitrogen (N), sulfur (S), oxygen (O), phosphorus (P), fluorine (F), and aluminum (Al). Examples of organometallic compounds include organometallic complexes or metal coordination complexes. Examples of such complexes include those formed by a metallic coordination center and ligands surrounding the coordination center. Examples of an atom or ion which may form the coordination center include, but are not limited to, iridium (Ir), Zn, rhodium (Rh), Al, beryllium (Be), rhenium (Re), ruthenium (Ru), boron (B), P, Cu, osmium (Os), gold (Au), and platinum (Pt). In complexes or metal coordination complexes, a dative bond may be formed between the coordination center and one or more atoms of the surrounding ligands. Examples of bonds which may be formed between the coordination center and one or more atoms of the surrounding ligands include, but are not limited to, those formed between a metallic atom of the coordination center and carbon, nitrogen, or oxygen. Specifically, examples of such bonds include those formed between Al and O, Al and N, Zn and O, Zn and N, Zn and C, Be and O, Be and N, Ir and N, Ir and C, Ir and O, Cu and N, B and C, Pt and N, Pt and O, Os and N, Ru and N, Re and N, Re and O, Re and C, Cu and P, Au and N, Os and C, etc. Other example bonds may include those of organic compounds, such as C and C, C and N, C and O, C and H, C and P, O and H, N and H, O and N, etc. Example molecules include fullerenes. Fullerenes may comprise C60, C70, C76, C84, single-wall carbon nanotubes, multi-wall carbon nanotubes, and any combination thereof. Optoelectronic materials may comprise quantum dots.

Shown in FIG. 1, a method 100 of solving a problem may include providing a fermionic Hamiltonian 120, transformation of the fermionic Hamiltonian to qubit operators 140, transformation of the fermionic Hamiltonian in qubit operators to a mean-field Hamiltonian 160, and embedding the mean-field Hamiltonian onto a quantum computer 180. Such a method may improve upon existing methods for solving electronic structure problems on a computer by adapting the problem to available hardware, reducing computational cost, and reducing the number of qubits used to solve electronic structure problems for larger number of atoms.

Figure 2:
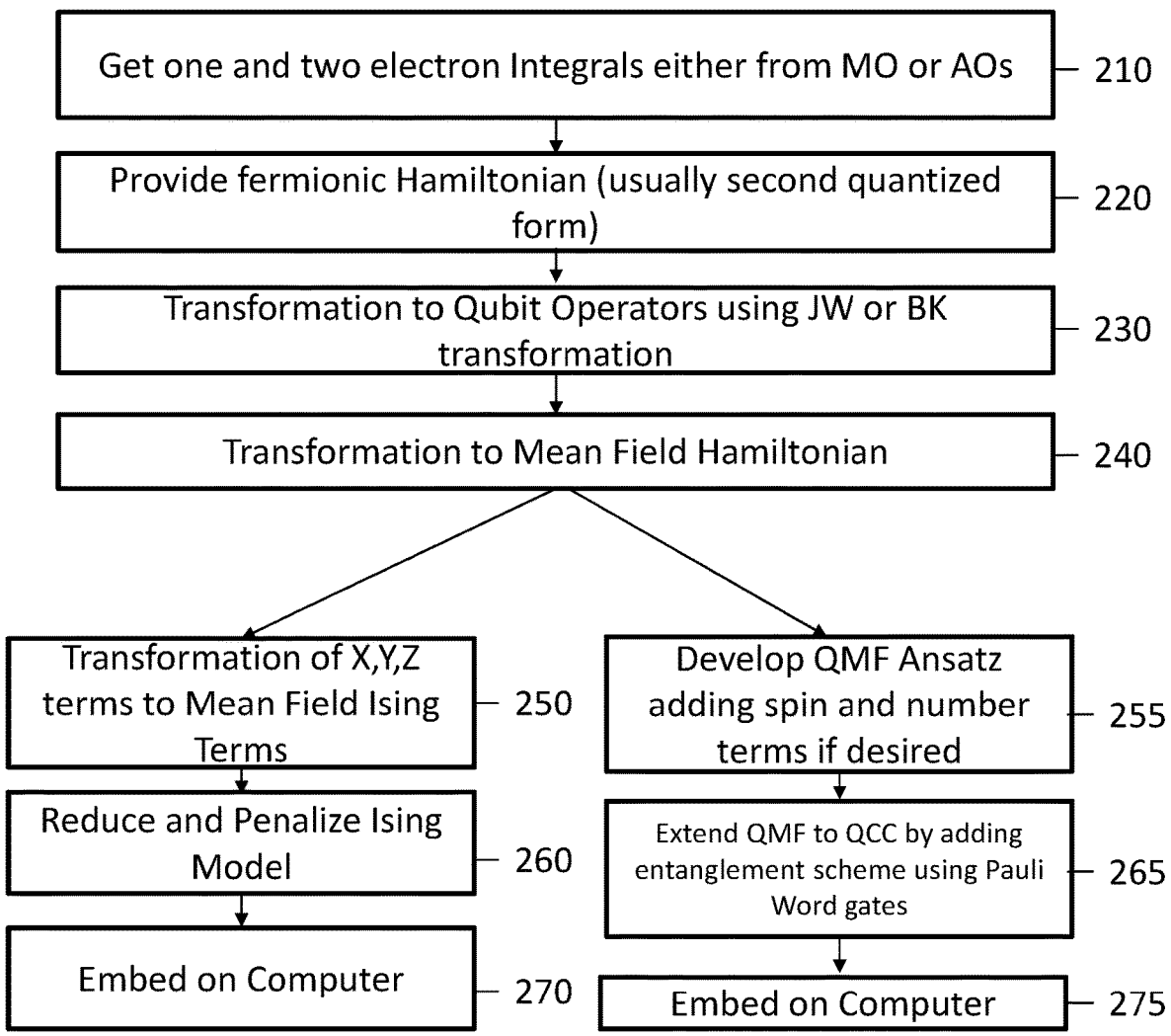
FIG. 2 shows an implementation of the method of FIG. 1.

Fermionic Hamiltonian:

Shown in FIG. 2 is example implementation 200 of the method of FIG. 1. Operation 120 in a method 100 may comprise operations 210 and 220 of the method 200. Operation 210 may comprise expressing the one and two electron integrals in a basis which may be convenient for computation. In some cases, the computation basis may be derived from Fock-orbitals, molecular orbitals, or atomic orbitals. Basis functions may be provided from any of for example, Gaussian-type orbitals, Slater-type orbitals, numerical atomic orbitals, etc. The basis set may comprise a minimal basis set such as for example, STO-3G, STO-4G, and STO-nG, where n is an integer. The integer n may comprise for example, an integer of at least about 1, 2, 3, 4, 5, 6, 7, 8, 9, 10, 20, 30, 40, 50, 60, 70, 80, 90, 100, or more, an integer of at most about 100, 90, 80, 70, 60, 50, 40, 30, 20, 10, 9, 8, 7, 6, 5, 4, 3, 2, or 1, or an integer that is within a range defined by any two of the preceding values. The Slater-type basis sets may comprise polarized versions. The basis set may comprise a split valence basis set such as a Pople basis set, for example, 3–21G, 3–21G*, 3–21G**, 3–21+G, 3–21++G, 3–21+G*, 3–21+G**, 4–21G, 4–31G, 6–21G, 6–31G, 6–31G*, 6–31+G*, 6–31G(3df, 3pd), 6–311G, 6–311G*, 6–311+G*, etc. The basis set may comprise a Dunning type basis set for example, cc-pVDZ, cc-pVTZ, cc-pVQZ, cc-pV5Z, aug-cc-pVDZ, cc-pCVDZ, etc.

Operation 220 may comprise providing the fermionic Hamiltonian. A fermionic Hamiltonian may be derived from multiple sources. One example may be the second order, fermionic Hamiltonian, shown below.

$$\hat{H} = \sum_{i,j} h_{i,j} a_i^\dagger a_j + \frac{1}{2} \sum_{i,j,k,l} h_{i,j,k,l} a_i^\dagger a_j^\dagger a_k a_l$$

However, in some cases, higher or lower order Hamiltonians may be provided. The terms and $h_{i,j,k,l}$ may be defined as follows:

$$h_{i,j} = \int \psi_i^*(x) \hat{h} \psi_j(x) dx,$$

$$h_{i,j,k,l} = \int \psi_i^*(x_1) \psi_j^*(x_2) \frac{1}{r_{1,2}} \psi_k(x_1) \psi_l(x_1) dx_1 dx_2$$

where $\hat{h}$ is the one-electron Hamiltonian $$\hat{h} = -\frac{1}{2} \nabla_r^2 - \sum_\alpha \frac{z_\alpha}{|r - R_\alpha|}.$$

In some cases, the one and two electron integrals may be computed on a classical computer and pushed to the quantum computer. In other cases, the one and two electron integrals are calculated on the quantum computer.

A classical computer of the present disclosure is described further with reference to the section "classical control systems".

Transformation of the Fermionic Hamiltonian to a Qubit Representation:

At operation 230 of method 200 the fermionic Hamiltonian may be expressed in qubit operators rather than in a fermionic representation by with a basis transformation. Operation 230 can include an embodiment, variation, or example of operation 160 of the method 100. After such a transformation, finding the eigenstates of the qubit Hamiltonian may be tantamount to solving the quantum chemistry problem. At least two example methods for transforming the Hamiltonian are provided herein, the Jordan-Wigner transformation and the Bravyi-Kitaev method; however, additional methods of transforming the Hamiltonian may be possible. The resulting qubit Hamiltonian may be a linear equation comprising Pauli operators of X, Y, and Z and may maintain the size of the Hilbert space of $2^k$, where k is a number of single-particle states. In some cases, the Hamiltonian is of second quantization form as shown above.

In a first example, the creation and annihilation operators may be mapped to operations on the qubits as Pauli rotation operators, below:

$$\hat{Q}+|1\rangle\langle 0|=\frac{1}{2}(\sigma^x - i\sigma^y); -\hat{Q}+|1\rangle\langle 1|=\frac{1}{2}(\sigma^x - i\sigma^y)$$

In the occupation number basis, each qubit may store the occupation number of an orbital indexed by the qubit; however, other bases are possible. This mapping of interacting fermions to spin operators comprises the Jordan-Wigner transformation. In some cases, the Jordan-Wigner representation may result in non-locality of the parity operator.

In a second example, the creation and annihilation operators may be transformed by encoding fermionic states in a parity basis rather than an occupation number basis. However, the scaling of the number of qubit operations to simulate a single fermionic operation may be the same or similar in both the parity basis and the occupation number basis (e.g. scale with O(k), where k is the number of single particle states). In some cases, the parity basis may result in non-locality of the occupation number operator.

In a third example, qubits may store partial sums of occupation number and parity. In one such example, the Bravyi-Kitaev basis may reduce the number of qubit operations used to simulate a single fermionic operator to O(log k), as detailed in Seeley (J. T. Seeley, M. J. Richard, and P. J. Love, J. Chem. Phys. 137, 224109 (2012)), which is herein incorporated by reference in its entirety. Such a method may combine both aspects of the parity basis and the number basis, such that both the parity and the number operator may be evaluated on a reduced set of qubits which may be updated for any single operation. The partial sum may be evaluated up to an index containing a full parameterization of the number and the parity operator of the qubit operated on.

Operation 160 of the method 100 may comprise operation 240 of the method 200. At an operation 240 of the method 200, the mean-field Hamiltonian may be transformed to the qubit representation by a method similar to those disclosed herein with respect to operation 230. By any method disclosed herein, the qubit Hamiltonian $\hat{H}$ assumes the general form:

$$\hat{H} = \sum_I C_I \hat{T}_I$$

where molecular-integrals may depend on coefficients $C_I$ and operators $T_I$ which may be products of qubit spin operators $\hat{T} = \omega_1 \ldots \omega_m$, $0 \le m \le n$, where n is the number of qubits. Coefficients $C_I$ may be spatially dependent. The qubit Hamiltonian derived via methods described herein may be isospectral to the fermionic Hamiltonian, such that every eigenvalue of the qubit Hamiltonian is an eigenvalue of the fermionic Hamiltonian. The qubit Hamiltonian may comprise a spin orbital Hamiltonian.

Spin Coherent States

A spin coherent state, also called a "Bloch state" or a "Bloch Coherent State", for a single particle with spin J (J≥0 is integer of half-integer) is defined by the action of an appropriately scaled exponent of the lowering operator $\hat{S}_-$ onto the normalized eigenfuction of $\hat{S}_z$ operator, $\hat{S}_z|JM\rangle = M|JM\rangle$, with maximal projection M=J:

$$|\Omega\rangle = \cos^{2J}\left(\frac{\theta}{2}\right)\exp\left[\tan\left(\frac{\theta}{2}\right)e^{i\phi}\hat{S}_-\right]|JJ\rangle =$$

$$\sum_{M=-J}^{J}\binom{2J}{M+J}^{1/2} \times \cos^{J+M}\left(\frac{\theta}{2}\right)\sin^{J-M}\left(\frac{\theta}{2}\right)e^{i(J-M)\phi}|JM\rangle.$$

$|JM\rangle$ normalized as:

$$|JM\rangle = \binom{2J}{M+J}^{1/2}[(J-M)!]\hat{S}_-^{J-M}|JJ\rangle$$

The above constitutes an (over)complete non-orthogonal set of states on a unit sphere parameterized by spherical polar angles, $\Omega=(\phi, \theta)$, $0 \leq \phi \leq 2\pi$, $0 \leq \theta \leq \pi$.

After expressing the Hamiltonian in qubit operators, a set of gate operations used to perform the calculation may be provided. Such a method may comprise an order of gate operations implementable by a quantum computer. Implementation of such a set of operations may be tailored specifically to the type of quantum computer and to the type of calculation to be performed. Disclosed herein are various examples for solving an electronic structure problem.

Ising and/or QUBO-Type Reduced Hamiltonian:

A method of solving an electronic structure problem using a quantum annealer is provided. In such an example, the mean-field Hamiltonian may be transformed into an Ising model. In some embodiments, the Ising model may be further transformed into a quadratic unconstrained boundary optimization (QUBO) problem. In some embodiments, any binary optimization problem may be solved. Such problems may be performed on a quantum annealer such as D-Wave; however, methods of the present disclosure may also be performed on universal gate quantum computers. A quantum annealer may be limited to the operation of X (or Y) and Z gates. Future quantum annealers may be able to simulate the actions of other gates, so the use of X and Z gates only is not considered to be limiting. Quantum annealers may be able to solve the ground state energy of a qubit Hamiltonian that includes Pauli X, Y, and Z terms which such Hamiltonian is sometimes referred to as a non-stochastic Hamiltonian.

The qubit mean-field Hamiltonian described above may assume the general form of a high order Ising model. In such a transformation, the X, Y, and Z terms may be transformed to mean-field Ising terms. Methods such as the parameterization of the spin-½ Hilbert space in spin coherent states can be used to perform transformation. In some embodiments, a functional is proposed herein based on using the spherical coordinates of the Bloch sphere associated with the spin J of a single particle. In some cases, a quantum computer may comprise qubits which each have single particle spin, thus in a qubit mean-field Hamiltonian, X, Y, and Z terms can be represented as functions of Z operators and their spherical rotations. In some cases, the single particle spin is $J=½$. In some embodiments, $X \to \cos\varphi \sin\theta$, $Y \to \sin\varphi \sin\theta$, and $Z \to \cos\theta Z$, where the domains of $\theta$ and $\varphi$ are $[0,\pi/2]$ and $[0,2\pi]$ respectively. In other embodiments, additional transformations can be performed, such that: $X_i \to \cos\varphi_i \sin\theta_i Z_j$, $Y_i \to \sin\varphi_i \sin\theta_i Z_k$, and $Z_i \to \cos\theta_i Z_i$, where additional Z terms are introduced through the transformation of the X and Y terms into Ising terms. In this case, the domains of $\theta$ and $\varphi$ are now $[0,\pi/2]$ and $[0,\pi/2]$ respectively. In some embodiments, it may be beneficial to transform X into the quantum mean field and add the additional Ising terms, while transforming Y into the quantum mean field, but not adding the additional Ising terms. In other cases the reverse may be true. Transforming the Pauli Z term into the quantum mean field with the Ising term Z may be used over other transformations in many quantum mean field cases.

In some cases, parameterization of the spin-½ Hilbert space in spin coherent states may be followed by domain folding techniques, as described elsewhere herein, for example in the section entitled "Domain Folding Approach". For example, the following transformation is performed with relation to the cluster amplitudes $\tau$:

$$\sin(2\tau_i) \to Z_j \sin(2\tau_i)$$

$$(1-\cos(2\tau_i)) \to (1-Z_k \cos(2\tau_i))$$

Where the Z terms are new spin variables (Pauli Z operators) and their indices j, k are j=number of qubits in QMF Hamiltonian+i and k=j+i. With this transformation the domain for the cluster amplitude $\tau$ is reduced to $[0,\pi/2]$. In some embodiments, the first transformation may be performed on the Ising Hamiltonian, in which case the domain of the cluster amplitude is $[0,\pi]$.

In some cases, higher than second order Pauli Z terms in the Hamiltonian may be identified. The qubit Hamiltonian produced by the Jordan-Wigner or Bravyi-Kitaev transformation may contain two or more Pauli Z, X, Y, or I terms. When the transformation in the previous paragraph is applied, the number of Pauli Z terms in a summation may be greater than 2. In this case the Hamiltonian is identified as higher than second order. In this case the Pauli Z operator can be reduced to be a variable that has the two possible values of $\{-1,1\}$ since these are the two eigenvalues of the Pauli Z matrix.

Additionally, appropriate substitutions may be developed using auxiliary terms to produce a quadratic Ising model. In this case, Ising summation terms which have more than 2 Ising terms (more than 2 Pauli Z terms multiplied together), an auxiliary term can be used. In one example, the higher order term contains $z_1 z_2 z_3$, so the substitution of $z_4 = z_2 z_3$ is performed which yields a new term, $z_1 z_4$, where the condition $z_4 = z_2 z_3$ is held for all used results of the annealing process. In this example, a penalty (e.g. cost) function may be added into the Hamiltonian which would hold the $z_4 = z_2 z_3$ term. These steps may also be referred to as reduction and penalization steps. The Ising or QUBO model may be reduced and penalized by the same method as above.

In an example, if the qubit Hamiltonian is $H = hX_0 Y_1 Z_2$, where 0, 1, and 2 are arbitrary qubit indices, the subsequent reduced Hamiltonian would be: $H = h^*\cos(\varphi_0)\sin(\theta_0)\sin(\varphi_1)\sin(\theta_1)\cos(\theta_2)Z_2$. The method removes the X and Y Pauli operators completely from the expression, so $Z_2$ operators remain. The may take advantage of the fact that the QPU may not be able to perform true X or Y measurements. In this specific example, if the X and Y terms were to be transformed such that $X_i \to \cos\varphi_i \sin\theta_i Z_j$, $Y_i \to \sin\varphi_i \sin\theta_i Z_k$, the resulting Hamiltonian would be: $H = h^*\cos(\varphi_0)Z_3 \sin(\theta_0)\sin(\varphi_1)Z_4 \sin(\theta_1)\cos(\theta_2)Z_2$. This may take advantage of other symmetries in the quantum mean field Hamiltonian so that the time to solve the problem is reduced by reducing the size of the domain of $\varphi$.

A specific example for 4 qubit $H_2$ is as follows. Pre-transformation the Hamiltonian may be proportional to the following:

$$H \alpha Z_0 + Z_0 + Z_1 + Y_0 Z_1 Y_2 + X_0 Z_1 X_2 + X_0 Z_1 X_2 Z_3 + Y_0 Z_1 Y_2 Z_3 + Z_2 + Z_0 Z_2 + Z_1 Z_2 Z_3 + Z_0 Z_1 Z_2 Z_3 + Z_0 Z_1 Z_2 + Z_0 Z_2 Z_3 + Z_1 Z_3$$

Post-transformation the reduced Hamiltonian may be proportional to the following:

$$H \alpha Z_0 \cos(\theta_0) + Z_0 \cos(\theta_0) Z_1 \cos(\theta_1) + Z_1 \cos(\theta_1) + \sin(\varphi_0)\sin(\theta_0) Z_1 \cos(\theta_1)\sin(\varphi_2)\sin(\theta_2) + \cos(\varphi_0)\sin(\theta_0) Z_1 \cos(\theta_1)\cos(\varphi_2)\sin(\theta_2) + \cos(\varphi_0)\sin(\theta_0) Z_1 \cos(\theta_1)\cos(\varphi_2)\sin(\theta_2) Z_3 \cos(\theta_3) + \sin(\varphi_0)\sin(\theta_0) Z_1 \cos(\theta_1)\sin(\varphi_2)\sin(\theta_2) Z_3 \cos(\theta_3) + Z_0 \cos(\theta_0) Z_2 \cos(\theta_2) + Z_1 \cos(\theta_1) Z_2 \cos(\theta_2) Z_3 \cos(\theta_3) + Z_0 \cos(\theta_0) Z_1 \cos(\theta_1) Z_2 \cos(\theta_2) Z_3 \cos(\theta_3) + Z_0 \cos(\theta_0) Z_1 \cos(\theta_1) Z_2 \cos(\theta_2) + Z_0 \cos(\theta_0) Z_2 \cos(\theta_2) Z_3 \cos(\theta_3) + Z_1 \cos(\theta_1) Z_3 \cos(\theta_3).$$

In this specific example, if the X and Y terms were to be transformed such that $X_i \to \cos \varphi_i \sin \theta_i Z_j$, $Y_i \to \sin \varphi_i \sin \theta_i Z_k$, the Post-transformation Hamiltonian may be proportional to the following:

$$H \alpha Z_0 \cos(\theta_0) + Z_0 \cos(\theta_0) Z_1 \cos(\theta_1) + Z_1 \cos(\theta_1) + \sin(\varphi_0) Z_4 \sin(\theta_0) Z_1 \cos(\theta_1)\sin(\varphi_2) Z_5 \sin(\theta_2)\cos(\varphi_0) Z_6 \sin(\theta_0) Z_1 \cos(\theta_1)\cos(\varphi_2) Z_7 \sin(\theta_2) + \cos(\varphi_0) Z_6 \sin(\theta_0) Z_1 \cos(\theta_1)\cos(\varphi_2) Z_7 \sin(\theta_2) Z_3 \cos(\theta_3) + \sin(\varphi_0) Z_4 \sin(\theta_0) Z_1 \cos(\theta_1)\sin(\varphi_2) Z_5 \sin(\theta_2) Z_3 \cos(\theta_3) + Z_2 \cos(\theta_2) + Z_0 \cos(\theta_0) Z_2 \cos(\theta_2) + Z_1 \cos(\theta_1) Z_2 \cos(\theta_2) Z_3 \cos(\theta_3) + Z_0 \cos(\theta_0) Z_1 \cos(\theta_1) Z_2 \cos(\theta_2) Z_3 \cos(\theta_3) + Z_0 \cos(\theta_0) Z_1 \cos(\theta_1) Z_2 \cos(\theta_2) + Z_0 \cos(\theta_0) Z_2 \cos(\theta_2) Z_3 \cos(\theta_3) + Z_1 \cos(\theta_1) Z_3 \cos(\theta_3).$$

Implementation of the Reduced Hamiltonian on the Quantum Computer

On a quantum computer, an initial estimate of the angle of each qubit may be provided. Next, the interaction terms may be provided based on a calculation of the one and two electron integrals in the trial Hamiltonian and the quantum computer initialized. This calculation may comprise the bias and coupling terms for the qubits in the reduced Hamiltonian. This procedure may comprise, for example, use of a variational quantum eigensolver or phase estimation; however, any procedure for preparing trial states may be used. In some cases, embedding the Hamiltonian on the quantum computer may comprise setting the bias and coupling terms of individual qubits (for example, by applying an appropriate magnetic field). In the case of a quantum annealer, the Hamiltonian may be physically embedded.

After each trial state is prepared, the associated energy may be estimated by measuring and summing the energy of the individual Pauli terms in the Hamiltonian. The energy estimates may then be used in a gradient descent algorithm to optimize the control parameters. The control parameter may be minimization of the energy of a quantum state. Sufficient minimization may comprise a condition when changes in the energy or the control parameter are below a threshold value. Additionally or alternatively, sufficient minimization may comprise having reached a predetermined number of iterations. Additionally or alternatively, sufficient minimization may comprise having reached a predetermined calculation time, such as a time at which the qubits have lost coherence.

Figure 3:
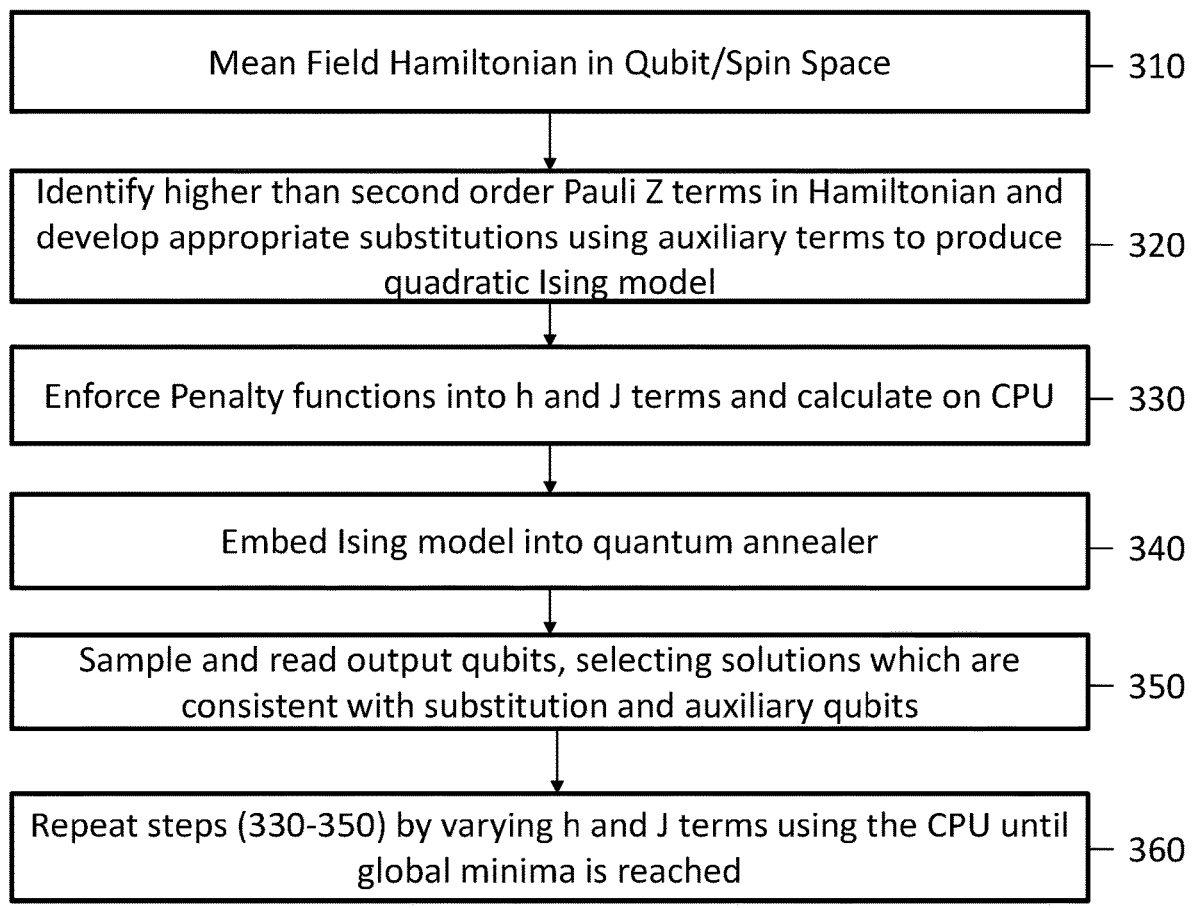
FIG. 3 shows an example method for implementing an Ising model on a quantum annealer.

FIG. 3 shows an example method 300 for implementing an Ising model on a quantum annealer. At an operation 310 of the method 300, the mean field Hamiltonian in qubit space may be provided. At an operation 320 of the method 300, higher than second order Pauli Z terms in the Hamiltonian may be identified. Additionally, appropriate substitutions may be developed using auxiliary terms to produce a quadratic Ising model. At an operation 330 of the method 300, penalty functions may be enforced into h (bias) and j (coupling) terms for each qubit. The penalty functions as well as the weight and the bias values for each qubit may be evaluated on a classical computer of the present disclosure. At an operation 340 of the method 300, the Ising model may be embedded on the quantum annealer. At an operation 350 the qubits may be sampled and an output recorded. Additionally, solutions may be selected which are consistent with substitution and auxiliary qubits. Operations 330, 340, and 350 may be repeated at an operation 360 of the method 300 until a minimum a criterion is reached. The criterion may comprise a threshold value. The criterion may comprise a minimum. The minimum may be a local minimum or a global minimum. The minimum may comprise a solution to the problem.

Figure 4:
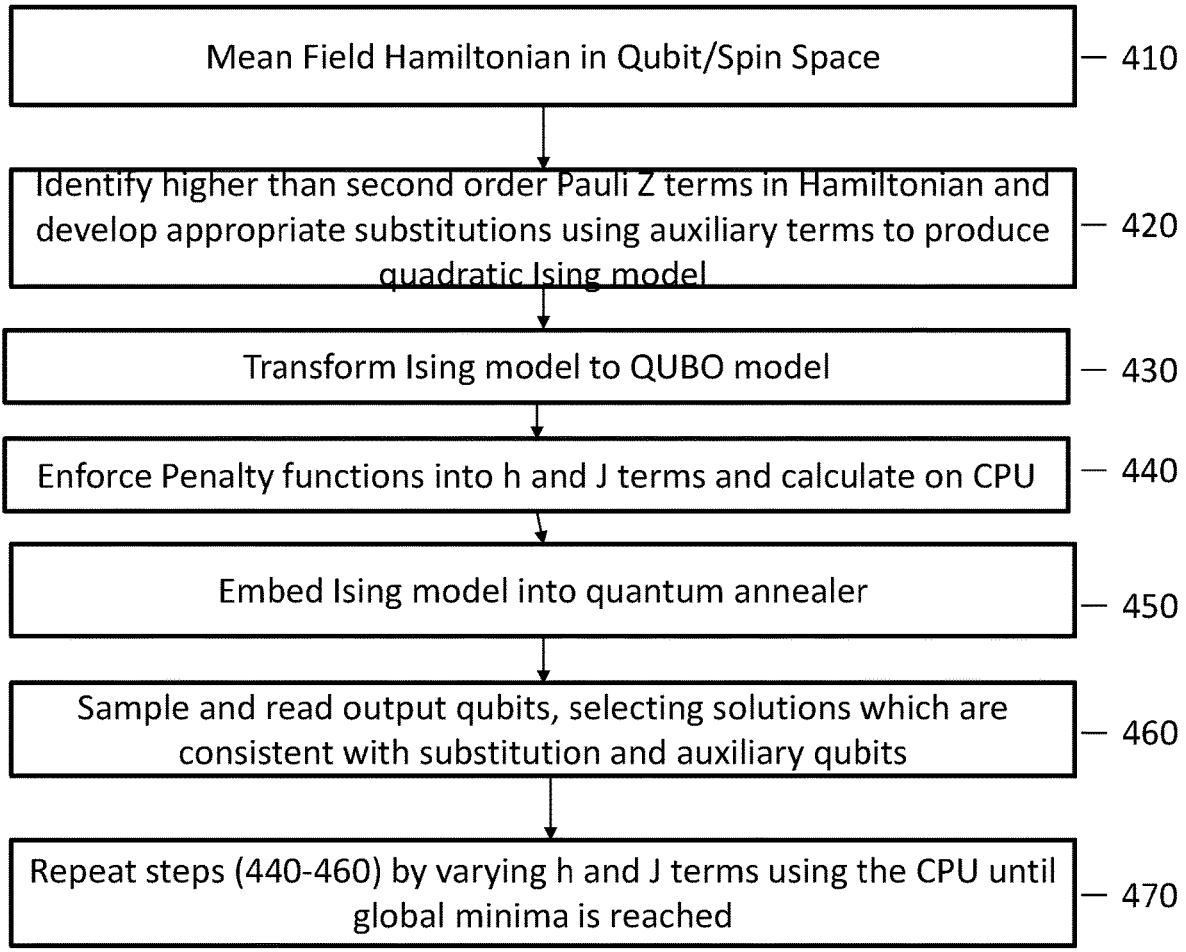
FIG. 4 shows an example method for implementing a QUBO model on a quantum annealer.

FIG. 4 shows an example method 400 for implementing a QUBO model on a quantum annealer. At an operation 410 of the method 400, the mean field Hamiltonian in qubit space may be provided. At an operation 420 of the method 400, higher than second order Pauli Z terms in the Hamiltonian may be identified. Additionally, appropriate substitutions may be developed using auxiliary terms to produce a quadratic Ising model. At an operation 430 of the method 400 the Ising model may be transformed into a QUBO model. At an operation 440 of the method 400, penalty functions may be enforced into h (bias) and j (coupling) terms for each qubit. The penalty functions as well as the weight and the bias values for each qubit may be evaluated on a classical computer of the present disclosure. At an operation 450 of the method 400, the QUBO model may be embedded on the quantum annealer. At an operation 460 the qubits may be sampled and an output recorded. Additionally, solutions may be selected which are consistent with substitution and auxiliary qubits. Operations 430, 440, 450, and 460 may be repeated at an operation 470 of the method 400 until a criterion is reached. The criterion may comprise a threshold value. The criterion may comprise a minimum. The minimum may be a local minimum or a global minimum. The minimum may comprise a solution to the problem.

Variational Approaches and Quantum Mean-Field Ansatz

In an aspect, a method of solving an electronic structure problem using a qubit mean-field ansatz is provided. Such a method of solving a problem may not require transforming the Hamiltonian into an Ising or QUBO type problem. Methods of the present disclosure may improve upon the scaling of implementations of a variational quantum eigensolver for the solution of electronic structure problems. Methods of the present disclosure may extend the quantum mean-field Hamiltonian to coupled cluster singles and doubles (CCSD). Methods comprising the qubit mean field ansatz may be implemented on a universal gate quantum computer; however, methods of the present disclosure may be implemented on quantum and/or classical computers which simulate the action of the particular gate operations.

At an operation 255 of the method 200, a qubit mean-field ansatz may be provided. In order to practically implement a method for solving an electronic structure problem it may be beneficial to implement an operation by step procedure which may be performed using a quantum circuit (e.g. an ansatz). This quantum circuit may be expressed as a set of sequential gate operations. Such a procedure may be sufficiently hardware efficient to perform a method of solving an electronic structure problem within practical time frames, such as within a time period that elapses prior to decoherence of entanglements.

Variational Approaches

In an example, one procedure may comprise the quantum phase estimation algorithm. However, in some implementations, quantum computers which implement the quantum phase estimation algorithm may be susceptible to loss of coherence. In another example, a variational quantum eigensolver approach may ameliorate such susceptibility and thereby facilitate computation. Example ansatzes provided herein may be implemented using a variational quantum eigensolver or the quantum estimation algorithm.

In a first example ansatz, n-qubit trail states may be parametrized as:

$$\Psi(\theta) = \prod_{q=1}^{n} [U^{q,d}(\theta)] \times U^{ENT} \times \ldots \times$$

$$\prod_{q=1}^{n} [U^{q,1}(\theta)] \times U^{ENT} \times \prod_{q=1}^{n} [U^{q,0}(\theta)] |00\ldots0\rangle$$

The parametrization may be similar to that disclosed in Kandala (A. Kadala, A. Mezzacapo, K. Temme, M. Takita, M. Brink, J. M. chow, and J. M. Gambetta, Nature 549, 242 (2017)), which is herein incorporated by reference in its entirety. The above equation has a structure of an alternating sequence of products of individual qubit rotations $U^{q,i}(\theta)$, $$U^{q,i}(\theta) = e^{iz_q \theta_{1q,i}} e^{ix_q \theta_{2q,i}} e^{iz_q \theta_{3q,i}}, 0 \leq i \leq d$$

where $\theta_1^q$, $\theta_2^q$, and $\theta_3^q$ are the Euler angles of the q-th spin, interleaved with action of "entanglers" $U_{ent} = \exp(-i\tau \hat{H}_o)$, where $\tau$ is the fixed amplitude and $\hat{H}_0$ is a multi-qubit operator (i.e. an entanglement gate comprising at least two qubits). The number d comprises a depth scheme or ansatz depth. The depth scheme defines a number of iterations over which the entanglement scheme may be repeated. The depth scheme may comprise a number of iterations sufficient to reach chemical accuracy.

In the above example ansatz, a computational work flow may comprise X and Z rotation gates (by the rotations in $U^{q,i}$) and an entanglement gate. The Ansatz of Kandala et al. comprises n*(3d+2) gate operations in total. Such a work flow may reach chemical accuracy with an ansatz depth of 16.

Quantum Mean-Field Ansatz:

In an additional example ansatz, it may be beneficial to reduce the number of qubit operations used to reach chemical accuracy for similar quantum computers. Such an ansatz may be implemented by adopting an alternative parameterization of the Hilbert space of an individual qubit. Such an alternative parameterization of the Hilbert space may comprise spin coherent states. Spin coherent states may parameterize the Hilbert space in so-called "Bloch states" defined by a raising or lowering spin operator acting on a particle with spin J in spherical polar coordinates, rather than Euler angles. The energy of an analogously presented Hamiltonian, using such a parametrization, was found to be an upper bound to the exact energy. See, for instance, Lieb (E. H. Lieb, Commun. Math. Phys. 31, 327 (1973)), which is herein incorporated by reference in its entirety.

Direct product of states $|\Omega\rangle$ defined elsewhere herein provides a basis for an n-qubit system and the ground state energy is bound from above by:

$$E_0 \leq \langle \Omega | \hat{H} | \Omega \rangle = \sum_I C_I F_I(n_1^\omega, \ldots n_n^\omega)$$

$$E_{QMF} = \sum_I C_I F_I(n_1^\omega, \ldots n_n^\omega)$$

where the right hand side defines the qubit mean-field energy functional and where each $F_I$ is obtained from $T_I$ by substitution of $\omega_i \to j n_i^\omega$. Operator products of $\omega_i$ are converted to ordinary numerical products. $n_i^\omega$ is shorthand for $\omega$ component of the unit vector on a Bloch sphere: $n = (\cos \phi \sin \theta, \sin \phi \sin \theta, \cos \theta) \to (x_i, y_i, z_i)$.

As shown, the qubit mean-field Ansatz comprises X and Z rotation gates in n without additional entanglement gates or an Ansatz depth parameter (d) of Kandala et al. As such, it also makes sense to call the qubit mean-field Ansatz an independent-qubit model. The quantum mean-field Ansatz may implemented similarly to the variational quantum eigensolver of Kandala et al. where effectively d=0. Implementation of the quantum mean field Ansatz scales with 2*n gates (i.e. linearly).

Coat or Penalty Functionals:

Quantum computers, quantum annealers, and simulated annealing techniques may have noise associated with them. Among other causes, noise may cause measurement of the qubits to be inaccurate. In some cases, one or more qubits may be incorrectly measured as a result of noise such as reading a qubit that should be 0 as 1 instead. The variational quantum eigensolver (VQE) algorithm may be susceptible to this noise and may result in the expectation value being higher than the energy of interest. In other cases, it may be difficult to get the VQE algorithm to get the energy of a selected molecular state (such as the triplet state or the first excited state). As an optional step of any aspect of the methods described herein, it may be beneficial to transform the Qubit Hamilton of the system of interest by adding a penalty functional. In some cases, this transformation may occur prior to generating the qubit mean field or qubit coupled cluster ansatz and/or performing a transformation into an Ising Hamiltonian.

In some embodiments, it may be beneficial to constrain minimization of the qubit Hamiltonian with respect to a penalty functional. Spin operators, such as, for example, the square of the total spin ($S^2$) and the projection of the total molecular spin ($S_z$) may be used. Additionally or alternatively, number operators ($\hat{N} = \sum_i a_i^\dagger a_i$) may be used. Additionally or alternatively, other operators which commute with the Hamiltonian may be used as a constraint. In some cases, the commutator itself may be used as a constraint.

An example implementation of a constraint on the total spin operator is as follows:

$$\varepsilon_s(\Omega_1, \ldots, \Omega_4, \mu) = E_{QMF}(\Omega_1, \ldots, \Omega_4) + \frac{\mu}{2} [S^2_{QMF}(\Omega_1, \ldots, \Omega_4) - S^2]^2$$

where the total spin is constrained to be zero and where $\mu$ is a penalty parameter which greater than 1.

Alternatively, a constraint on the number operator may be implemented as follows:

$$\varepsilon_N(\Omega_1, \ldots, \Omega_4, \mu) = E_{QMF}(\Omega_1, \ldots, \Omega_4) + \frac{\mu}{2} [N_{QMF}(\Omega_1, \ldots, \Omega_4) - 1]^2$$

Because these operators share the same Pauli terms as the Hamiltonian, the values of these operators may be calculated without additional or minimal computational cost.

Figure 19:
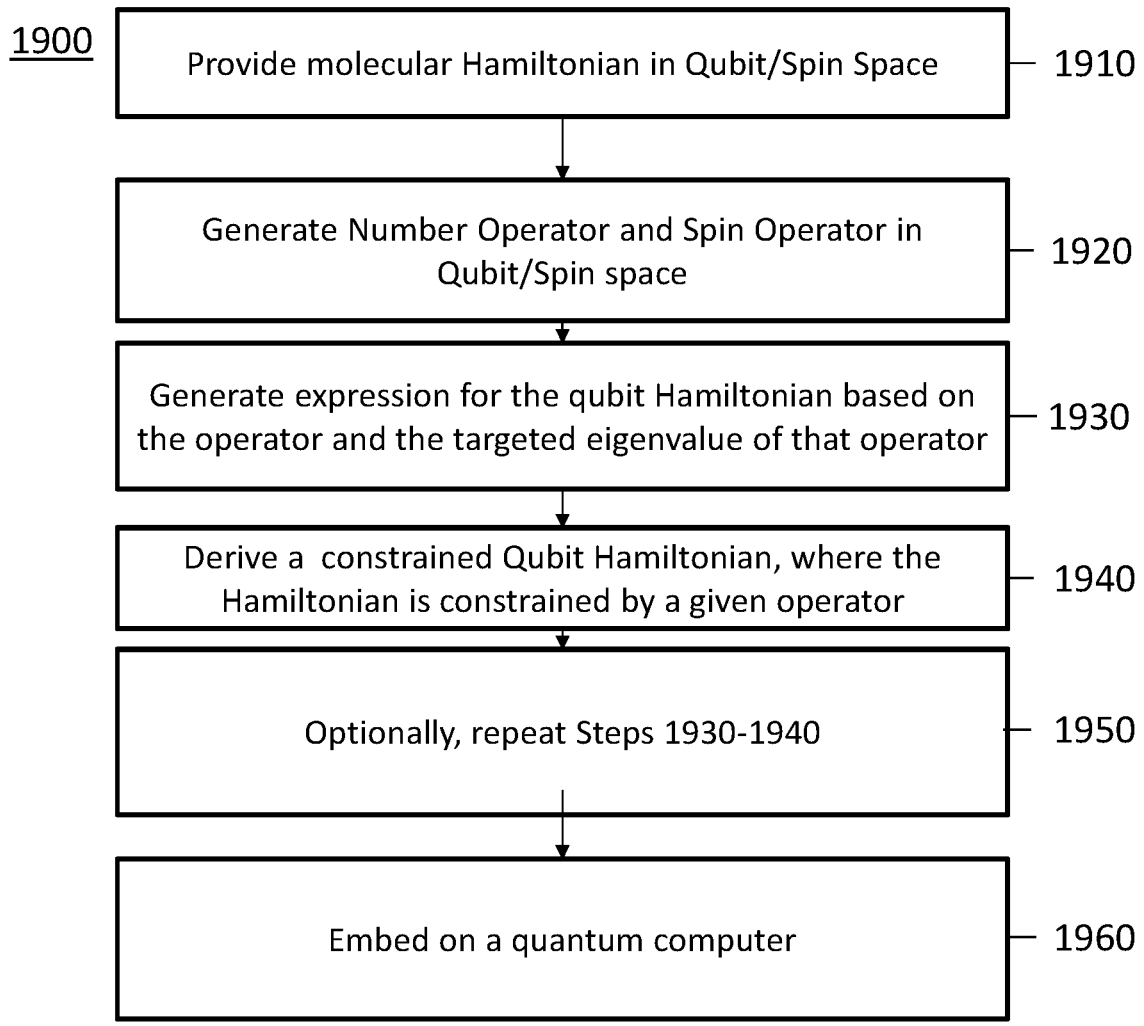
FIG. 19 shows an example implementation of a constraint using projectors.

FIG. 19 shows an example method 1900 of implementing a constraint using projectors. The method 1900 may be used to remove selected spin or number states from the Qubit Hamiltonian. At an operation 1910, a Hamiltonian in qubit/ spin space may be provided. At an operation 1920, the number and spin operators may be generated. At an operation 1930, an expression for the qubit Hamiltonian based on the operator and the targeted eigenvalue of the operator may be derived. The number and spin operators in qubit space may be composed of Pauli Word Operators comprising of products of Pauli X, Y, and Z spin operators. These operators may be generated by using the Bravyi-Kitaev or Jordan-Wigner transformation on their fermionic spin and number operators as described elsewhere herein. In these cases, the number operator and spin operators in Qubit/Spin space both commute with the Qubit Hamiltonian. Since these operators commute with the Qubit Hamiltonian, they possess a common set of eigenfunctions, $|\psi_i\rangle$. The eigendecomposition of the Qubit Hamiltonian H can be described as:

$$H = \sum_i E_i |\psi_i\rangle\langle\psi_i|$$

where $E_i$ are the energy eigenvalues. At an operation 1940, a constrained Qubit Hamiltonian may be derived. The Qubit Hamiltonian may be constrained by a given operator and a given eigenvalue. This results in the general case, where the Qubit Hamiltonian $H_{ai}$ is:

$$H_{ai} = H - H(A-a_i)^2 - (A-a_i)^2 H$$

Where A is the operator of interest (for example, $S_2$, N, etc.) in Qubit form, and $a_i$ is the target eigenvalue of the operator A. In this case, the constrained Qubit Hamiltonian is generally larger. The form of the operator $(A-a_i)^2$ is quadratic, but in some cases it does not have to be quadratic. At an operation 1950, operations 1930 and 1940 may be repeated. At an operation 1960, the constrained Hamiltonian may be embedded on the quantum computer. The quantum computer may be a quantum annealer or a universal gate quantum computer.

In an example using the spin operator, it can be applied onto the above equation such that:

$$S^2 H = \Sigma_i S_i(S_i+1) E_i |\psi_i\rangle\langle\psi_i|, S=0,1,\ldots$$

If the singlet state is selected in such that S=0, a new Qubit Hamiltonian can be described as:

$$H_{S=0} = H - HS^2 - S^2 H$$

And thus the eigendecomposition of the above equation would be the following:

$$H_{S=0} = \sum_i E_i |\psi_i\rangle\langle\psi_i| + \sum_i -E_i [2S_i(S_i+1)-1] |\psi_i\rangle\langle\psi_i|$$

The above equation may cause eigenstates of the Qubit Hamiltonian that are not singlets (the state of interest), to be shifted to positive energies for the ground state. This may enable VQE style algorithms to have a higher accuracy, since they sample from nearby negative energy states. The constrained Qubit Hamiltonian may be run on a universal gate quantum computer, by composing the quantum mean-field (QMF) or qubit coupled-cluster (QCC) ansatz. Additionally or alternatively, the constrained Qubit Hamiltonian can be transformed into the Ising form. In some embodiments, the Qubit Hamiltonian can be acted upon by multiple operators, one at a time, in such that spin and number are constrained. In some embodiments, to compensate for the increase in Pauli Word Sums after the transformation, the new Qubit Hamiltonian may be processed through a greedy algorithm to determine which Pauli Words have common tensor product basis decomposition.

Qubit Coupled Cluster

In some embodiments, the quantum mean field Ansatz may also be extended to coupled cluster singles and doubles, or to the full configuration interaction with the addition of entanglement gates. In an example, at an operation 265 of the method 200, the qubit mean-field Ansatz may be extended to CCSD by adding entanglement scheme using XZ gates. The qubit mean-field Hamiltonian may be further transformed by acting from the left and right with the entanglement operator $U_{ent} = \exp(-i\tau \hat{H}_o)$, where $\tau$ is the fixed amplitude and $\hat{H}_0$ is a multi-qubit operator (i.e. an entanglement gate comprising at least two qubits).

$$\hat{H}(\tau) = e^{i\tau\hat{T}} \hat{H} e^{-i\tau\hat{T}}$$

This transformation comprises the qubit coupled-cluster Ansatz. Using such a transformation, the reference state $\Omega$ and the "cluster amplitude" $\tau$ may be variationally optimized together.

A reduced energy functional, based on the general Unitary Ansatz applied on qubit mean-field Hamiltonian may be defined as below:

$$E_{cQMF}^{\hat{T}}(\tau) = \min_\Omega \langle \Omega | e^{i\tau\hat{T}} \hat{H} e^{-i\tau\hat{T}} | \Omega \rangle$$

The above is a function of an amplitude $\tau$ and a generator $\hat{T}$, where $0 \leq \tau < \pi/2$. For example, a generator may comprise involuntary products of two or more Pauli matrices. The generator may be of the form $x_P x_R$, $x_P z_R$, $z_P z_R$, $x_P y_R$, $y_P z_R$, $y_P y_R$, $z_P z_R$, etc. where P and R are qubit indices and P does not equal R. The amplitude $\tau$ may comprise a rotation of the entanglement operator. The rotation of the entanglement operator may arise from a sequence of gate operations which may be used in the entanglement scheme, for example: Hadamard, CNOT, RZ, CNOT, Hadamard.

Figure 13A:
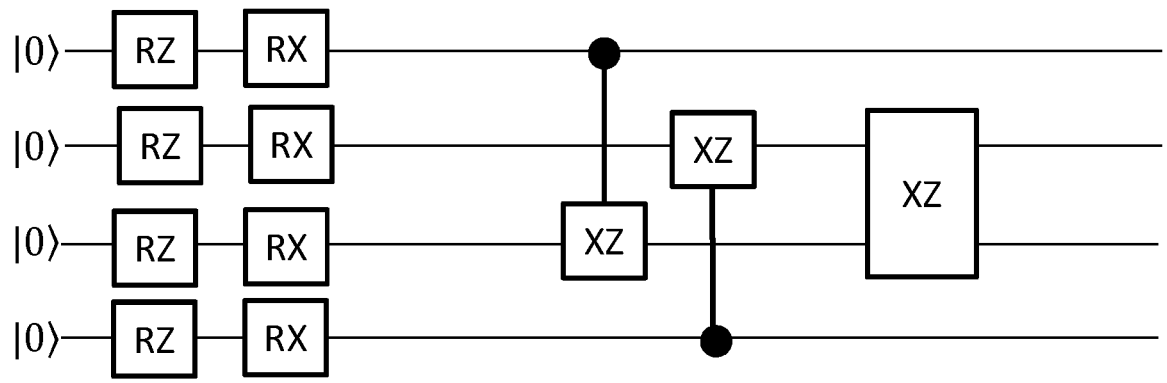
FIG. 13A and FIG. 13B show an example entanglement ansatz based on alpha-beta molecular orbital blending.
Figure 13A:
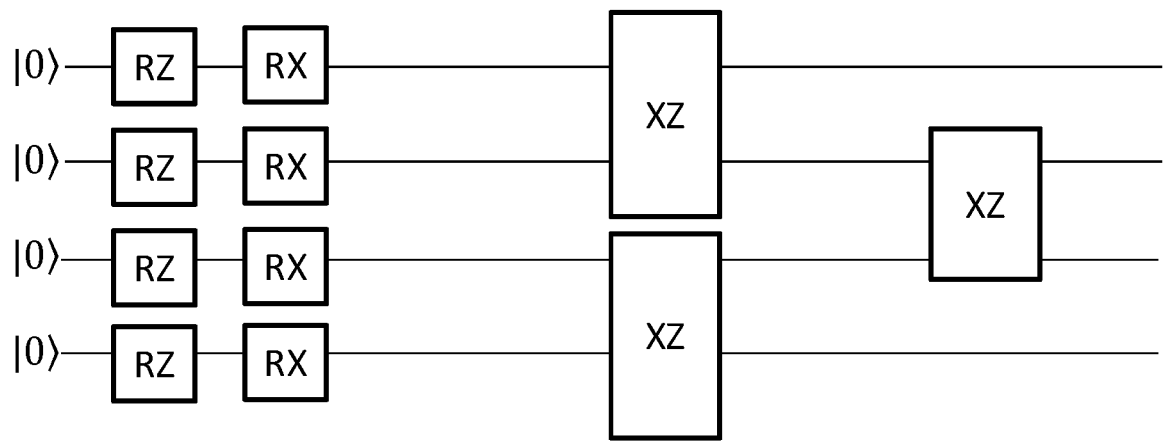
Figure 13B:
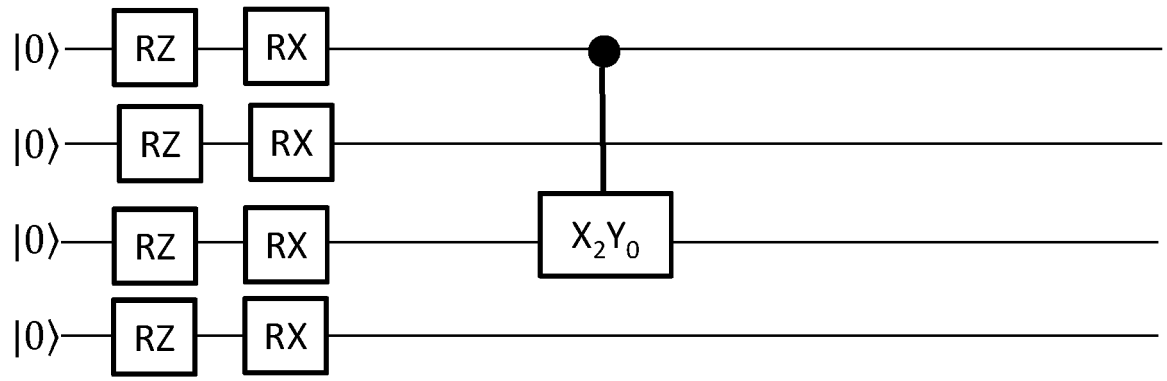
Figure 13B:
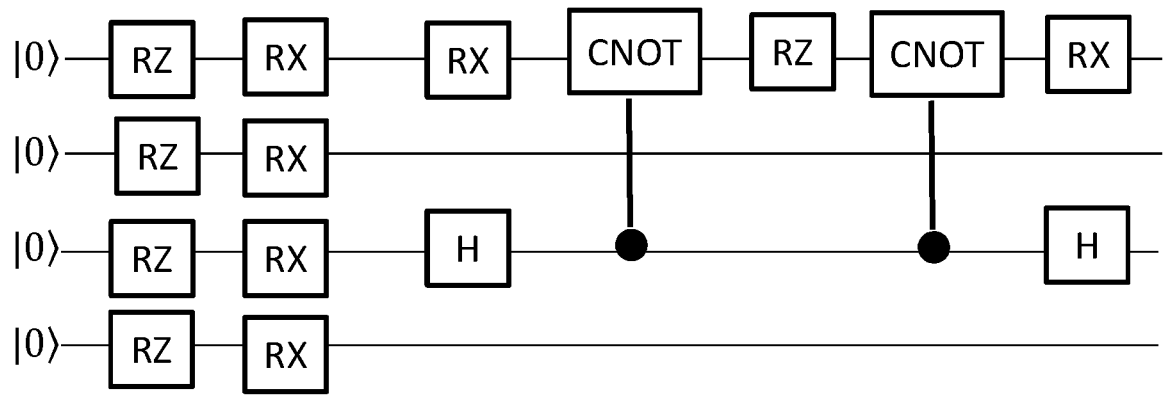

FIG. 13A and FIG. 13B show an example entanglement ansatz scheme 1300 based on alpha-beta molecular orbital blending. The entanglement ansatz scheme may be based on the composition of alpha-beta molecular orbital blending schemes. In such an entanglement ansatz scheme, the perceived alpha and beta molecular orbitals of the molecule are mapped onto the qubits, where each qubit or a combination of qubits represents an alpha or beta spin molecular orbital. For example, alternating qubits may be represented as alpha and beta spin orbitals, such that a beta qubit is arranged in between each neighboring alpha qubits and vice versa. Each alpha qubit may be entangled with at least one other alpha qubit, and each beta qubit may be entangled with at least one other beta qubit. For example, as shown in example 1310, each alpha qubit may be entangled with at least one adjacent alpha qubit and each beta qubit may be entangled with at least one adjacent beta qubit. The nearby orbitals are molecular orbitals which are directly above or below the current orbital in question based on energy value. In some cases, entanglement ansatz schemes are based on entangling appropriate sigma and pi bonding orbitals. For example, as shown in example 1300, each alpha qubit may be entangled with at least one alpha qubit and each beta qubit may be entangled with at least one beta qubit, where the qubits are not adjacent. In another entanglement scheme, as shown in 1320, the entangler can be selected based on the rankings of Pauli word operators, which in this case, results in $x_2 y_0$ entangler. The Pauli word operators may be decomposed into a set of logical circuit quantum gates that involves CNOT, RZ, RX and Hademard gates. The exact selection of the quantum circuit gates may be modified based on hardware and what the native set of gates is. For a Universal quantum computer that has native RX, RZ, CNOT, Hademard, gates, the Pauli word entangler $x_2y_0$ can be decomposed into a set of these gates as shown in 1330.

Ranked Qubit Coupled Cluster

In an additional or alternative scheme of extending the qubit mean-field Ansatz, an additional step of the method may comprise determining entanglement scheme based on ranking possible entanglers based on their contribution to the overall correlation energy. In such a method, the generator $\hat{T}$ can be composed of Pauli words. In some cases, Pauli words may be selected so as to avoid breaking fermionic symmetry. To determine which entanglers and generators to use, the generators which minimize the individual Qubit coupled cluster (QCC) energy function $$E[\tau; \hat{P}_k] = \min_{\Omega} \langle \Omega | e^{i\tau \hat{P}_k} \hat{H} e^{-i\tau \hat{P}_k} | \Omega \rangle$$

may be used, where $P_k$ represents the Pauli generator and $|\Omega\rangle = \Pi_i^{Nent} |\Omega_i\rangle$ represents the mean-field portion of the wavefunction indexed by each $i^{th}$ qubit.

In some examples, the above equation can be expanded via a Taylor series expansion to a new form, which generates the three term equation when truncated at second order:

$$E[\tau; \hat{P}_k] = E_{QMF} + \tau \frac{dE[\tau; \hat{P}_k]}{d\tau}\bigg|_{\tau=0} + \frac{\tau^2}{2} \frac{d^2 E[\tau; \hat{P}_k]}{d\tau^2}\bigg|_{\tau=0}$$

With the above equation, the second term and third term can be evaluated to determine whether a given combination of Pauli words is acting as an entangler.

In an example, entanglers which result in greater than 0.001 a.u. absolute value in the first derivative may be considered to be acting as an entangler. In another example, a Pauli word may be acting as an entangler if the absolute value of the first derivative is greater than 0.01 a.u., greater than 0.001 a.u., greater than 0.0001 a.u., greater than 0.0001 a.u., or greater than 0.00001 a.u. In another example, entanglers which have an absolute value <0.001 a.u., but have a negative second energy derivative may also be considered significant. In some cases, the method may comprise searching for any length of Pauli word which may act as an entangler. In some embodiments, the length of the Pauli word that may be screened using this process may be limited in length to 2, 3, 4, etc. Pauli spin operators.

The entanglers indexed by their contribution to the overall correlation energy may be integrated into the QCC Hamiltonian as follows. For a number of entanglers k, the correlation part of the QCC wavefunction $U(\tau)$ can be represented as $\hat{U}(\tau) = \Pi_k^{Nent} \exp(-i\tau_k \hat{P}_k)$ where $P_k$ are the Pauli words whose length can vary from two to the number of qubits and $T_k$ represents a real-valued amplitude of the multi-qubit rotation. The number of entangler in the QCC Hamiltonian may vary from 1 to $4^{N_q} - 2N_q - 1$. The expectation value of the QCC Hamiltonian may then be $E(\tau, \Omega) = \langle \Omega | \hat{U}(\tau)^\dagger \hat{H} \hat{U}(\tau) | \Omega \rangle$ and minimization of the expectation value with respect to the rotation amplitudes and angles in $\Omega$ yields the ground state energy.

In examples where the Pauli word is a product of more than two qubits, the unitary transformation comprising the Pauli word may be factored into products of unitary transformations comprising two qubits. The procedure may recursively produce three new entanglers each containing fewer qubits than the original Pauli word. The factorization procedure may be summarized as follows. Assume Pauli word with length greater than or equal to 3 may be assumed, where the length is the number of Pauli operators in P. The Pauli word to be factored can be represented as $\hat{P} = \hat{P}_1 \hat{\omega}_i \hat{P}_2$ where $\omega_i$ represents the elementary Pauli operator corresponding to the i-th qubit. The word P1 (P2) may contain all qubit indices that are strictly greater (lower) than i. Subsequently, a commutation relation may be defined as follows: $[\hat{\omega}'_i, \hat{\omega}''_i] = 2i\hat{\omega}_i$. Substituting the relation into the Pauli word yields the relation $$\hat{P} = -\frac{1}{2}[\hat{P}_1 \hat{\omega}'_i, \hat{\omega}''_i \hat{P}_2]. \text{ Therefore, } \hat{P} = e^{i(\frac{\pi}{4})\hat{\omega}''_i \hat{P}_2} \hat{P}_1 \hat{\omega}'_i e^{-i(\frac{\pi}{4})\hat{\omega}''_i \hat{P}_2},$$

$$\text{and } \hat{P}_n = e^{i(\frac{\pi}{4})\hat{\omega}''_i \hat{P}_2} (\hat{P}_1 \hat{\omega}'_i)^n e^{-i(\frac{\pi}{4})\hat{\omega}''_i \hat{P}_2}.$$

Subsequently, exponentiation of P and Taylor expansion yields the factorization $$e^{-i\tau \hat{P}} = e^{i(\frac{\pi}{4})\hat{\omega}''_i \hat{P}_2} e^{-i\tau \hat{P}_1 \hat{\omega}'_i} e^{-i(\frac{\pi}{4})\hat{\omega}''_i \hat{P}_2}.$$

Figure 14:
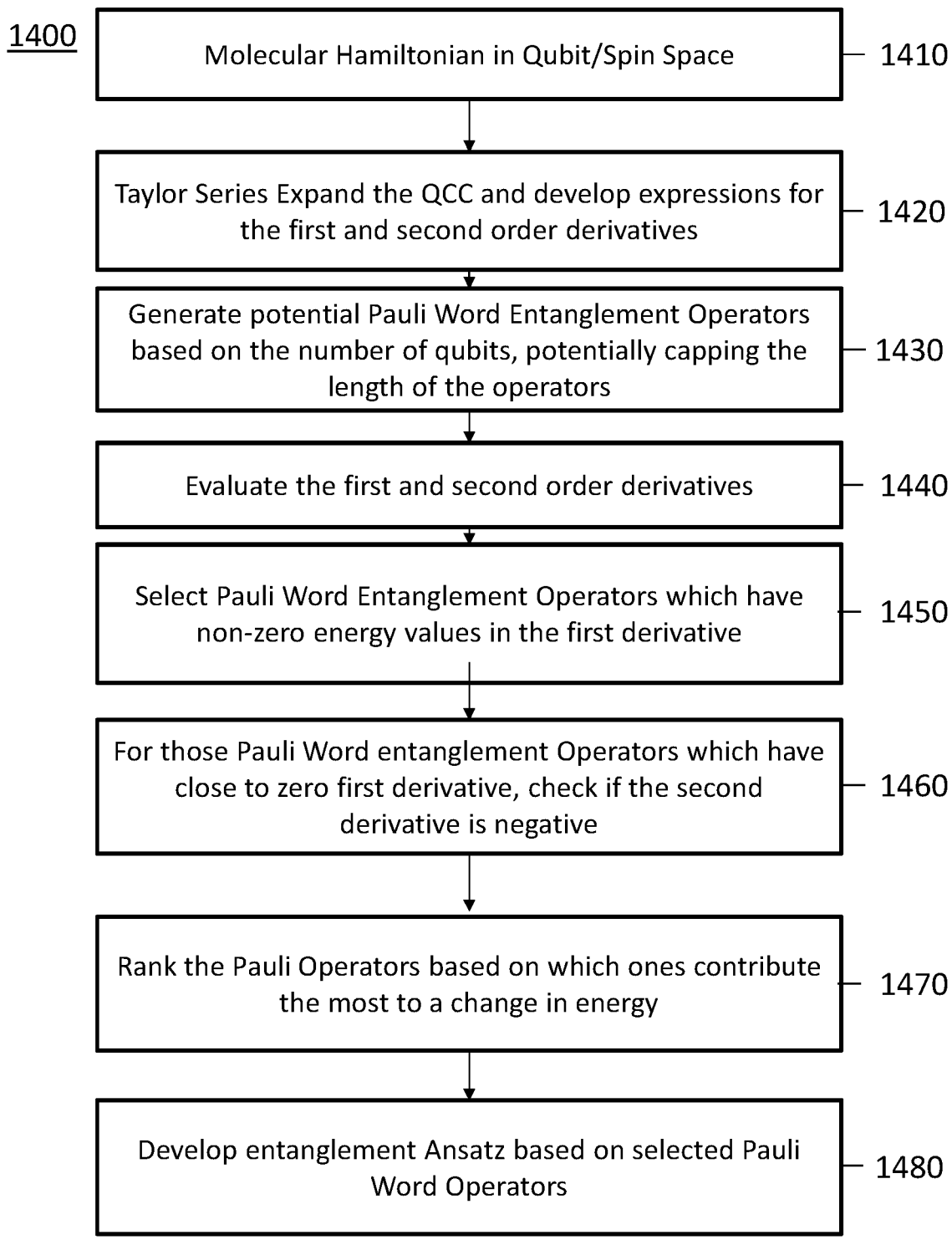
FIG. 14 shows an example method comprising ranking the Pauli operators by their contribution to the qubit coupled-cluster (QCC) Hamiltonian.

FIG. 14 shows an example method 1400 comprising ranking the Pauli operators by their contribution to the QCC Hamiltonian. At an operation 1410 of the method 1400, a molecular Hamiltonian in Qubit/Spin space may be generated. At an operation 1420 of the method 1400, the QCC Hamiltonian may be Taylor expanded to include first and second derivative terms. At an operation 1430 of the method 1400, potential Pauli Word entanglement Operators may be generated based on the number of qubits. At an operation 1440 of the method 1400, the first and second derivatives may be evaluated. At an operation 1450 of the method 1400, Pauli Word entanglement operators may be selected. These operators may be those which have non-zero energy values in the first derivative. In some cases, the number of entanglement operators may be truncated. At an operation 1460 of the method 1400, for those entanglement operators which have close to zero first derivative (e.g. less than 0.001 a.u. absolute value as described herein), those which have a negative second derivative may be selected. At an operation 1470 of the method 1400, the entanglement operators may be ranked based on which ones contribute most to the change in the total energy. In some cases, entanglement operators may be factored into two-qubit operators. At an operation 1480 of the method 1400, an entanglement ansatz may be generated based on the selected entanglement operators.

Figure 16:
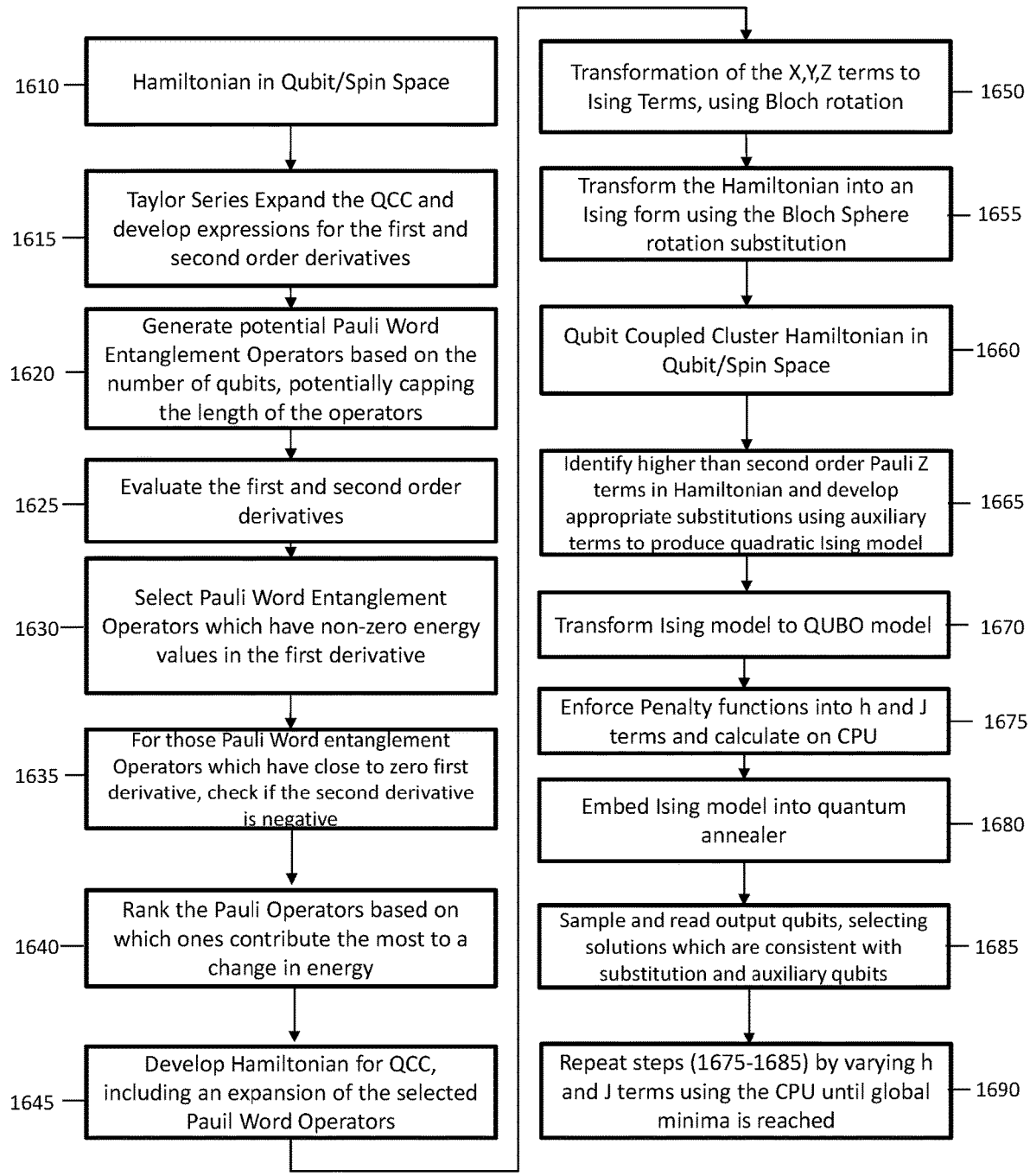
FIG. 16 shows an example method comprising ranking the Pauli operators by their contribution to the QCC Hamiltonian and implementing the QCC method on a quantum annealer.

FIG. 16 shows a method 1600 comprising ranking the Pauli operators by their contribution to the QCC Hamiltonian and implementing the QCC method on a quantum annealer. In some cases, the entanglement Ansatz for $H_2$ acting upon 4 qubits may be determined using the Pauli word generator method as described above. In some cases, the Pauli generator may be chosen to be $x_2y_0$. This results in the following QCC Hamiltonian:

$$\hat{H}(\tau; x_2 y_0) = e^{i\tau x_2 y_0} \hat{H} e^{-i\tau x_2 y_0}$$

The above Hamiltonian has a similar form to Unitary Coupled Cluster Ansatz. Here the above equation may be transformed into an equation using the method described herein into a new Hamiltonian:

$$\hat{\mathcal{H}}(\tau; x_2 y_0) = \hat{H}_{QMF} + \frac{\sin 2\tau}{2}(-i[\hat{H}, x_2 y_0]) + \frac{1}{2}(1 - \cos 2\tau)x_2 y_0[\hat{H}, x_2 y_0],$$

where the variable $\hat{H}_{QMF}$ is the quantum is mean field energy of the Hamiltonian and $\tau$ is a cluster amplitude that that may be iteratively reduced until a threshold condition may be reached. In this example, the summation of 4 qubit Pauli words which describe $-i[\hat{H}, x_2 y_0]$ is proportional to: $-i[\hat{H}, x_2 y_0] \alpha Z_0 Z_1 + X_0 X_2 + X_0 Z_1 X_2 + Y_0 Y_2 + Z_1 Z_2 Z_0 Z_1 Z_3 Y_0 Z_1 Y_2 Z_3 Z_1 Z_2 Z_3$ and $x_2 y_0[\hat{H}, x_2 y_0]$ is represented by the following expression:

$$x_2 y_0[\hat{H}, x_2 y_0] \alpha Z_0 + Z_0 Z_1 + X_0 Z_1 X_2 + Y_0 Z_1 Y_2 + Z_2 + X_0 Z_1 X_2 Z_3 Y_0 Z_1 Y_2 Z_3 Z_1 Z_2 Z_3.$$

These expressions may be both be transformed into an Ising model using the methods described herein above by transforming the Pauli Z, X and Y operators. This may result in the following expressions:

$$-i[\hat{H}, x_2 y_0] \alpha Z_0 \cos\theta_0 Z_1 \cos\theta_1 + \sin\varphi_0 \cos\theta_0 \sin\varphi_2 \cos\theta_2 +$$
$$\sin\varphi_0 \cos\theta_0 Z_1 \cos\theta_1 \sin\varphi_2 \cos\theta_2 + \sin\varphi_0 \sin\theta_0 \sin\varphi_2 \sin\theta_2 +$$
$$Z_1 \cos\theta_1 Z_2 \cos\theta_2 + Z_0 \cos\theta_0 Z_1 \cos\theta_1 Z_3 \cos\theta_3 +$$
$$\sin\varphi_0 \sin\theta_0 Z_1 \cos\theta_1 \sin\varphi_2 \sin\theta_2 Z_3 \cos\theta_3 + Z_1 \cos\theta_1 Z_2 \cos\theta_2 Z_3 \cos\theta_3$$

And:

$$x_2 y_0[\hat{H}, x_2 y_0] \alpha Z_0 \cos\theta_0 + Z_0 \cos\theta_0 Z_1 \cos\theta_1 +$$
$$\sin\varphi_0 \cos\theta_0 Z_1 \cos\theta_1 \sin\varphi_2 \cos\theta_2 + \sin\varphi_0 \sin\theta_0 Z_1 \cos\theta_1 \sin\varphi_2 \sin\theta_2 +$$
$$Z_2 \cos\theta_2 + \sin\varphi_0 \cos\theta_0 Z_1 \cos\theta_1 \sin\varphi_2 \cos\theta_2 Z_3 \cos\theta_3 +$$
$$\sin\varphi_0 \sin\theta_0 Z_1 \cos\theta_1 \sin\varphi_2 \sin\theta_2 Z_3 \cos\theta_3 + Z_1 \cos\theta_1 Z_2 \cos\theta_2 Z_3 \cos\theta_3$$

In some embodiments the Pauli X and Y operators can be transformed further, resulting in:

$$-i[\hat{H}, x_2 y_0] \alpha Z_0 \cos\theta_0 Z_1 \cos\theta_1 + \sin\varphi_0 Z_4 \cos\theta_0 \sin\varphi_2 Z_5 \cos\theta_2 +$$
$$\sin\varphi_0 Z_4 \cos\theta_0 Z_1 \cos\theta_1 \sin\varphi_2 Z_5 \cos\theta_2 + \sin\varphi_0 Z_4 \sin\theta_0 Z_6 \sin\varphi_2 Z_5 \sin\theta_2 Z_7 +$$
$$Z_1 \cos\theta_1 Z_2 \cos\theta_2 + Z_0 \cos\theta_0 Z_1 \cos\theta_1 Z_3 \cos\theta_3 +$$
$$\sin\varphi_0 Z_4 \sin\theta_0 Z_6 Z_1 \cos\theta_1 \sin\varphi_2 Z_5 \sin\theta_2 Z_7 Z_3 \cos\theta_3 + Z_1 \cos\theta_1 Z_2 \cos\theta_2 Z_3 \cos\theta_3$$

And:

$$x_2 y_0[\hat{H}, x_2 y_0] \alpha Z_0 \cos\theta_0 + Z_0 \cos\theta_0 Z_1 \cos\theta_1 +$$
$$\sin\varphi_0 Z_4 \cos\theta_0 Z_1 \cos\theta_1 \sin\varphi_2 Z_5 \cos\theta_2 +$$
$$\sin\varphi_0 Z_4 \sin\theta_0 Z_6 Z_1 \cos\theta_1 \sin\varphi_2 Z_5 \sin\theta_2 Z_7 + Z_2 \cos\theta_2 +$$
$$\sin\varphi_0 Z_4 \cos\theta_0 Z_1 \cos\theta_1 \sin\varphi_2 Z_5 \cos\theta_2 Z_3 \cos\theta_3 +$$
$$\sin\varphi_0 Z_4 \sin\theta_0 Z_6 Z_1 \cos\theta_1 \sin\varphi_2 Z_5 \sin\theta_2 Z_7 Z_3 \cos\theta_3 + Z_1 \cos\theta_1 Z_2 \cos\theta_2 Z_3 \cos\theta_3$$

With the above transformations, the ground state energy of a molecular Hamiltonian in spin basis derived from the qubit coupled cluster theory may be solved using the Ising formulation.

FIG. 16 shows an example method comprising ranking the Pauli operators by their contribution to the QCC Hamiltonian and implementing the QCC method on a quantum annealer. At an operation 1610 of the method 1600, a molecular Hamiltonian in Qubit/Spin space may be generated. At an operation 1615 of the method 1600, the QCC Hamiltonian may be Taylor expanded to include first and second derivative terms. At an operation 1620 of the method 1600, a potential Pauli Word entanglement Operators may be generated based on the number of qubits. At an operation 1625 of the method 1600, the first and second derivatives may be evaluated. At an operation 1630 of the method 1600, Pauli Word entanglement operators may be selected. These operators may be those which have non-zero energy values in the first derivative. In some cases, the number of entanglement operators may be truncated. At an operation 1635 of the method 1600, for those entanglement operators which have close to zero first derivative, those which have a negative second derivative may be selected. At an operation 1640 of the method 1600, the entanglement operators may be ranked based on which ones contribute most to the change in the total energy. In some cases, entanglement operators may be factored into two-qubit operators. At an operation 1645 of the method 1600, an entanglement ansatz may be generated based on the selected entanglement operators.

At an operation 1650 of the method 1600, the x, y, and z terms may be converted to Ising terms using a Bloch rotation. At an operation 1655 of the method 1600, the Hamiltonian may be transformed into an Ising form using a Bloch sphere rotation substitution. At an operation 1660 of the method 1600, a qubit coupled cluster Hamiltonian in qubit/spin space may be generated. At an operation 1665 of the method 1600, the higher than second order Pauli z terms in the Hamiltonian may be identified. In some cases, auxiliary terms may be substituted into the Hamiltonian to produce a quadratic Ising model. At an operation 1670 of the method 1600, the Ising model may be transformed into a QUBO model. At an operation 1675 of the method 1600, penalty functions may be included into the bias (h) and coupling (j) terms. These terms may be calculated on a CPU. At an operation 1680 of the method 1600, the Ising model may be embedded on a quantum annealer. At an operation 1685 of the method 1600, the output qubits may be sampled and read. Solutions may be selected which are consistent with substitution and auxiliary qubits. At an operation 1690 of the method 1600, operations 1675 to 1685 may be repeated. Weight and bias terms may be varied using the CPU. In some cases, a local minimum may be reached. In some cases, a global minimum may be reached. In some cases the operations may be repeated until a selected threshold has been reached.

Domain Folding Approach

In addition to the above approaches including Ising style approaches, an additional two folding procedures may be performed on the qubit coupled cluster Hamiltonian. A folding procedure may be beneficial in order to shorten convergence times. A folding procedure may be beneficial to reduce the number of local minima on the optimization surface. In some cases, the following transformation is performed with relation to the cluster amplitudes $\tau$:

$$\sin(2\tau_i) \to Z_j \sin(2\tau_i)$$

$$(1 - \cos(2\tau_i)) \to (1 - Z_k \cos(2\tau_i))$$

Where the Z terms are new spin variables (Pauli Z operators) and their indices j, k are j=number of qubits in QMF Hamiltonian+i and k=j+i. With this transformation the domain for the cluster amplitude τ is reduced to [0,π/2]. In some embodiments, the first transformation may be performed on the Ising Hamiltonian, in which case the domain of the cluster amplitude is [0,π].

Figure 18:
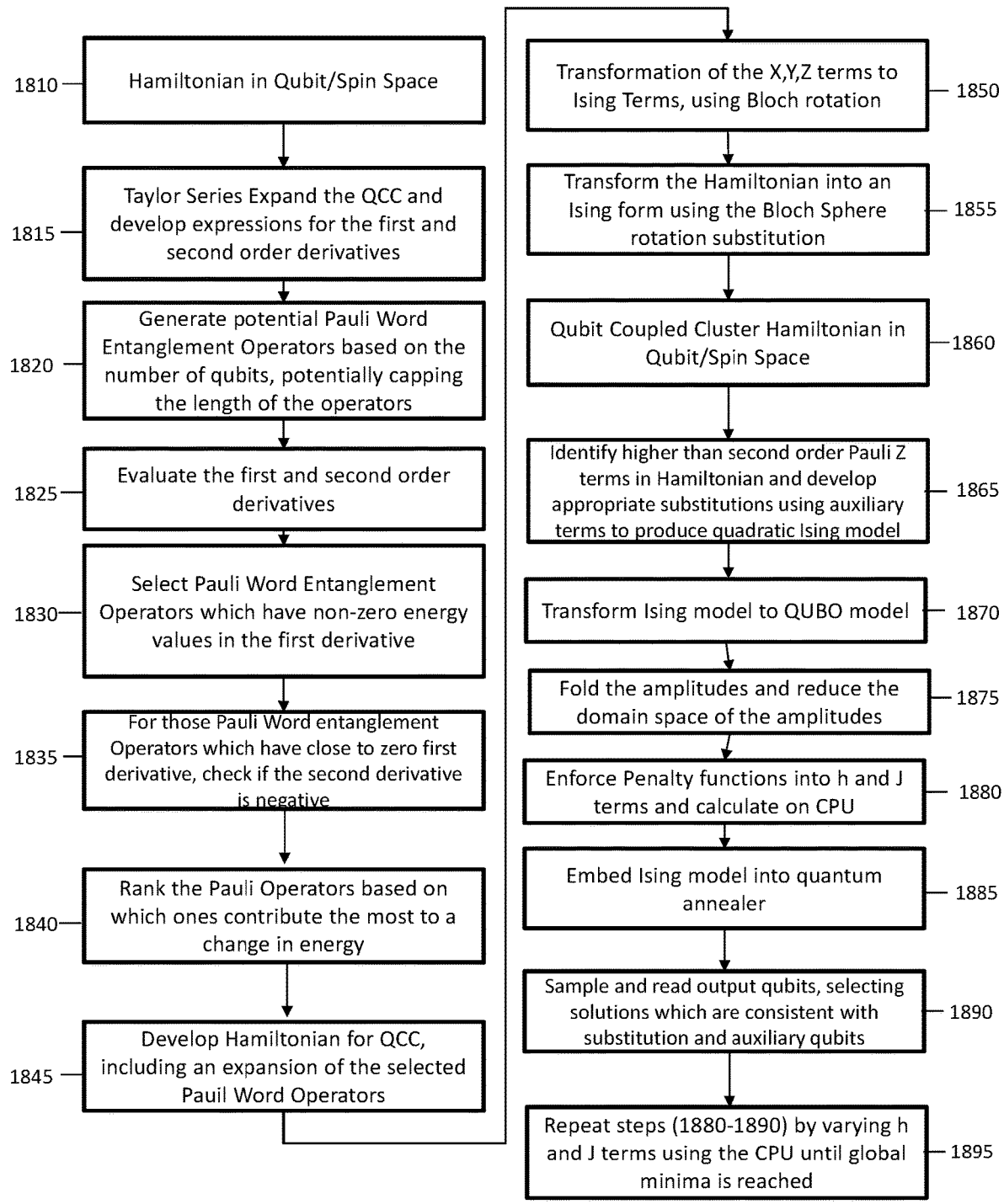
FIG. 18 shows an example method comprising ranking the Pauli operators by their contribution to the QCC Hamiltonian, folding the optimization domain, and implementing the QCC method on a quantum annealer.

FIG. 18 shows an example method 1800 comprising ranking the Pauli operators by their contribution to the QCC Hamiltonian, folding the optimization domain, and implementing the QCC method on a quantum annealer. At an operation 1810 of the method 1800, a molecular Hamiltonian in Qubit/Spin space may be generated. At an operation 1815 of the method 1800, the QCC Hamiltonian may be Taylor expanded to include first and second derivative terms. At an operation 1820 of the method 1800, a potential Pauli Word entanglement Operators may be generated based on the number of qubits. At an operation 1825 of the method 1800, the first and second derivatives may be evaluated. At an operation 1830 of the method 1800, Pauli Word entanglement operators may be selected. These operators may be those which have non-zero energy values in the first derivative. In some cases, the number of entanglement operators may be truncated. At an operation 1835 of the method 1800, for those entanglement operators which have close to zero first derivative, those which have a negative second derivative may be selected. At an operation 1840 of the method 1800, the entanglement operators may be ranked based on which ones contribute most to the change in the total energy. In some cases, entanglement operators may be factored into two-qubit operators. At an operation 1845 of the method 1800, an entanglement ansatz may be generated based on the selected entanglement operators.

At an operation 1850 of the method 1800, the x, y, and z terms may be converted to Ising terms using a Bloch rotation. At an operation 1855 of the method 1800, the Hamiltonian may be transformed into an Ising form using a Bloch sphere rotation substitution. At an operation 1860 of the method 1800, a qubit coupled cluster Hamiltonian in qubit/spin space may be generated. At an operation 1865 of the method 1800, the higher than second order Pauli z terms in the Hamiltonian may be identified. In some cases, auxiliary terms may be substituted into the Hamiltonian to produce a quadratic Ising model. At an operation 1870 of the method 1800, the Ising model may be transformed into a QUBO model. At an operation 1875 of the method 1800, the amplitudes and/or phases may be folded to reduce the domain space of amplitudes and/or phases. At an operation 1880 of the method 1800, penalty functions may be included into the bias (h) and coupling (j) terms. These terms may be calculated on a CPU. At an operation 1885 of the method 1800, the Ising model may be embedded on a quantum annealer. At an operation 1890 of the method 1800, the output qubits may be sampled and read. Solutions may be selected which are consistent with substitution and auxiliary qubits. At an operation 1895 of the method 1800, operations 1875 to 1890 may be repeated. Weight and bias terms may be varied using the CPU. In some cases, a local minimum may be reached. In some cases, a global minimum may be reached. In some cases the operations may be repeated until a selected threshold has been reached.

Iterative Qubit Coupled Cluster

By way of summary, the Qubit Coupled Cluster (QCC) method may utilize parametrization of the electronic wave function of a molecular system as:

$$\Psi = \Pi_k \exp(-it_k T_k/2)|\Omega\rangle, k=1,2, \quad (1)$$

where $T_k$ are multi-qubit operators hereinafter termed "entanglers", $t_k$ are the corresponding numerical amplitudes (the first set of control variables), and $|\Omega\rangle$ is a product of qubit coherent states $|(\varphi_j,\theta_j)\rangle$, $$|\Omega\rangle = |(\varphi_1,\theta_1)\rangle \ldots |(\varphi_n,\theta_n)\rangle, \quad (2)$$

where $\varphi_j,\theta_j$ are Bloch angles for the i-th qubit; there are 2n Bloch angles for a system with n qubits. Bloch angles constitute the second set of control variables.

In some cases, the form (1) can be directly implemented on a universal quantum computer as a quantum circuit. In some cases, the state $|\Omega\rangle$ can be prepared by acting of a set of single-qubit gates parametrized by values of Block angles; entanglers $T_k$ are represented as multi-qubit entangling gates whose form may be selected by a user or by any appropriate method, for example, in methods as described elsewhere herein. The entangling gates may be selected by at least two considerations: i. which $T_k$ provides the fastest convergence toward the ground state energy (system-dependent) and ii. which $T_k$ can be efficiently implemented as quantum gates with the lowest noise and largest coherence times (hardware dependent). Once an acceptable selection of $T_k$ is found, the corresponding quantum circuit may be used to execute multiple times on a quantum computer to produce Ψ followed by measuring the expectation value of each single term (or some group of them) of the molecular Hamiltonian $H_e$ to find out the mean value of the electronic energy $$E_e(t_k,\varphi_j,\theta_j) = \langle\Psi|H_e|\Psi\rangle. \quad (3)$$

The mean value of the electronic energy may be subsequently fed into an energy optimizer running on a classical computer to minimize $E_e$ with respect to all control variables $t_k$, $\varphi_j$, $\theta_j$. According to a general Variational Quantum Eigensolver (VQE) scheme, which may provide a variational upper bound for the ground-state energy of a molecular system with the Hamiltonian $H_e$.

In some embodiments, the QCC procedure described herein above may applied once. In such cases, as long as the set of entanglers $T_k$ is chosen and fixed and the electronic energy may be optimized with respect to all control variables, the value of the electronic energy may be the result of electronic-structure calculations of the target system. Without being limited by theory, the challenge with this approach may be finding a functional trade-off between better (e.g. longer) sets of entanglers $T_k$ to achieve better (e.g. lower) ground-state energy versus the ability of a quantum computer to operate with the set of chosen $T_k$-s.

In some embodiments, the QCC procedure described herein above may be applied iteratively. In an iterative case, once the set of optimized amplitudes $t_k(1)$ is found (where the argument oft represents the step at which they were obtained, starting from 1) the original electronic Hamiltonian $H_e(1)$ can be unitarily transformed in a step-wise manner:

$$H_e \to \exp(it_1(1)T_1/2)H_e \exp(-it_1(1)T_1/2) \to \exp(it_2(1)T_2/2)\exp(it_1(1)T_1/2)H_e \exp(-it_1(1)T_1/2)\exp(-it_2(01)T_2/2) \quad (4)$$

At each step a closed expression exists for the transformed operator, for example:

$$(\cos(t_1/2)+i\sin(t_1/2)T_1)H_e(\cos(t_1/2)-i\sin(t_1/2)=H_e+\sin(t_1)/2(T_1H_e-H_eT_1)+(1-\cos(t_1))/2(T_1H_eT_1-H_e) \quad (5)$$

Such an operator product may be evaluated on a classical computer using Pauli polynomial manipulation software.

After evaluation, the result is a new operator of the same structure as the original $H_e$. In some cases, the result may contain more terms than $H_e$. For example, if all three terms in sum (5) are algebraically independent, one may expect 3-fold increase in length (the number of terms) of the corresponding operator. In contrast to expectation, the expansion may typically be less pronounced because summands $[H_e, (T_1 H_e - H_e T_1), (T_1 H_e T_1 - H_e)]$ share many common terms.

The steps of transforming the Hamiltonian and Euler expansion of the transformed operator may be referred to as "dressing". If all entanglers $T_k(1)$ are exhausted in the dressing procedure (4) by successively applying Eq. (5) along with the corresponding amplitudes, the resulting Hamiltonian $H_e(2)$ may be characterized by the mean value of $E_e(1)$ that can be computed solely using the Bloch state $|\Omega(1)\rangle$ without entangling gates:

$$E_e(1) \equiv \langle \Psi | H_e | \Psi \rangle = \langle \Omega | H_e(2) | \Omega \rangle \quad (6)$$

Moreover, since the sequence of transformations in Eq. (4) is unitary, $H_e(2)$ may possess the same exact ground state as the original $H_e$. Therefore, in some case, one may use $H_e(2)$ in place of $H_e$ as a starting point for the new iteration of the QCC procedure. In particular, one may find out a new set of entanglers $T_k(2)$, convert them into a quantum circuit, and run the optimization cycle to determine new amplitudes $t_k(2)$ and Bloch angles. By virtue of variational principle, a new ground-state energy estimate $E_e(2)$ thus obtained, will be no greater than $E_e(1)$, namely, $$E_e(2) \leq E_e(1) \quad (7)$$

and closer to the true ground-state energy, which may improve description of a molecular system under study.

A method of performing an Iterative Qubit Coupled Cluster (iQCC) procedure may be described by the following operations. At an operation (1), the original electronic Hamiltonian $H_e$ may be implemented as the first-step operator $H_e(1)$. At an operation (2), a first entangler $T(1)$ may be identified. The first entangler may be identified according to QCC screening procedure described elsewhere herein. The first entangler may be the entangler which most minimizes an eigenvalue of the Hamiltonian to a threshold condition. At an operation (3), QCC calculations may be performed to determine a value of the corresponding amplitude $t(1)$. The value of the amplitude $t(1)$ may be a value which minimizes an eigenvalue of the Hamiltonian to a threshold condition. At an operation (4), $T(1)$ and $t(1)$ may be inserted into Eq. (5) to dress $H_e(1)$. This may result in the transformed Hamiltonian $H_e(2)$. At this step, $T(1)$ and $t(1)$ may not be minimized while a value of $T(2)$ and $t(1)$ is determined. At an operation (5), operations (1) to (4) may be repeated. Operations (1) to (4) may be repeated until the ground-state energy estimate $E_e(N)$ at the iteration N is found to be close to the value from the previous iteration, $$E_e(N-1) - E_e(N) < \varepsilon$$

where $\varepsilon$ is a threshold condition. In some cases, operations (1) to (4) may be repeated until the Hamiltonian $H_e(N)$ becomes intractable, for example, the dressing procedure may be too long for measurement process on a quantum hardware. The net result of such a procedure may be a circuit which requires a small number of quantum circuit gate operations and which reduces error.

Implementation of the Quantum Mean Field Ansatz on the Quantum Computer

On a quantum computer, an initial estimate of the angle of each qubit may be provided. Next, the interaction terms may be provided based on a calculation of the one and two electron integrals in the trial Hamiltonian and the quantum computer initialized. This procedure may comprise, for example, use of a variational quantum eigensolver or phase estimation; however, any procedure for preparing trial states may be used. In some cases, embedding the Hamiltonian on the quantum computer may comprise generating the measurement topology which would yield the distribution of measurements characteristic of the solutions to the Hamiltonian. For example, in a universal gate quantum computer, the embedding may comprise generating a set of one qubit rotations (e.g. X,Y gates) to rotate the qubits into a trial state before measurement. The rotation may give the quantum computer its characteristic distribution of measurements. For example, in an annealer, the Hamiltonian may be physically embedded (e.g. as qubit coupling and bias), whereas in a universal gate, the Hamiltonian may be used to generate the measurement topology.

After each trial state is prepared, the associated energy may be estimated by measuring and summing the energy of the individual Pauli terms in the Hamiltonian. The energy estimates may then be used in a gradient descent algorithm to optimize the control parameters. The control parameter may be minimization of the energy of a quantum state. Additionally or alternatively, the control parameter may be an operator that commutes with the Hamiltonian, as described herein, the above steps may then be repeated until the control parameter is sufficiently minimized. Sufficient minimization may comprise when changes in the control parameter are below a threshold value. Additionally or alternatively, sufficient minimization may comprise having reached a predetermined number of iterations. Additionally or alternatively, sufficient minimization may comprise having reached a predetermined calculation time, such as a time at which the qubits have lost coherence.

Figure 5:
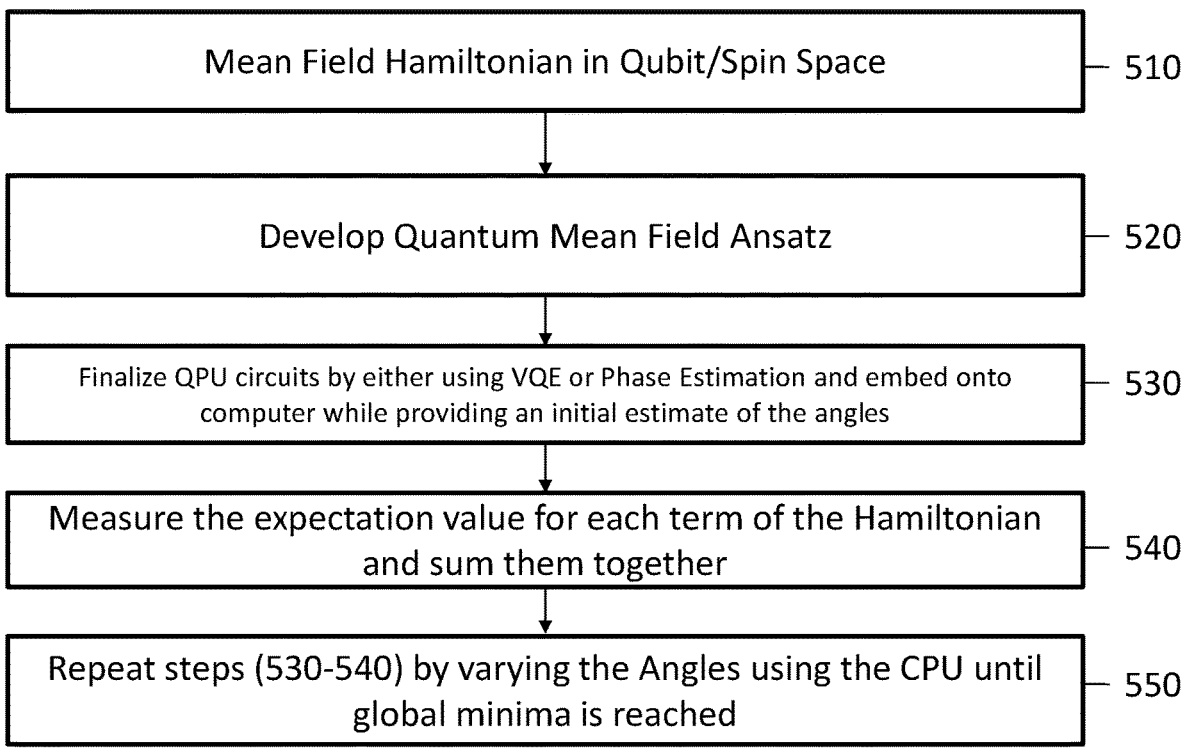
FIG. 5 shows an example implementation of a method of solving a problem using the quantum mean-field ansatz.
Figure 6:
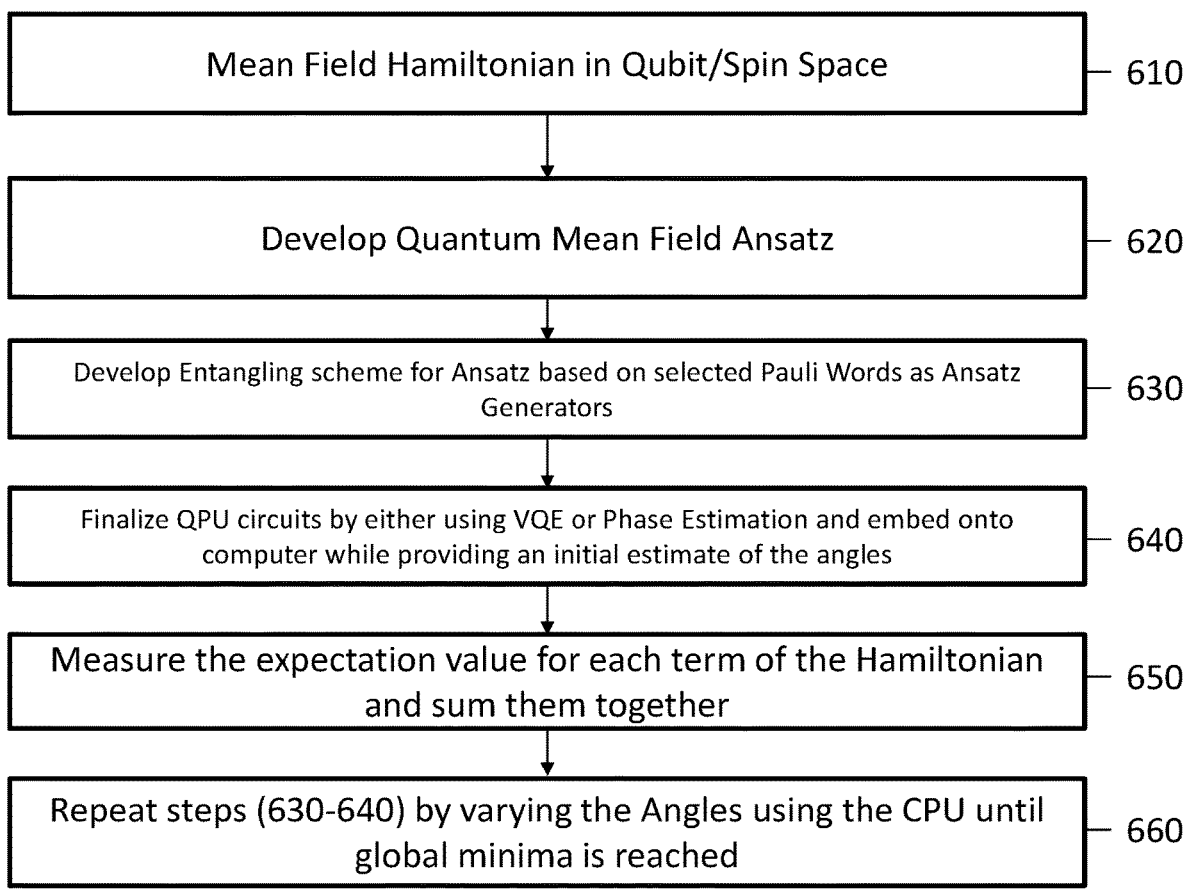
FIG. 6 shows a second example implementation of a method of solving a problem using the quantum mean-field (QMF) ansatz.

At an operation 275 of the method 200, the calculation may be embedded on a quantum computer. FIG. 5 and FIG. 6 may comprise embodiments, variations, and examples of operation 275 of the method 200.

FIG. 5 shows an example implementation of a method 500 of solving a problem using the quantum mean-field ansatz. At an operation 510 of the method 500, a Hamiltonian in qubit space may be provided. At an operation 520 of the method 500, a quantum mean field ansatz may be provided. At an operation 530 of the method 500, the circuits of the quantum computer may be finalized using a variational quantum eigensolver or phase estimation and may be embedded onto the quantum computer with an estimate of the initial angles. An initial estimate of the angles may be made on the classical computer. An initial estimate of the angles may be provided to the quantum computer by the classical computer. At an operation 540 of the method 500 the expectation value for each term of the Hamiltonian may be measured and summed together. Operations 530 and 540 may be repeated at an operation 550 until a criterion is reached. The criterion may comprise a threshold value. The criterion may comprise a minimum. The minimum may be a local minimum or a global minimum. The minimum may comprise a solution to the problem.

FIG. 6 shows a second example implementation of a method 600 of solving a problem using the quantum mean-field ansatz. At an operation 610 of the method 600, a mean field Hamiltonian in qubit space may be provided. At an operation 620 of the method 600, a quantum mean field ansatz may be provided. At an operation 630 of the method 600 an entangling scheme based on alpha-beta MO blending schemes may be implemented. At an operation 640 of the method 600, the circuits of the quantum computer may be finalized using a variational quantum eigensolver or phase estimation and may be embedded onto the quantum computer with an estimate of the initial angles. An initial estimate of the angles may be made on the classical computer. An initial estimate of the angles may be provided to the quantum computer by the classical computer. At an operation 650 of the method 600 the expectation value for each term in the Hamiltonian may be measured and summed together. Operations 630, 640, and 650 may be repeated at an operation 660 until a criterion is reached. The criterion may comprise a threshold value. The criterion may comprise a minimum. The minimum may be a local minimum or a global minimum. The minimum may comprise a solution to the problem.

Examples

Figure 7:
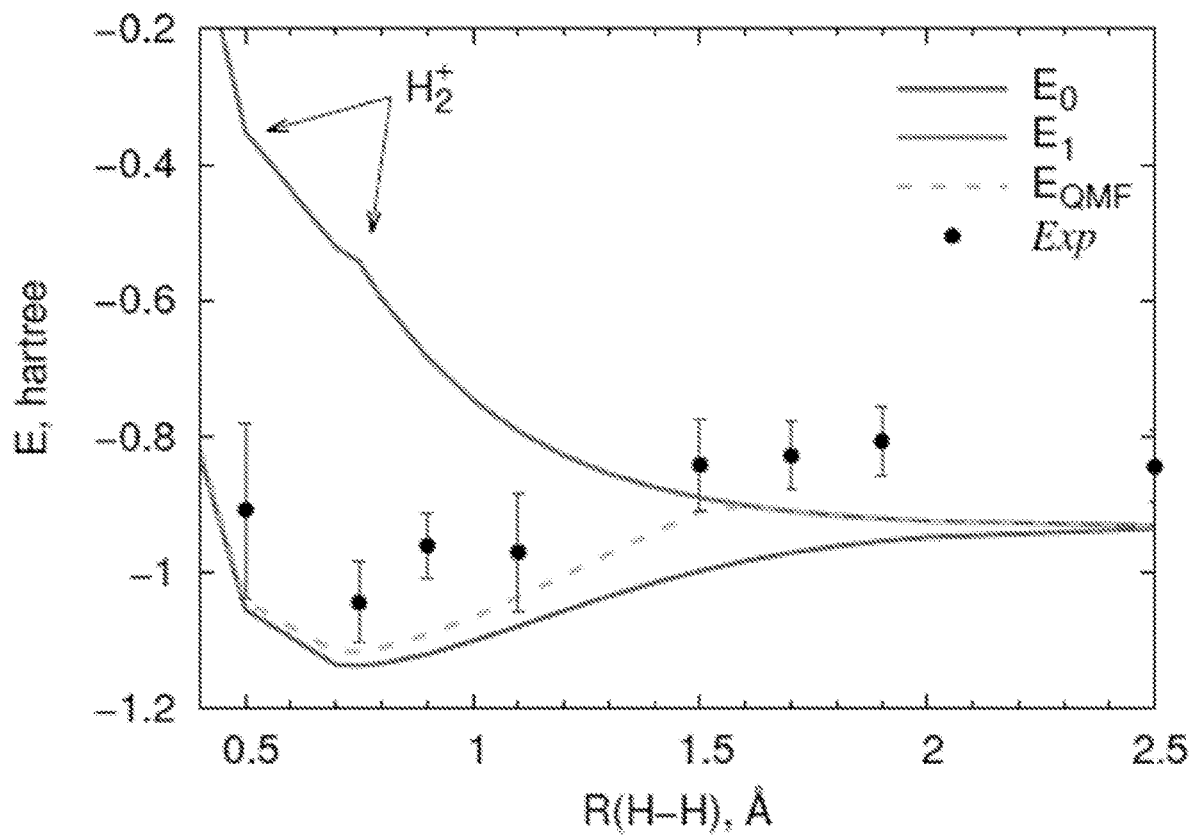
FIG. 7 shows the two lowest eigenstates of the Hamiltonian for $H_2$, the minimum of the corresponding QMF functional, and experimental data from a Rigetti quantum computer.

FIG. 7 shows the two lowest eigenstates of the Hamiltonian for $H_2$, the minimum of the corresponding quantum mean-field (QMF) functional, and experimental data from a Rigetti quantum computer. The two lowest eigenstates of the Hamiltonian correspond to the exact potential energy curves calculated by full diagonalization of the qubit Hamiltonian for different R. The QMF solution was obtained by minimizing the QMF energy with respect to all 8 Bloch angles using the sequential quadratic programing algorithm s implemented by the fmincon routine in the MATLAB software. Calculation were performed using a STO-3G basis set mapped to 4 qubits using the Bravyi-Kitaev transformation. The resulting Hamiltonian has 15 terms, each of which is inferred from one- and two-electron molecular integrals at a given interatomic distance R.

Figure 8:
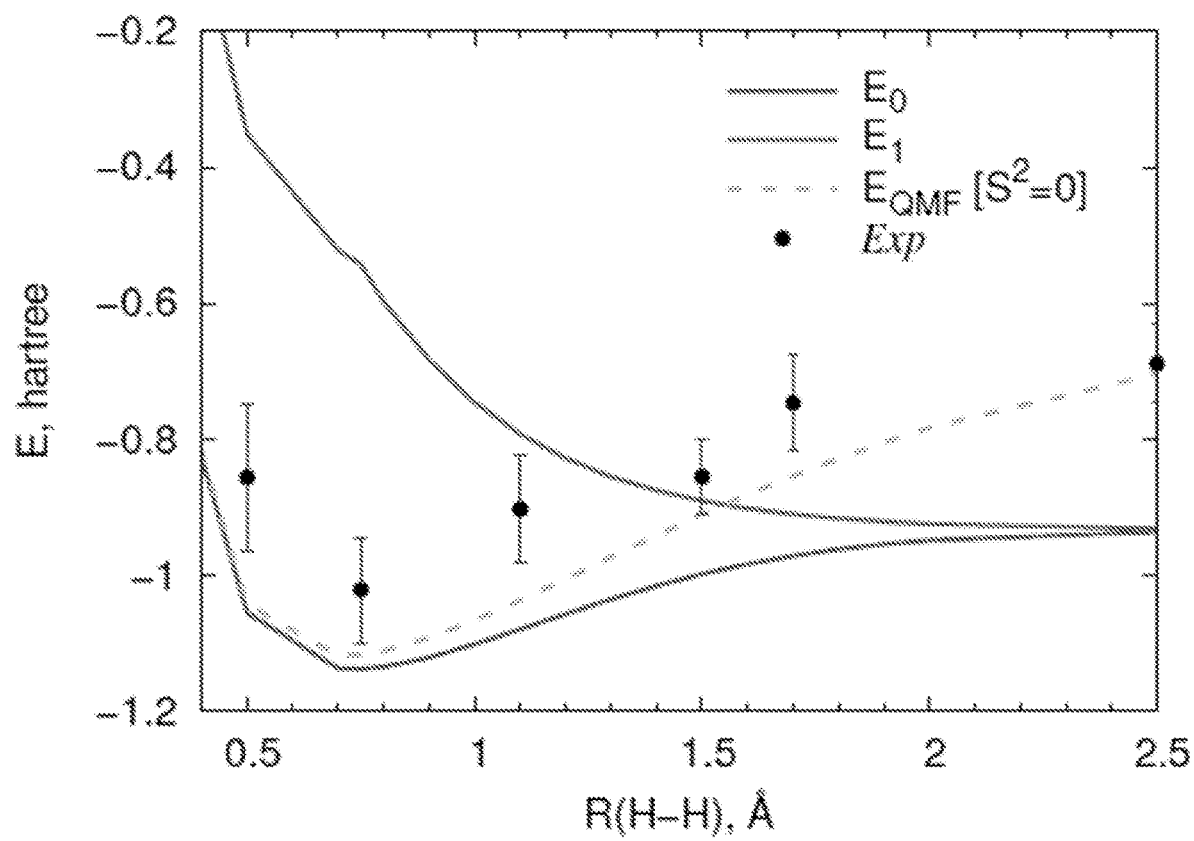
FIG. 8 shows the two lowest eigenstates of the Hamiltonian for $H_2$, the minimum of the corresponding QMF functional, and experimental data from a Rigetti quantum computer, where the QMF functional has been constrained by $S^2=0$.

FIG. 8 shows the two lowest eigenstates of the Hamiltonian for $H_2$, the minimum of the corresponding QMF functional, and experimental data from a Rigetti quantum computer, where the QMF functional has been constrained by $S^2=0$. FIG. 8 shows the results of constrained minimization of EQMF together with the exact curves shown in FIG. 7. The constrained mean-field potential energy curve is smooth and retains the number and/or spin characteristic over all R. The constrained mean-field potential additionally retains the same behavior as the RHF curve given by traditional quantum chemistry in so far as it produces the incorrect dissociation limit that is half way between the purely radical H+H and ionic $H^+ + H^-$ dissociation limit. Without the constraints, it may be very difficult to reach the ground state of the electronic structure because other states aside from the one of interest (such as A+ and A− for an arbitrary molecule A) may be embedded into the VQE solution. This can cause the VQE ground state to be inaccurate relative to the actual ground state of a given configuration, dependent on number of electrons and the spin (N, $S^2$).

Figure 9:
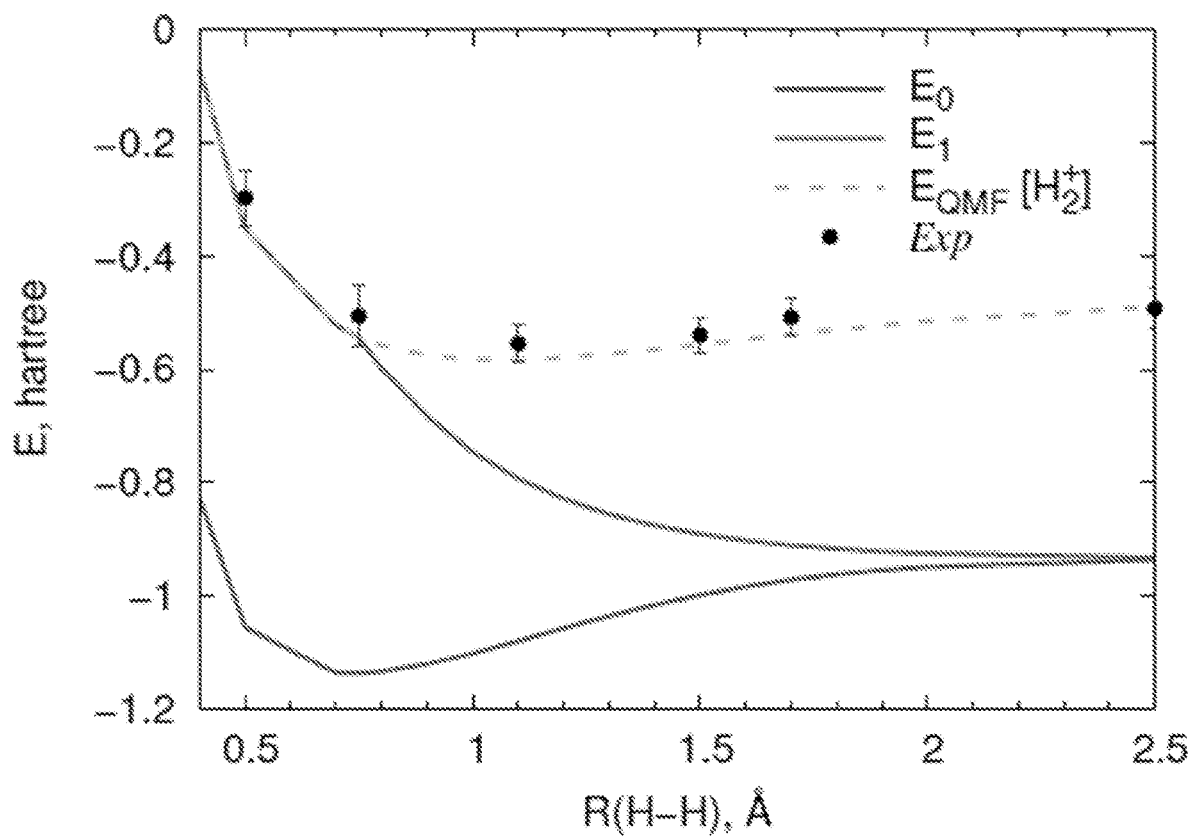
FIG. 9 shows the two lowest eigenstates of the Hamiltonian for $H_2^+$, the minimum of the corresponding QMF functional, and experimental data from a Rigetti quantum computer, where the QMF functional has been constrained by $N=1$.

FIG. 9 shows the two lowest eigenstates of the Hamiltonian for $H_2^+$, the minimum of the corresponding QMF functional, and experimental data from a Rigetti quantum computer, where the QMF functional has been constrained by N=1. Similar to FIG. 8, the constrained minimization can also be employed to extract the potential energy curve of $H_2^+$. The resulting curve is smooth and actually follows the $H_2^+$ potential energy curve computed by the GAMES S quantum chemistry package with the same STO-3G basis set.

Figure 11:
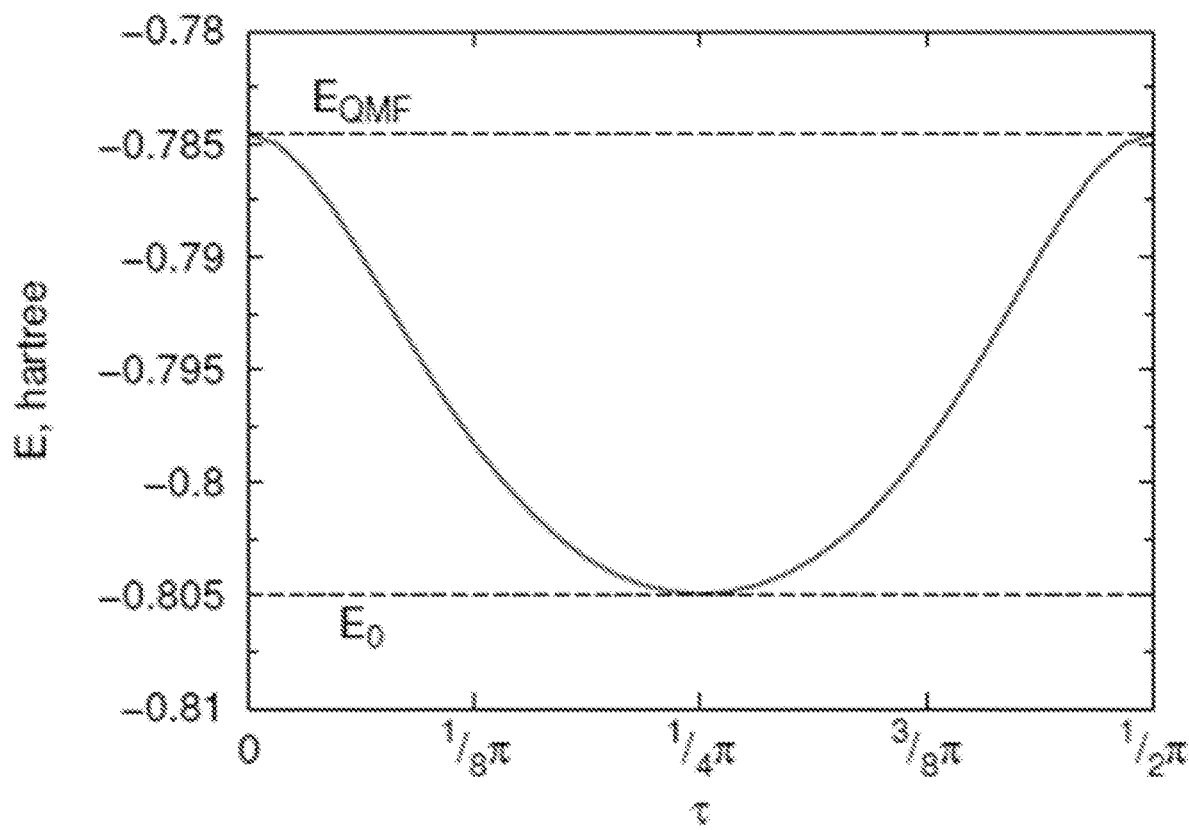
FIG. 11 shows correlated mean-field energy $E_{cQMF}^{x_1x_0}(\tau)$ for the generator $\hat{T}_1=x_1z_0$ for $H_2$ in a minimal basis.

FIG. 11 shows correlated mean-field energy $E_{cQMF}^{x_1z_0}(\tau)$ for the generator $\hat{T}_1 = x_1 z_0$ for $H_2$ in a minimal basis using the coupled cluster method described herein. FIG. 11 shows the exact energy $E_0$ and $E_{QMF}$ for reference. For the example generator, the correlated energy is lower than $E_{QMF}$ everywhere and reaches the exact value at $\tau = \pi/4$. In an appropriate basis, such as shown this example, the problem can be solved by a single qubit rotation.

Figure 12:
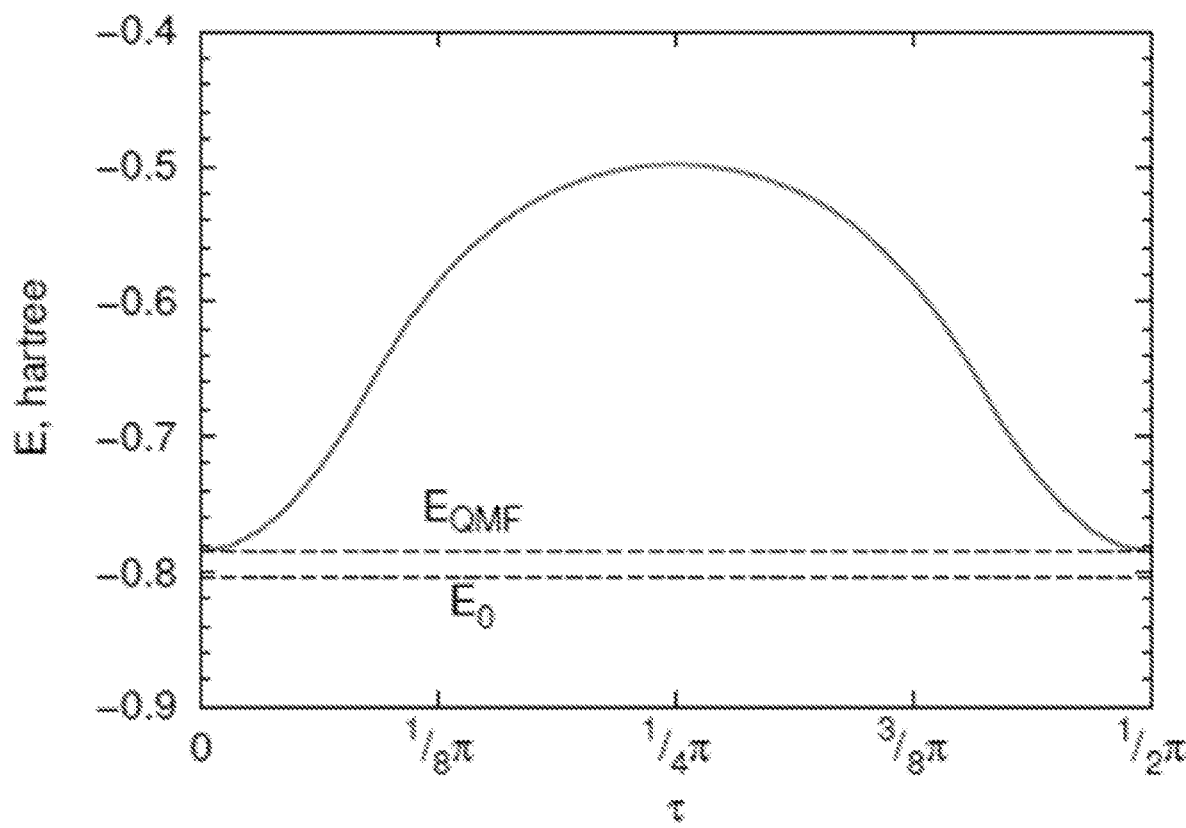
FIG. 12 shows correlated mean-field energy $E_{cQMF}^{x_1x_0}(\tau)$ for the generator $\hat{T}_1=x_1z_0$ for $H_2$ in a minimal basis.

FIG. 12 shows correlated mean-field energy $E_{cQMF}^{x_1x_0}(\tau)$ for the generator $\hat{T}_2 = x_1 x_0$ for $H_2$ in a minimal basis using the coupled cluster method described herein. The entangler in this example, never goes below $E_{QMF}$, therefore, this entangler may be less useful than $\hat{T}_1 = x_1 z_0$. Any fixed-amplitude entangler with this generator worsens the accuracy of the variational procedure. By The previous two examples show that with appropriate choice of entangler, 4 Bloch angles and one $\tau$ amplitude may be used to achieve the exact solutions (5 qubits). In the procedure of Kandala et al. 10 optimization parameters n(3d+2) for n=2 and d=1 were used for the same Hamiltonian.

Figure 15:
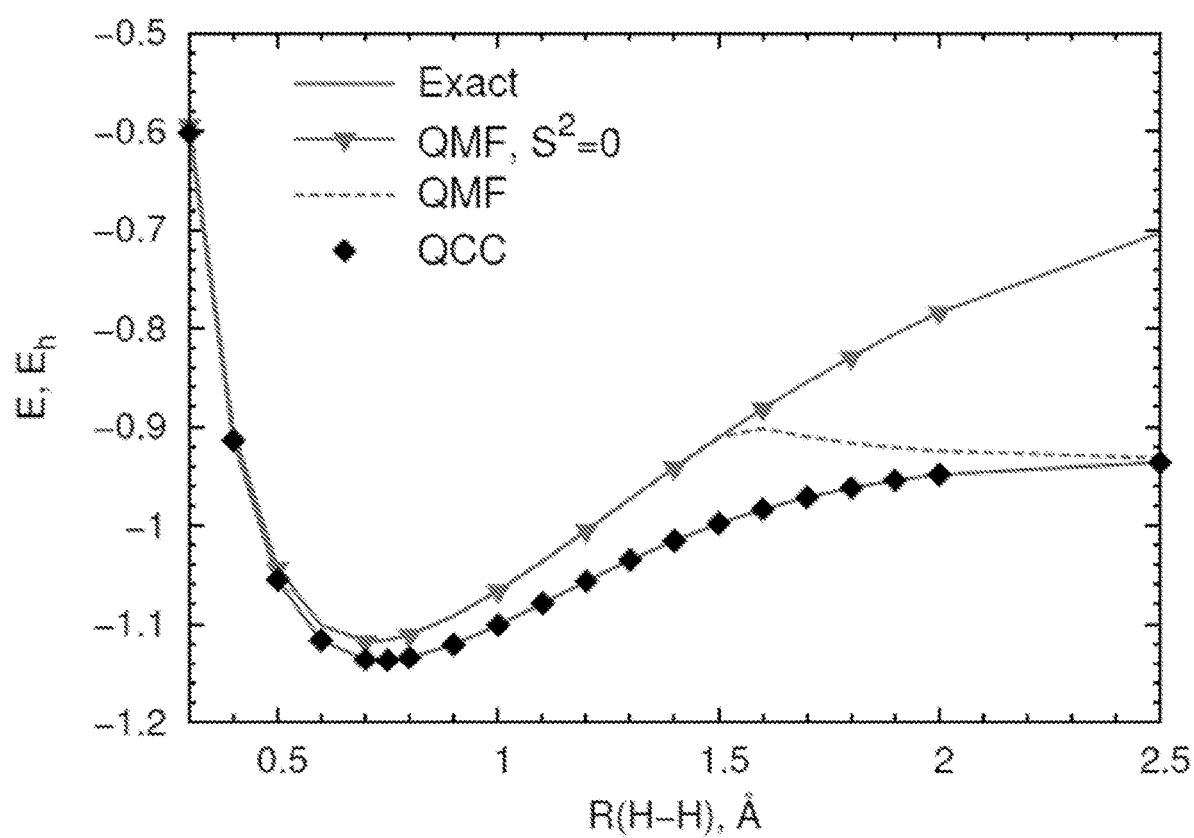
FIG. 15 shows a calculated potential energy curve for the bond stretching coordinate of the H2 molecule using the example QCC entanglement ansatz of FIG. 14.

FIG. 15 shows a calculated potential energy curve for the bond stretching coordinate of the H2 molecule using the example QCC entanglement ansatz of FIG. 14. For comparison, FIG. 15 also shows results for the QMF method, spin constrained QMF method, and the exact potential energy surface. In the H2 example, the qubit/spin Hamiltonian acts upon 4 qubits. In other embodiments the Hamiltonian may be reduced through parity mapping and by eliminating stationary qubits (i.e. qubits that have Pauli Z or identity operators on them, which corresponds to an eigenvalue of ±1). In this example, 54 two qubit combinations of various Pauli spin operators were tested, where six Pauli word entanglers—$x_2y_0$, $y_2x_0$, $z_2y_0$, $z_2x_0$, $y_2z_0$, $x_2z_0$, were used in the QCC Hamiltonian, since these six lower the energy of the molecule. In this particular example, one entanglement gate of these Pauli operators is needed, since they are all related by a simple global frame rotation. In this example the entangler $P = x_2 y_0$ is used which produces the FCI result on the PES for $H_2$ shown in FIG. 15. The ranking of the two qubit entanglers for the H2 molecule is shown in Table 1.

TABLE 1

| Entangler P | $\left.\dfrac{dE[\tau; P_k]}{d\tau}\right|_{\tau=0}$ | $\left.\dfrac{d^2E[\tau; P_k]}{d\tau^2}\right|_{\tau=0}$ | $\Delta E[P_k]$ |
| --- | --- | --- | --- |
| $x_2y_0$ | −0.3936 | 0.5351 | −0.0350 |
| $y_2x_0$ | 0.3939 | 0.5351 | −0.0350 |
| $z_2y_0$ | 0.000 | −0.0502 | −0.0350 |
| $z_2x_0$ | 0.000 | −0.0502 | −0.0350 |
| $y_2z_0$ | 0.000 | −0.0493 | −0.0350 |
| $x_2z_0$ | 0.000 | −0.0493 | −0.0350 |

Figure 17:
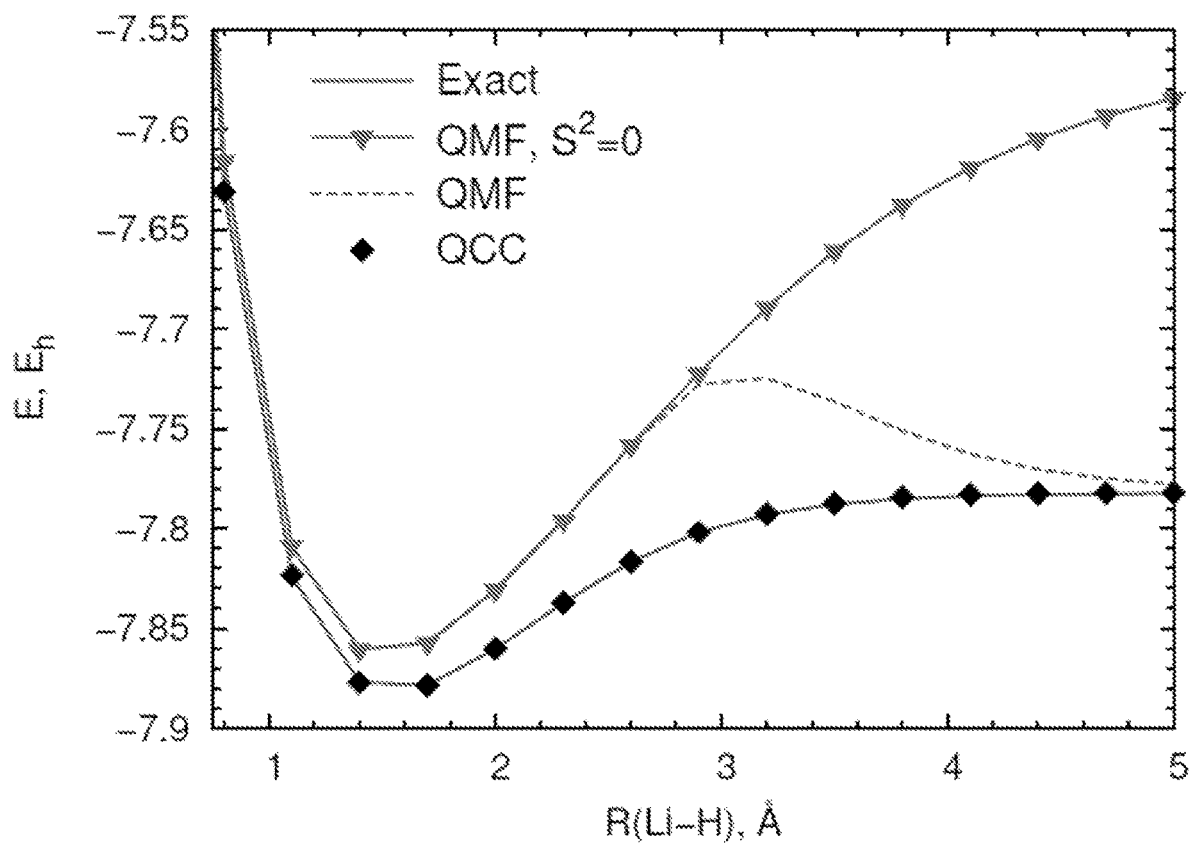
FIG. 17 shows a calculated potential energy curve for the bond stretching coordinate of the LiH molecule using the example QCC entanglement ansatz of FIG. 14.

FIG. 17 shows a calculated potential energy curve for the bond stretching coordinate of LiH using the QCC entanglement scheme described herein. For comparison, FIG. 17 also shows results for the QMF method, spin constrained QMF method, and the exact potential energy surface. In the LiH example, there are 2 two-qubit, 12 three qubit, and 18 four-qubit entanglers. They can be reduced by combining them into groups with the same absolute value of the gradient. The list was truncated to one two-qubit and 2 four-qubit mutually commuting entanglers with the largest magnitude and the same sign of the energy gradient ($x_2y_0$, $x_2x_3x_1y_0$, and $y_3x_2y_1y_0$). As shown in Table 2, at R=1.5 angstroms both four-qubit entanglers are an order of magnitude more energetically important than the two-qubit one. Before factorization, there are 11 variational parameters in total, $N_q=4$ and $N_{ent}=3$. Subsequently, the four-qubit entanglers were factored into 7 two-qubit entanglers. The number of variational parameters does not grow using this method. Sub-milliHartree accuracy for the whole range of R(Li—H) was reached with 7 multi-qubit entanglers.

TABLE 2

| Entangler P | $\left.\dfrac{dE[\tau; P_k]}{d\tau}\right|_{\tau=0}$ | $\left.\dfrac{d^2E[\tau; P_k]}{d\tau^2}\right|_{\tau=0}$ | $\Delta E[\overline{P_k}]$ |
|---|---|---|---|
| $x_2 y_0$ | 0.0000 | −0.0121 | −0.0000 |
| $x_2 x_3 x_1 y_0$ | −0.0653 | 0.1742 | −0.0025 |
| $y_3 x_2 y_1 y_0$ | −0.0401 | −0.2783 | −0.0003 |
| $z_3 z_2 y_1 x_0$ | −0.0156 | −4.5886 | −0.0067 |
| $x_3 x_2 y_1$ | 0.0072 | −1.2785 | −0.0003 |
| $y_3 z_2 x_0$ | −0.0626 | −15.3987 | −0.0539 |
| $x_3 z_2 y_1 x_0$ | −0.0249 | −3.2103 | −0.0009 |

Figure 20:
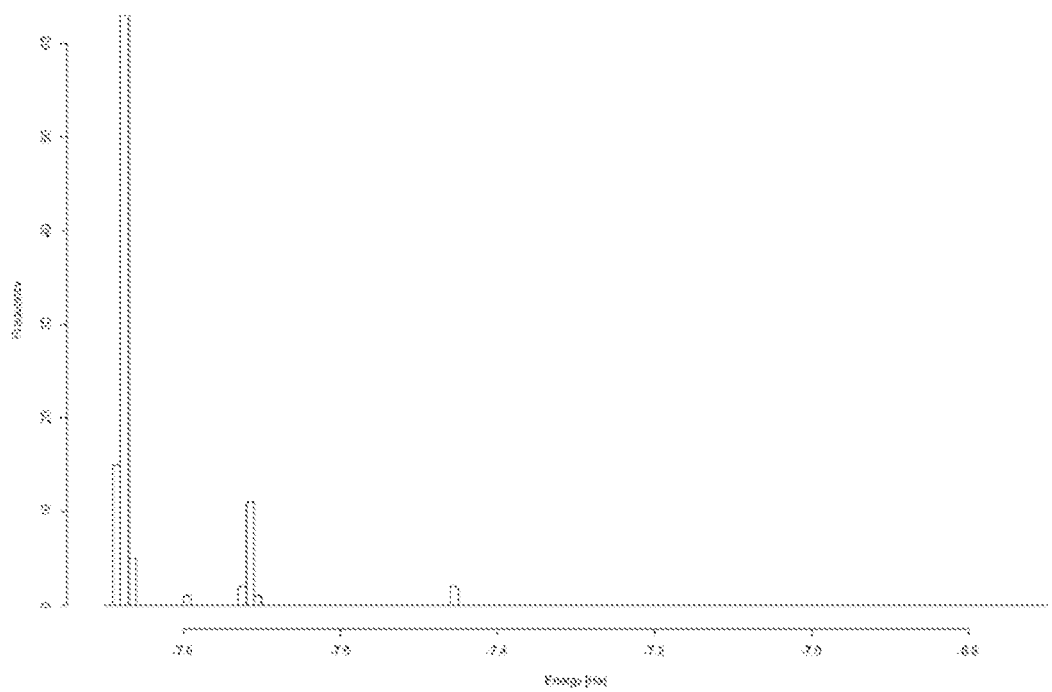
FIG. 20 shows the results of implementing the QCC method without domain folding (2010)—solved on a classical computer—and with domain folding (2020) solving the discrete optimization on a quantum annealer of LiH for a bond distance of 1.45 Å, and each condition was repeated 101 times.
Figure 20:
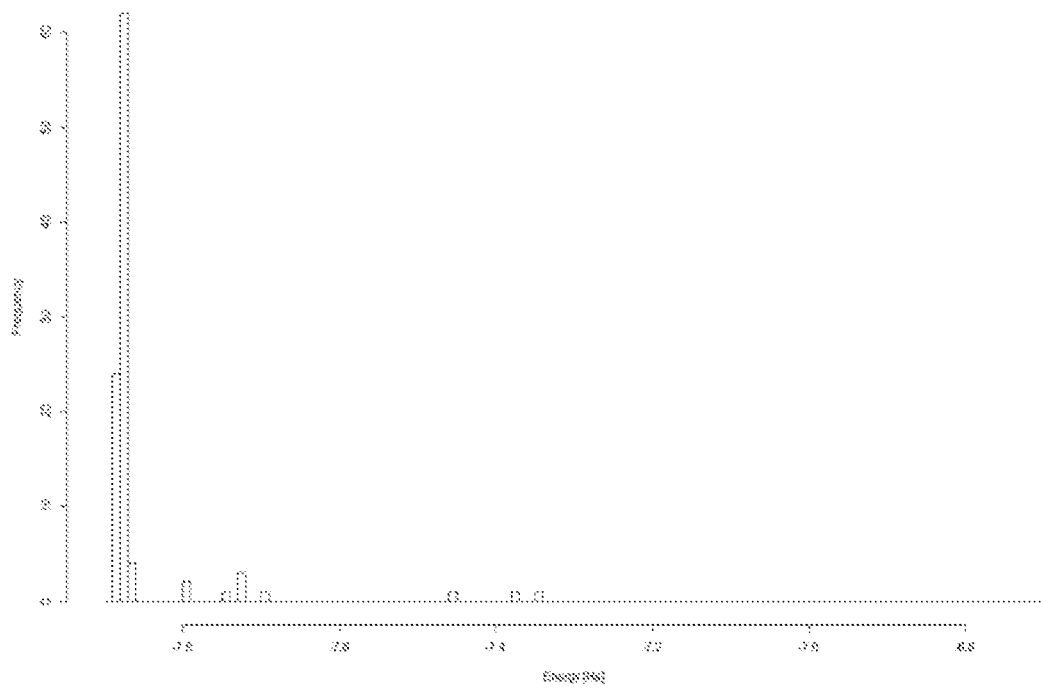

FIG. 20 shows the results of implementing the QCC method without domain folding (2010)—solved exclusively on a classical computer—and with domain folding (2020) solving the discrete optimization on a quantum annealer of LiH for a bond distance of 1.45 A and each condition was repeated 101 times.

Classical Computer Control Systems

Figure 10:
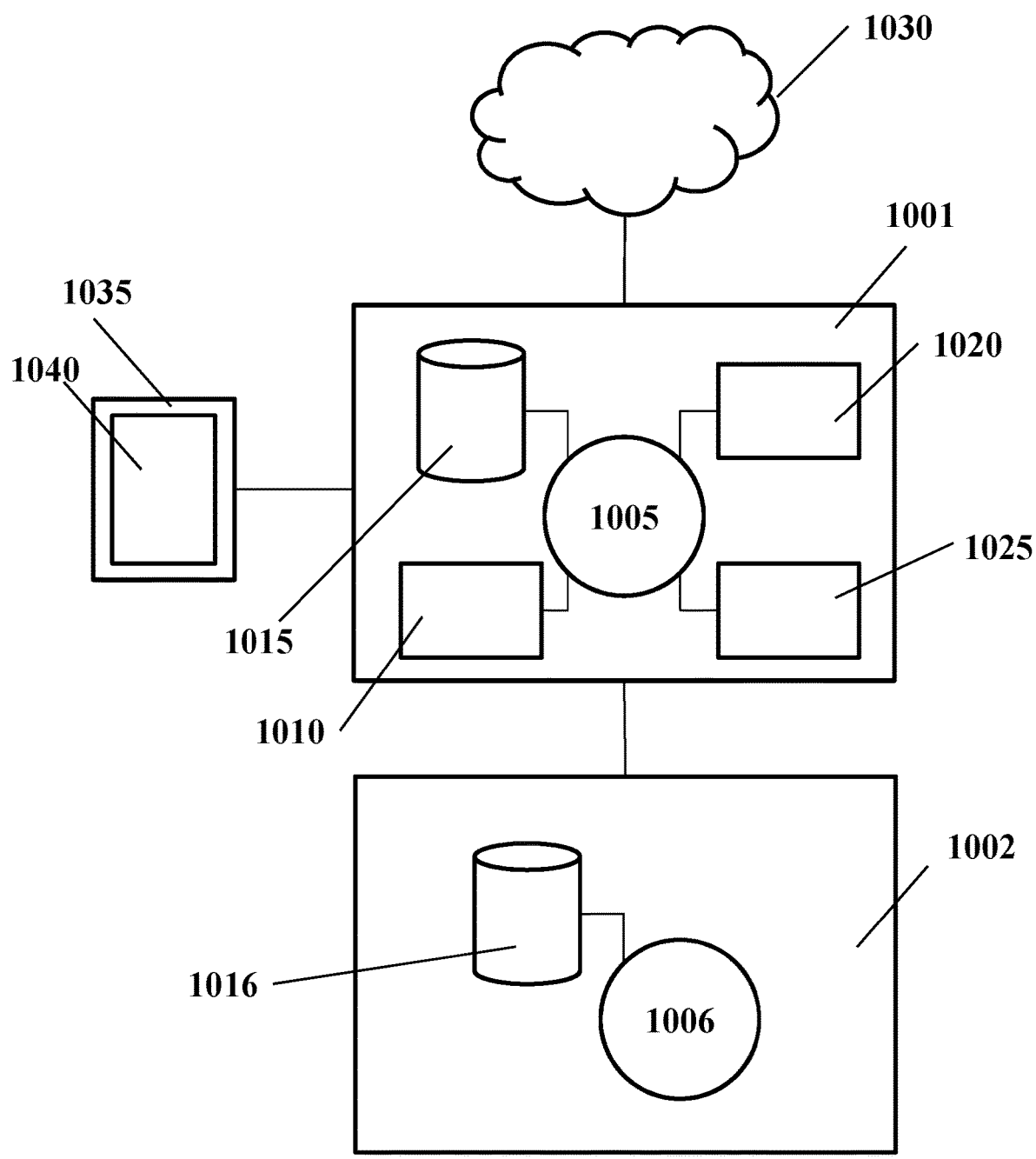
FIG. 10 shows a classical computer system coupled to a quantum computer system that is programmed or otherwise configured to implement methods provided herein.

The present disclosure provides classical computer control systems that are programmed to implement methods of the disclosure. FIG. 10 shows a classical computer system 1001 that is programmed or otherwise configured to control operation of the quantum computer or a quantum processing unit within the quantum computer. The computer system 1001 can regulate various aspects of the quantum computer 1002 of the present disclosure, such as, for example, implementing a method of solving a problem or a method of solving an electronic structure problem described herein. The computer system 1001 may perform one or more classical computations, which may comprise precursor or intermediate or post-processing steps to the methods described herein. The computer system may aid or assist in embedding one or more parts of the Hamiltonian the quantum computer 1002. The classical computer system 1001 may set and/or determine the bias and/or the coupling each qubit. Any operation of the methods and systems described herein which do not directly depend on the quantum nature of the qubit may be delegated to a classical computer as necessary. In some cases, the computer system 1001 can simulate a quantum computer.

The computer system 1001 can be an electronic device of a user or a computer system that is remotely located with respect to the electronic device. The electronic device can be a mobile electronic device. The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The classical storage unit 1015 can store files, such as drivers, libraries and saved programs. The storage unit 1015 can store user data, e.g., user preferences and user programs. The computer system 1001 in some cases can include one or more additional data storage units that are external to the computer system 1001, such as located on a remote server that is in communication with the computer system 1001 through an intranet or the Internet.

The computer system 1001 can communicate with one or more remote computer systems through the network 1030. For instance, the computer system 1001 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 and thus the quantum computer system 1002 via the network 1030.

Methods as described herein can be implemented by way of machine (e.g., computer processor) executable code stored on an electronic storage location of the computer system 1001, such as, for example, on the memory 1010 or classical storage unit 1015. The machine executable or machine readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, results or solutions to the problems described herein. Examples of UI's include, without limitation, a graphical user interface (GUI) and web-based user interface.

The classical computer system may be operably connected to a quantum computer system 1002. The quantum computer system may comprise a quantum processing unit 1006, which may further comprise qubits. A quantum computer may comprise a number of qubits which number may be for example, 1, 2, 5, 10, 20, 50, 100, 1,000, 10,000, 100,000, 1 million, 1 billion, 1 trillion, or any number of qubits defined by a range between any two of the preceding values.

The quantum processing unit 1006 may execute a sequence of instructions, which can be embodied in a program or software. The instructions may be stored in a memory location, such as the memory 1010 of classical computer system 1001. The instructions can be directed to the quantum processing unit 1006, which can subsequently program or otherwise configure the quantum processing unit 1006 to implement methods of the present disclosure. The quantum processing unit 1006 can be part of a circuit, such as a quantum logic circuit. One or more other components of the systems 1001 and 1002 can be included in the circuit.

Quantum computer system 1002 may comprise a quantum storage unit 1016. The quantum storage unit may be configured to store quantum information. The quantum storage unit may comprise additional qubits.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of solving a problem on a quantum computer, the method comprising:
    providing a qubit Hamiltonian, wherein one or a plurality of eigenvalues of the qubit Hamiltonian is a variational upper bound to an exact state energy;
    providing a set of entanglers, the set of entanglers comprising one or a plurality of Pauli words;
    determining a subset of the set of entanglers which reduces a value of the one or the plurality of eigenvalues;
    truncating the set of entanglers to form a truncated set of entanglers;
    forming a qubit coupled cluster Hamiltonian comprising the truncated set of entanglers;
    directing the qubit coupled cluster Hamiltonian to be embedded on the quantum computer; and
    receiving an eigenvalue of the qubit Hamiltonian from the quantum computer, wherein the eigenvalue comprises a solution to the problem.

2. The method of claim 1, further comprising parameterizing one or more coordinates of the qubit Hamiltonian by spin coherent states.

3. The method of claim 1, further comprising expressing the truncated set of entanglers as Pauli z-rotations.

4. The method of claim 1, further comprising folding an optimization domain in amplitude or phase space before determining a lower eigenvalue of the qubit coupled cluster Hamiltonian.

5. A quantum computer comprising:
    a plurality of qubits;
    a Hamiltonian embedded on the quantum computer, wherein one or a plurality of eigenvalues of the Hamiltonian is a variational upper bound to an exact energy; and a plurality of gate operations configured to be implemented by the quantum computer, the plurality of gate operations comprising:
- a set of entanglers comprising one or a plurality of Pauli Words; and
- a subset of entanglers, wherein the subset of entanglers comprises selected Pauli Words which reduce a value of the one or the plurality of eigenvalues.

6. The quantum computer of claim 5, wherein the Hamiltonian comprises a qubit coupled cluster Hamiltonian.

7. The quantum computer of claim 5, wherein the subset of entanglers is parametrized in the Hamiltonian by spin coherent states.

8. The quantum computer of claim 5, wherein the subset of entanglers is expressed as Pauli z-rotations.

9. The quantum computer of claim 5, wherein a domain of optimization of the subset of entanglers is folded in amplitude or phase.

10. A method of solving a problem on a quantum computer, the method comprising:
providing a qubit Hamiltonian, wherein one or a plurality of eigenvalues of the qubit Hamiltonian is a variational upper bound to an exact state energy, and wherein the qubit Hamiltonian is parameterized by a set of entanglers;
determining a first entangler of the set of entanglers which reduces a value of the one or the plurality of eigenvalues;
directing the qubit Hamiltonian to be embedded on the quantum computer, wherein the qubit Hamiltonian comprises the first entangler;
receiving from the quantum computer an amplitude of the first entangler which produces a first lower eigenvalue of the qubit Hamiltonian;
directing the qubit Hamiltonian to be embedded on the quantum computer, wherein the qubit Hamiltonian comprises the amplitude of the first entangler and a second entangler of the set of entanglers; and
receiving from the quantum computer an amplitude of the second entangler which produces a second lower eigenvalue of the qubit Hamiltonian.

11. The method of claim 10, further comprising parameterizing one or more coordinates of the qubit Hamiltonian by spin coherent states.

12. The method of claim 10, further comprising folding an optimization domain in amplitude or phase space before determining the first lower eigenvalue of the qubit Hamiltonian.

13. The method of claim 10, wherein the qubit Hamiltonian comprises a qubit coupled cluster Hamiltonian.

14. The method of claim 13, wherein the qubit cluster Hamiltonian is transformed as $H_e + \sin(t_1)/2(T_1 H_e - H_e T_1) + (1-\cos(t_1))/2(T_1 H_e T_1 - H_e)$.

15. The method of claim 10, wherein the quantum computer is a quantum annealer.

16. The method of claim 10, wherein the quantum computer is a universal gate quantum processing unit.

17. The method of claim 10, further comprising determining a third or more lower eigenvalues of the qubit Hamiltonian using a third or more entanglers and wherein the first, second, and third lower eigenvalues comprise a set of lower eigenvalues.

18. The method of claim 17, wherein a solution to the problem is an eigenvalue of the set of lower eigenvalues.

19. The method of claim 18, wherein the method further comprises providing the solution to a user.

20. The method of claim 18, wherein the solution is a global minimum.

21. The method of claim 18, wherein the solution is a local minimum.

22. A quantum computer comprising:
a plurality of qubits;
a Hamiltonian embedded on the quantum computer, wherein one or a plurality of eigenvalues of the Hamiltonian is a variational upper bound to an exact energy; and
a plurality of gate operations configured to be implemented by the quantum computer, the plurality of gate operations comprising:
- a set of entanglers which reduces a value of the one or the plurality of eigenvalues;
- a first amplitude of a first entangler which produces a lower eigenvalue of the Hamiltonian; and
- a second entangler of the set of entanglers which reduces the lower eigenvalue value of the one or the plurality of eigenvalues of the Hamiltonian, wherein the Hamiltonian comprises the first amplitude of the first entangler.

23. The system of claim 22, wherein the lower eigenvalue comprises one of a set of lower eigenvalues.

24. The system of claim 23, wherein a solution to the problem is an eigenvalue of the set of lower eigenvalues.

25. The system of claim 24, wherein the method further comprises providing the solution to a user.

26. The system of claim 24, wherein the solution is a global minimum.

27. The system of claim 24, wherein the solution is a local minimum.

28. The system of claim 22, wherein one or more coordinates of the Hamiltonian is parameterized by spin coherent states.

* * * * *

UNITED STATES PATENT AND TRADEMARK OFFICE
CERTIFICATE OF CORRECTION

PATENT NO. : 11,301,770 B2
APPLICATION NO. : 15/733868
DATED : April 12, 2022
INVENTOR(S) : Scott Genin, Artur Izmaylov and Ilya Ryabinkin It is certified that error appears in the above-identified patent and that said Letters Patent is hereby corrected as shown below:

In the Drawings

In FIG. 2, block 210, delete "either from MO or AOs".

In FIG. 2, block 220, delete "(usually second quantized form)".

In FIG. 2, block 230, delete "using JW or BK transformation".

In FIG. 5, block 510, delete "Mean Field".

In FIG. 5, block 520, replace "Quantum" with – Qubit –.

In FIG. 6, block 620, replace "Quantum" with – Qubit –.

In FIG. 6, block 660, replace "640" with – 650 –.

In FIG. 16, block 1645, replace "Pauil" with – Pauli –.

In FIG. 18, block 1845, replace "Pauil" with – Pauli –.

In FIG. 18, block 1875, after "amplitudes" insert -- and/or phases --.

In FIG. 19, block 1920, replace "and" with – and/or –.

In the Specification

In Column 1, Line 45, after "annealer" insert a -- . --.

In Column 2, Line 30, after "Hamiltonian" insert -- that --.

Signed and Sealed this
Sixteenth Day of December, 2025

John A. Squires
*Director of the United States Patent and Trademark Office*

CERTIFICATE OF CORRECTION (continued)
U.S. Pat. No. 11,301,770 B2

In Column 3, Line 29, after "user" insert a -- . --.

In Column 3, Line 32, after "plurality" insert -- of --.

In Column 3, Line 35, after "plurality" insert -- of --.

In Column 3, Line 37, after "plurality" insert -- of --.

In Column 3, Line 54, replace "Hamilton" with – Hamiltonian –.

In Column 4, Line 36, replace "Hamilton" with – Hamiltonian –.

In Column 6, Line 53, after "plurality" insert -- of --.

In Column 6, Line 56, after "plurality" insert -- of --.

In Column 6, Line 58, after "plurality" insert -- of --.

In Column 7, Line 8, replace "Hamilton" with – Hamiltonian –.

In Column 7, Line 60, replace "Hamilton" with – Hamiltonian –.

In Column 8, Line 26, after "plurality" insert -- of --.

In Column 8, Line 31, after "plurality" insert -- of --.

In Column 8, Line 37, delete "t" before "Hamiltonian".

In Column 8, Line 49, before "cluster" insert -- coupled --.

In Column 8, Line 66, replace "Hamilton" with – Hamiltonian –.

In Column 9, Line 4, after "plurality" insert -- of --.

In Column 9, Line 8, after "plurality" insert -- of --.

In Column 9, Line 63, before "cluster" insert -- coupled --.

In Column 10, Line 49, before "cluster" insert -- coupled --.

In Column 11, Line 38, replace "quantum" with – qubit –.

In Column 11, Line 40, replace "quantum" with – qubit –.

In Column 12, Line 2, replace "H2" with – $H_2$ –.

CERTIFICATE OF CORRECTION (continued)
U.S. Pat. No. 11,301,770 B2

In Column 14, Line 22, replace "principal" with – principle –.

In Column 15, Line 1, after "subset" insert -- of --.

In Column 15, Line 11, replace "$r^{th}$" with – $R^{th}$ –.

In Column 15, Line 26, after "may" insert -- be --.

In Column 19, Lines 48-49, replace "classical control systems" with – Classical Computer Control Systems –.

In Column 19, Line 56, replace "160" with – 140 –.

In Column 19, Line 60, after "Wigner" insert -- (JW) --.

In Column 19, Line 61, after "Kitaev" insert -- (BK) --.

In Column 20, Line 40, delete "mean-field".

In Column 20, Line 40, after "Hamiltonian" insert -- in qubit operators --.

In Column 20, Line 41, replace "qubit" with – mean-field –.

In Column 20, Line 63, replace "of" before "half-integer" with – or –.

In Column 21, Line 12, replace "$[(J - M)!]$" with – $[(J - M)!]^{-1}$ –.

In Column 21, Line 67, replace "quantum" with – qubit –.

In Column 22, Line 1, replace "quantum" with – qubit –.

In Column 22, Line 4, replace "quantum" with – qubit –.

In Column 22, Line 5, replace "quantum" with – qubit –.

In Column 22, Line 53, replace "The" with – This –.

In Column 22, Line 59, replace "quantum" with – qubit –.

In Column 24, Line 6, delete "a minimum".

In Column 24, Line 29, delete "430,".

In Column 24, Line 36, replace "quantum" with – qubit –.

In Column 24, Line 44, replace "quantum" with – qubit –.

CERTIFICATE OF CORRECTION (continued)
U.S. Pat. No. 11,301,770 B2

In Column 25, Line 41, replace "quantum" with – qubit –.

In Column 26, Line 11, replace "quantum" with – qubit –.

In Column 26, Line 12, after "may" insert -- be --.

In Column 26, Line 14, replace "quantum" with – qubit –.

In Column 26, Line 16, replace "coat" with – cost –.

In Column 26, Line 30, replace "Hamilton" with – Hamiltonian –.

In Column 27, Line 2, replace "and" with – and/or –.

In Column 27, Line 5, replace "and" with – and/or –.

In Column 27, Line 9, replace "and" with – and/or –.

In Column 27, Line 11, replace "and" with – and/or –.

In Column 27, Line 60, replace "quantum" with – qubit –.

In Column 27, Line 65, replace "and" with – and/or –.

In Column 28, Line 5, replace "quantum" with – qubit –.

In Column 29, Line 2, replace "Hademard" with – Hadamard –.

In Column 29, Lines 5-6, replace "Hade-mard" with – Hada-mard –.

In Column 29, Line 63, replace "$2N_q$" with – $3N_q$ –.

In Column 31, Line 10, replace "quantum is" with – qubit –.

In Column 31, Line 11, delete "that" before "may".

In Column 33, Line 57, replace "1875" with – 1880 –.

In Column 34, Line 40, insert -- be -- before "applied".

In Column 34, Line 60, delete "0" before "1".

In Column 35, Line 50, replace "1" with – 2 –.

In Column 35, Line 64, replace "quantum" with – qubit –.

CERTIFICATE OF CORRECTION (continued)
U.S. Pat. No. 11,301,770 B2

In Column 36, Line 41, replace "quantum" with – qubit –.

In Column 36, Line 44, replace "quantum" with – qubit –.

In Column 36, Line 61, replace "quantum" with – qubit –.

In Column 36, Line 64, replace "quantum" with – qubit –.

In Column 36, Line 66, after "scheme" insert -- for ansatz --.

In Column 36, Lines 66-67, replace "alpha-beta MO blending schemes" with – selected Pauli Words –.

In Column 37, Line 20, replace "quantum" with – qubit –.

In Column 37, Line 27, delete the space between "algorithm" and "s".

In Column 37, Line 39, replace "EQMF" with – $E_{QMF}$ –.

In Column 38, Line 12, delete "By".

In Column 38, Line 20, replace "H2" with – $H_2$ –.

In Column 38, Line 24, replace "H2" with – $H_2$ –.

In Column 38, Line 38, replace "H2" with – $H_2$ –.

In Column 39, Line 39, after "Hamiltonian" insert -- onto --.

In Column 39, Line 41, after "coupling" insert -- for --.